(12) United States Patent
Laroche et al.

(10) Patent No.: US 10,085,042 B2
(45) Date of Patent: Sep. 25, 2018

(54) METHOD, DEVICE AND PROGRAM FOR ENCODING AND DECODING A SEQUENCE OF IMAGES USING AREA-BY-AREA LOOP FILTERING

(71) Applicant: CANON KABUSHIKI KAISHA, Tokyo (JP)

(72) Inventors: Guillaume Laroche, Rennes (FR); Christophe Gisquet, Rennes (FR); Edouard Francois, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 14/356,831

(22) PCT Filed: Nov. 7, 2012

(86) PCT No.: PCT/EP2012/072077
§ 371 (c)(1),
(2) Date: May 7, 2014

(87) PCT Pub. No.: WO2013/068433
PCT Pub. Date: May 16, 2013

(65) Prior Publication Data
US 2014/0301489 A1    Oct. 9, 2014

(30) Foreign Application Priority Data

Nov. 7, 2011  (GB) .................................. 1119206.9
Feb. 24, 2012 (GB) .................................. 1203285.0
Apr. 13, 2012 (GB) .................................. 1206591.8

(51) Int. Cl.
*H04N 7/26* (2006.01)
*H04N 7/12* (2006.01)
(Continued)

(52) U.S. Cl.
CPC ........... *H04N 19/85* (2014.11); *H04N 19/117* (2014.11); *H04N 19/13* (2014.11); *H04N 19/136* (2014.11);
(Continued)

(58) Field of Classification Search
USPC .......................................................... 375/240
See application file for complete search history.

(56) References Cited

U.S. PATENT DOCUMENTS 5,502,489 A   3/1996  Kim et al.
8,199,216 B2  6/2012  Hwang
(Continued)

FOREIGN PATENT DOCUMENTS

CN    101543076 A    9/2009
EP      1659803 A1   5/2006
(Continued)

OTHER PUBLICATIONS

Fu et al., "Sample Adaptive Offset for Chroma", Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-5.

(Continued)

*Primary Examiner* — Jeremiah C Hallenbeck-Huber
*Assistant Examiner* — Susan E Hodges
(74) *Attorney, Agent, or Firm* — Canon USA, Inc. I.P. Division

(57) ABSTRACT

A method of encoding a sequence of images comprises performing area-by-area loop filtering on at least one image of the sequence and disabling such area-by-area loop filtering on at least one other image of the sequence. The images of the sequence are associated with respective levels from a plurality of levels, the levels corresponding to different respective rate-distortion balances or to different image qualities, and the images on which the area-by-area loop filtering is disabled are determined in dependence upon the levels.

46 Claims, 28 Drawing Sheets

(51) Int. Cl.
| | |
|---|---|
| *H04B 1/66* | (2006.01) |
| *G06K 9/36* | (2006.01) |
| *H04N 19/85* | (2014.01) |
| *H04N 19/139* | (2014.01) |
| *H04N 19/14* | (2014.01) |
| *H04N 19/13* | (2014.01) |
| *H04N 19/117* | (2014.01) |
| *H04N 19/136* | (2014.01) |
| *H04N 19/44* | (2014.01) |
| *H04N 19/80* | (2014.01) |
| *H04N 19/82* | (2014.01) |
| *H04N 19/86* | (2014.01) |

(52) U.S. Cl.
CPC ........... *H04N 19/139* (2014.11); *H04N 19/14* (2014.11); *H04N 19/44* (2014.11); *H04N 19/80* (2014.11); *H04N 19/82* (2014.11); *H04N 19/86* (2014.11)

(56) References Cited

U.S. PATENT DOCUMENTS

| | | | |
|---|---|---|---|
| 2005/0243916 | A1 | 11/2005 | Kwon et al. |
| 2006/0232709 | A1 | 10/2006 | Renner et al. |
| 2008/0080618 | A1 | 4/2008 | Takagi et al. |
| 2008/0137753 | A1* | 6/2008 | He ............... H04N 19/139 375/240.24 |
| 2008/0202320 | A1 | 8/2008 | Skowronek et al. |
| 2009/0041120 | A1 | 2/2009 | Yu |
| 2009/0257664 | A1* | 10/2009 | Kao ............... H04N 19/159 382/232 |
| 2010/0046612 | A1 | 2/2010 | Sun et al. |
| 2010/0260264 | A1 | 10/2010 | Sun et al. |
| 2011/0026593 | A1* | 2/2011 | New ............... H03M 7/42 375/240.12 |
| 2011/0274158 | A1* | 11/2011 | Fu ............... H04N 19/115 375/240.02 |
| 2012/0027083 | A1* | 2/2012 | Narroschke ............... H04N 19/70 375/240.03 |
| 2012/0051425 | A1* | 3/2012 | Chong ............... H04N 19/176 375/240.12 |
| 2012/0177103 | A1* | 7/2012 | Fu ............... H04N 19/82 375/240.02 |
| 2012/0177107 | A1* | 7/2012 | Fu ............... H04N 19/61 375/240.03 |
| 2012/0287988 | A1 | 11/2012 | Chong et al. |
| 2013/0051454 | A1 | 2/2013 | Sze et al. |
| 2013/0051455 | A1 | 2/2013 | Sze et al. |
| 2013/0083844 | A1 | 4/2013 | Chong et al. |
| 2013/0094569 | A1 | 4/2013 | Chong et al. |
| 2013/0114674 | A1 | 5/2013 | Chong et al. |
| 2013/0136173 | A1 | 5/2013 | Matsunobu et al. |
| 2013/0188737 | A1 | 7/2013 | Maani et al. |
| 2013/0223542 | A1 | 8/2013 | Kim et al. |
| 2013/0259118 | A1 | 10/2013 | Fu et al. |
| 2014/0023136 | A1 | 1/2014 | Park et al. |
| 2014/0119433 | A1 | 5/2014 | Park et al. |
| 2014/0126630 | A1 | 5/2014 | Park et al. |
| 2014/0192861 | A1 | 7/2014 | Chuang et al. |
| 2014/0192891 | A1 | 7/2014 | Alshina et al. |
| 2014/0328413 | A1 | 11/2014 | Esenlik et al. |

FOREIGN PATENT DOCUMENTS

| | | |
|---|---|---|
| EP | 2237557 A1 | 6/2010 |
| EP | 2477403 A1 | 7/2012 |
| EP | 2728865 A2 | 5/2014 |
| GB | 2479442 A | 12/2011 |
| GB | 2488830 A | 12/2012 |
| JP | 2013-138395 A | 7/2013 |
| JP | 2015-506603 A | 3/2015 |
| RU | 2072562 C1 | 1/1997 |
| RU | 2295203 C2 | 3/2007 |
| RU | 2355125 C1 | 5/2009 |
| RU | 2358319 C2 | 6/2009 |
| RU | 2406259 C2 | 12/2010 |
| RU | 2409008 C2 | 1/2011 |
| WO | 00/48341 A2 | 8/2000 |
| WO | 2008/033595 A2 | 3/2008 |
| WO | 2008/075247 A1 | 6/2008 |
| WO | 2010/113524 A1 | 10/2010 |
| WO | 2011/043797 A2 | 4/2011 |
| WO | 2011/112237 A1 | 9/2011 |
| WO | 2011/157084 A1 | 12/2011 |
| WO | 12/045269 A1 | 4/2012 |
| WO | 2012/092787 A1 | 7/2012 |
| WO | 2012-142966 A1 | 10/2012 |
| WO | 2012/155553 A1 | 11/2012 |
| WO | 2013/064661 A1 | 5/2013 |
| WO | 2013/067318 A1 | 5/2013 |
| WO | 2013/073184 A1 | 5/2013 |
| WO | 2013/109360 A2 | 7/2013 |

OTHER PUBLICATIONS

Andersson, et al., "CE8.e.5 Combination of CE8.e2 and CE8.e.3", Joint Collaborative Team on Video Coding (JCT-VC) of ITU-T SG16 WP3 and 180/IEC JTC1/SC29/WG 11, 8th Meeting: San Jose, CA, USA, Feb. 1-10, 2012.

Fu, et al., "Sample Adaptive Offset for HEVC" Multimedia Signal Processing (MMSP), 2011, IEEE 13th International Workshop on, IEEE, Oct. 17, 2011 (Oct. 17, 2011), pp. 1-5, XP032027547.

Fuldseth, A., "Replacing slices with tiles for high-level parallelism", Joint Collaborative Team on Video Coding (JCT-VC) of ITU-T SG16 WP3 and ISO/IEC JTC1/SC29/WG11, Document: JCTVC-D227, 4th Meeting: Daegu, KR, Jan. 20-28, 2011, pp. 1-6.

Laroche, et al., "On additional SAO Bad Offset classifications", Joint Collaborative Team on Video Coding (JCT-VC) of ITU-T SG16 WP3 and ISO/IEC JTC1/SC29/WG11, Document: JCTVC-G246, 7th Meeting: Geneva, CH, Nov. 21-30, 2011, pp. 1-7.

Laroche, et al., "Results on subset e.2 of CE8", Joint Collaborative Team on Video Coding (JCT-VC) of ITU-T SG16 WP3 and ISO/IEC JTC1/SC29/WG11, Document: JCTVC-H174, 8th Meeting: San Jose, CA, USA, Feb. 1-10, 2012, pp. 1-9.

Maani, et al., "Flexible Band Offset Mode in SAO", Joint Collaborative Team on Video Coding (JCT-VC) of ITU-T SG16 WP3 and ISO/IEC JTC1/SC29/WG11, Document: JCTVC-H0406, 8th Meeting: San Jose, CA, USA, Feb. 1-10, 2012, pp. 1-4.

Fu, et al., "TE10 Subtest 3: Quadtree-based Adaptive Offset", Joint Collaborative Team on Video Coding (JCT-VC) of ITU-T SG16 WP3 and ISO/IEC JTC1/SC29/WG11, Document: JCTVC-C147, 3rd Meeting: Guangzhou, CN, Oct. 7-15, 2010, pp. 1-6.

Fu, et al., "CE13: Sample Adaptive Offset with LCU-Independent Decoding", Joint Collaborative Team on Video Coding (JCT-VC) of ITU-T SG16 WP3 and ISO/IEC JTC1/SC29/WG11, Document: JCTVC-E049, 5th Meeting: Geneva, CH, Mar. 16-23, 2011, pp. 1-6.

Huang, et al., "In-Loop Adaptive Restoration", Joint Collaborative Team on Video Coding (JCT-VC) of ITU-T SG16 WP3 and ISO/IEC JTC1/SC29/WG11, Document: JCTVC-B077, 2nd Meeting: Geneva, CH, Jul. 21-28, 2010, pp. 1-11.

Fu, et al., "CE8 Subtest3: Picture Quadtree Adaptive Offset", Joint Collaborative Team on Video Coding (JCT-VC) of ITU-T SG16 WP3 and ISO/IEC JTC1/SC29/WG11, Document: JCTVC-D122, 4th Meeting: Daegu, KR, Jan. 20-28, 2011, pp. 1-10.

McCann, et al., "Samsung's Response to the Call for Proposals on Video Compression Technology", Joint Collaborative Team on Video Coding (JCT-VC) of ITU-T SG16 WP3 and ISO/IEC JTC1/SC29/WG11, Document: JCTVC-A124, 1st Meeting: Dresden, DE, Apr. 15-23, 2010, pp. 1-42.

Yamazaki, et al., "Improvement of Sample Adaptive Offset with modified bit accuracy and restricted offsets", Joint Collaborative Team on Video Coding (JCT-VC) of ITU-T SG16 WP3 and ISO/IEC JTC1/SC29/WG11, Document: JCTVC-F396r2, 6th Meeting: Torino, IT, Jul. 14-22, 2011, pp. 1-6.

Yamakage, et al., "Description of CE8: Non-deblocking loop filtering", Joint Collaborative Team on Video Coding (JCT-VC) of

(56) References Cited

OTHER PUBLICATIONS

ITU-T SG16 WP3 and ISO/IEC JTC1/SC29/WG11, Document: JCTVC-F908, 6th Meeting: Torino, IT, Jul. 14-22, 2011, pp. 1-17.

Alshina, et al.,"Non-CE1: On SAO Type sharing between color component", 9th JCT-VC Meeting, MPEG Meeting, Apr. 27, 2012-May 7, 2012, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-I0590, May 2, 2012, XP030112353.

Laroche, et al., "Non-CE1: On SAO parameters reduction for Chroma", 9th JCT-VC Meeting, MPEG Meeting, Apr. 27, 2012-May 7, 2012, Geneva, (Joint Collaborative Team on Video Coding of ISO/IEC JTC1/SC29/WG11 and ITU-T SG.16), URL: http://wftp3.itu.int/avarch/jctvc-site/, No. JCTVC-I0183, Apr. 16, 2012, XP030111946.

Minoo, et al., "Non-CE1: Coding of SAO merge left and merge up", 9th JCT-VC Meeting, MPEG Meeting, Apr. 27, 2012-May 7, 2012, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-I0507, Apr. 25, 2012, XP030112270.

\* cited by examiner

| | Descriptor |
|---|---|
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] == 5 ) { | |
|     sao_band_position[ cIdx ][ rx ][ ry ] | u(5) |
|     for( i = 0; i < 4; i++ ) | |
|       sao_offset[ cIdx ][ rx ][ ry ][ i ] | se(v) |
|   } | |
|   else if( sao_type_idx[ cIdx ][ rx ][ ry ] != 0 ) { | |
|     for( i = 0; i < 4; i++ ) | |
|       sao_offset[ cIdx ][ rx ][ ry ][ i ] | ue(v) |
|   } | |
| } | |

Figure 20A
(prior art)

| | Descriptor |
|---|---|
| sao_offset_vlc( rx, ry, cIdx ) { | |
|   sao_type_idx[ cIdx ][ rx ][ ry ] | u(3) |
|   if( sao_type_idx[ cIdx ][ rx ][ ry ] != 0 ) { | |
|     if( sao_type_idx[ cIdx ][ rx ][ ry ] == 5 ) { | |
|       sao_band_position[ cIdx ][ rx ][ ry ] | u(5) |
|     } | |
|     for( i = 0; i < 4; i++ ) | |
|       sao_offset[ cIdx ][ rx ][ ry ][ i ] | u(2) |
|   } | |
| } | |

Figure 20B

| | Descriptor |
|---|---|
| sao_offset_vlc( rx, ry, cldx ) { | |
|   sao_lcu_flag[ cldx ][ rx ][ ry ] | u(1) |
|   if(sao_lcu_flag[ cldx ][ rx ][ ry ]){ | |
|     sao_band_position_and_EO[ cldx ][ rx ][ ry ] | u(5) |
|   } | |
|   for( i = 0; i < 4; i++ ) | |
|     sao_offset[ cldx ][ rx ][ ry ][ i ] | u(2) |
|   } | |
| } | |

Figure 24

METHOD, DEVICE AND PROGRAM FOR ENCODING AND DECODING A SEQUENCE OF IMAGES USING AREA-BY-AREA LOOP FILTERING

CROSS-REFERENCE TO RELATED APPLICATIONS

The application is the National Phase application of PCT Application No. PCT/EP2012/072077, filed on Nov. 7, 2012 and titled "Method, device and program for encoding and decoding a sequence of images." This application claims the benefit under 35 U.S.C. § 119(a)-(d) of United Kingdom Patent Application Nos. GB1203285.0, filed on Feb. 24, 2012 and titled "Method and device for providing compensation offsets for a set of reconstructed samples of an image" and GB1119206.9, filed on Nov. 7, 2011 and titled "Method and device for providing compensation offsets for a set of reconstructed samples of an image" and GB1206591.8 filed on Apr. 13, 2012 and titled "Method and device for providing compensation offsets for a set of reconstructed samples of an image". The above cited patent applications are incorporated herein by reference in their entirety.

The invention concerns a method, device and program for encoding or decoding a sequence of digital images.

The invention may be applied in the field of digital signal processing, and in particular in the field of video compression using motion compensation to reduce spatial and temporal redundancies in video streams.

Many video compression formats, such as for example H.263, H.264, MPEG-1, MPEG-2, MPEG-4, SVC, use block-based discrete cosine transform (DCT) and motion compensation to remove spatial and temporal redundancies. They are often referred to as predictive video formats. Each frame or image of the video signal is divided into slices which are encoded and can be decoded independently. A slice is typically a rectangular portion of the frame, or more generally, a portion of a frame or an entire frame. Further, each slice may be divided into macroblocks (MBs), and each macroblock is further divided into blocks, typically blocks of 64×64, 32×32, 16×16 or 8×8 pixels.

In High Efficiency Video Coding (HEVC) blocks of from 64×64, to 4×4 may be used. The partitioning is organized according to a quad-tree structure based on the largest coding unit (LCU). An LCU corresponds to a square block of 64×64. If an LCU needs to be divided, a split flag indicates that the LCU is split into 4 32×32 blocks. In the same way, if any of these 4 blocks need to be split, the split flag is set to true and the 32×32 block is divided into 4 16×16 blocks etc. When a split flag is set to false, the current block is a coding unit CU. A CU has a size equal to 64×64, 32×32, 16×16 or 8×8 pixels.

There are two families of coding modes for coding blocks of an image: coding modes based on spatial prediction, referred to as INTRA prediction and coding modes based on temporal prediction (INTER, Merge, Skip). In both spatial and temporal prediction modes, a residual is computed by subtracting the prediction from the original block.

An INTRA block is generally predicted by an INTRA prediction process from the encoded pixels at its causal boundary. In INTRA prediction, a prediction direction is encoded.

Temporal prediction consists in finding in a reference frame, either a previous or a future frame of the video sequence, an image portion or reference area which is the closest to the block to be encoded. This step is typically known as motion estimation. Next, the block to be encoded is predicted using the reference area in a step typically referred to as motion compensation—the difference between the block to be encoded and the reference portion is encoded, along with an item of motion information relative to the motion vector which indicates the reference area to use for motion compensation. In temporal prediction, at least one motion vector is encoded.

In order to further reduce the cost of encoding motion information, rather than directly encoding a motion vector, assuming that motion is homogeneous the motion vector may be encoded in terms of a difference between the motion vector and a motion vector predictor, typically computed from one or more motion vectors of the blocks surrounding the block to be encoded.

In H.264, for instance motion vectors are encoded with respect to a median predictor computed from the motion vectors situated in a causal neighbourhood of the block to be encoded, for example from the three blocks situated above and to the left of the block to be encoded. Only the difference, referred to as a residual motion vector, between the median predictor and the current block motion vector is encoded in the bitstream to reduce the encoding cost.

Encoding using residual motion vectors saves some bitrate, but necessitates that the decoder performs the same computation of the motion vector predictor in order to decode the value of the motion vector of a block to be decoded.

The coding efficiency of temporal dependencies exploited by Inter coding can be further exploited by considering balance, in terms of rate and distortion, between encoded frames. One way is to set different rate distortion compromises for several consecutive frames instead of setting the same rate distortion compromise for all frames. For a group of consecutive frames, each frame is encoded with a particular balance between rate and distortion. Each compromise between rate and distortion corresponds to a level in a hierarchy of levels (compromises).

FIG. 28 shows an example of a Group of Pictures (GoP) comprising images associated with a hierarchy of rate-distortion compromises for the low delay case. As depicted on this figure, the size of image is related to the hierarchy in terms of quality. For example, images with a level equal to "2" have the biggest size and so have a higher quality than images with medium size and the level 1. The images with the smallest size (level equal to 0) have the lower quality.

Another way to evaluate the hierarchy of the images in term of rate-distortion is to consider the Quantization Parameters of the images forming the GoP 280. As seen in FIG. 28, the images with the highest quality are associated with Quantization Parameters QP. They have a level equal to 2. The images with the medium quality are associated with Quantization Parameters QP+1. They have a level equal to 1. And, the images with the lowest quality are associated with Quantization Parameters QP+2. They have a level equal to 0.

In this hierarchy, the quality (absence of distortion) has higher importance (relative to cost) in the rate-distortion compromise for higher levels compared to lower level. The effect is that an image at the top of the hierarchy (level) should have a larger quality than image with lower level. This quality is then propagated, with the help of the Inter coding mode, on the following encoded images which have a lower level in the hierarchy and which have a lower quality in terms of rate distortion compromise than the images with the higher level in the hierarchy. The compromise between rate and distortion can be fixed by the Quantization parameter or by the Lagrangian parameter (called lambda) in the rate distortion criterion or by both. Images with a lower level have a higher QP value than images with a higher level or the Lagrangian parameter is higher than for images with a higher level (It means that the rate has an higher importance (relative to the distortion) in the rate distortion compromise for lower level).

Both encoding and decoding processes may involve a decoding process of an encoded image. This process is typically performed at the encoder side for the purpose of future motion estimation which enables an encoder and a corresponding decoder to have the same reference frames.

To reconstruct the coded frame, the residual is inverse quantized and inverse transformed in order to provide the "decoded" residual in the pixel domain. The first reconstruction is then filtered by one or several kinds of post filtering processes. These post filters are applied on the reconstructed frame at encoder and decoder side in order that the same reference frame is used at both sides. The aim of this post filtering is to remove compression artifact. For example, H.264/AVC uses a deblocking filter. This filter can remove blocking artifacts due to the DCT quantization of residual and to block motion compensation. In the current HEVC standard, 3 types of loop filters are used: deblocking filter, sample adaptive offset (SAO) and adaptive loop filter (ALF).

FIG. 1 is a flow chart illustrating steps of a loop filtering process 10 of a known HEVC implementation. In an initial step 101, the encoder or decoder generates the reconstruction of the full frame. Next, in step 102 a deblocking filter is applied on this first reconstruction in order to generate a deblocked reconstruction 103. The aim of the deblocking filter is to remove block artifacts generated by residual quantization and block motion compensation or block Intra prediction. These artifacts are visually important at low bitrates. The deblocking filter operates to smooth the block boundaries according to the characteristics of two neighboring blocks. The encoding mode of each block, the quantization parameters used for the residual coding, and the neighboring pixel differences in the boundary are taken into account. The same criterion/classification is applied for all frames and no additional data is transmitted. The deblocking filter improves the visual quality of the current frame by removing blocking artifacts and it also improves the motion estimation and motion compensation for subsequent frames. Indeed, high frequencies of the block artifact are removed, and so these high frequencies do not need to be compensated for with the texture residual of the following frames.

After the deblocking filter, the deblocked reconstruction is filtered by a sample adaptive offset (SAO) loop filter in step 104. The resulting frame 105 is then filtered with an adaptive loop filter (ALF) in step 106 to generate the reconstructed frame 107 which will be displayed and used as a reference frame for the following Inter frames.

The aim of SAO loop filter and the ALF is to improve frame reconstruction by sending additional data as opposed to a deblocking filter where no information is transmitted.

The principle of SAO loop filter is to classify each pixel into a class and to add the same offset value to the respective pixel value of each pixel of the class. Thus one offset is transmitted for each class. SAO loop filtering provides two kinds of classification for a frame area: edge offset and band offset.

Edge offset classification involves determining a class for each pixel by comparing its corresponding pixel value to the pixel values of two neighboring pixels. Moreover, the two neighboring pixels depend on a parameter which indicates the direction of the 2 neighboring pixels. These directions are a 0-degree (horizontal direction), a 45-degree (diagonal direction), a 90-degree (vertical direction) and a 135-degree (second diagonal direction) and are presented in Table 1 below. In the following, these directions are called "type" of edge offset classification.

TABLE 1

| sao_type_idx | SAO type | SAO type meaning |
|---|---|---|
| 0 | none | No SAO filtering is applied on the frame area |
| 1 | edge | 1D 0 degree |
| 2 | edge | 1D 90 degree |
| 3 | edge | 1D 135 degree |
| 4 | edge | 1D 45 degree |
| 5 | band | Band offset with band position |

For the sake of illustration, the offset to be added to a pixel value (or sample) C can be determined, for a given direction, according to the rules as stated in Table 2 below wherein $Cn_1$ and $Cn_2$ designate the value of the two neighboring pixels or samples identified according to the given direction. Accordingly, when the value C is less than the two values $Cn_1$ and $Cn_2$, the offset to be added to C is $+O_1$, when it is less than $Cn_1$ or $Cn_2$ and equal to the other value ($Cn_1$ or $Cn_2$), the offset to be used is $+O_2$, when it is greater than $Cn_1$ or $Cn_2$ and equal to the other value ($Cn_1$ or $Cn_2$), the offset to be used is $-O_3$, and when it is greater than $Cn_1$ and $Cn_2$, the offset to be used is $-O_4$. When none of these conditions are met, no offset value is added to the current pixel value C.

It is to be noted that according to the Edge Offset mode, only the absolute value of each offset is encoded in the bitstream, the sign to be applied being determined as a function of the class to which the current pixel belongs to. Therefore, according to Table 2, a positive offset is associated with the classes 1 and 2 while a negative offset is associated with classes 3 and 4.

TABLE 2

| Class (J) | Conditions | Offset |
|---|---|---|
| 1 | $C < Cn_1$ and $C < Cn_2$ | $+O_1$ |
| 2 | ($C < Cn_1$ and $C == Cn_2$) or ($C < Cn_2$ and $C == Cn_1$) | $+O_2$ |
| 3 | ($C > Cn_1$ and $C == Cn_2$) or ($C > Cn_2$ and $C == Cn_1$) | $-O_3$ |
| 4 | $C > Cn_1$ and $C > Cn_2$ | $-O_4$ |
| N.A. | None of the above | N.A. |

The second type of classification is a band offset classification which depends on the pixel value. A class in SAO band offset corresponds to a range of pixel values. Thus, the same offset is added to all pixels having a pixel value within a given range of pixel values.

In order to be more adaptive to the frame content, it has been proposed to apply SAO filtering based on a quad-tree structure to encode the SAO. Consequently, the frame area which corresponds to a leaf node of the quad tree may or may not be filtered by SAO such that only some areas are filtered. Moreover, when SAO is enabled, only one SAO classification is used: edge offset or band offset according to the related parameters transmitted for each classification. Finally, for each SAO leaf node, the SAO classification as well as its parameters and the offsets of all classes are transmitted.

The main advantage of the quad-tree is to follow efficiently the local properties of the signal. However, it requires a dedicated encoding in the bitstream. Another solution replacing the quad-tree based encoding of the SAO parameters by an encoding at the LCU level can be also envisaged.

An image of video data to be encoded may be provided as a set of two-dimensional arrays (also known as colour channels) of sample values, each entry of which represents the intensity of a colour component such as a measure of luma brightness and chroma colour deviations from neutral grayscale colour toward blue or red (YUV) or as a measure of red, green, or blue light component intensity (RGB). A YUV model defines a colour space in terms of one luma (Y) and two chrominance (UV) components. Generally Y stands for the luma component (brightness) and U and V are the chrominance (colour) or chroma components.

SAO filtering is typically applied independently on Luma and on both U and V Chroma components.

A known implementation of SAO band offset splits the range of pixel values 20 into predefined 32 ranges of the same size as depicted in FIG. 2. The minimum value of the range of pixel values is systematically 0 and the maximum value depends on the bit-depth of the pixel values according to the following relationship Max=$2^{Bitdepth}$−1. For example, when the bit-depth is 8 bits, the maximum value of a pixel can be 255. Thus, the range of pixel values is between 0 and 255. For this bit-depth of 8 bits, each class includes a range of 16 pixel values. Moreover for SAO band offset, 2 groups of classes are considered. The first one contains 16 successive classes in the center of the range of pixel values as depicted in grey color in FIG. 2. The second group also contains 16 classes but on both ends of the range of pixel values as depicted in hatched in FIG. 2. For SAO band offset of a frame area, the group used for the classification and the 16 offsets are inserted in the bitstream.

FIG. 3 is a flow chart illustrating steps of a method for selecting offsets in an encoder for a current frame region 303. The frame area contains N pixels. In an initial step 301 the variables $Sum_j$ and $SumNbPix_j$ are set to a value of zero for each of the 16 ranges. j denotes the current range or class number. $Sum_j$ denotes the sum of the difference between the value of the pixels in the range j and the value of their corresponding original pixels. $SumNbPix_j$ denotes the number of pixels in the range j.

In step 302, the counter variable i is set to the value zero. Next, the first pixel of the frame area 303 is extracted in step 304. It is assumed that the current SAO group being processed is known (First or second as depicted in FIG. 2). If it is determined in step 305 that the pixel value $P_i$ is not in the current SAO group then the counter variable i value is incremented in step 308 in order to classify subsequent pixels of the frame area 303. Otherwise if it is determined in step 305 that the pixel value $P_i$ is in the current SAO group the range number (or class number) j corresponding to the value of $P_i$ is found in step 306. In subsequent step 307 the corresponding $SumNbPix_j$ variable is incremented and the difference between $P_i$ and its original value $P_i^{org}$ is added to $Sum_j$. In the following step, the counter variable i is incremented in order to apply the classification to the other pixels of the frame area 303. In step 309 it is determined whether or not all the N pixels of the frame area 303 have been classified (i.e. is i≥=N), if yes, an $Offset_j$ for each class is computed in step 310 in order to produce an offset table 311 presenting an offset for each class j as the final result of the offset selection algorithm. This offset is computed as the average of the difference between the pixel values of the pixels of class j and their respective original pixel values. The, $Offset_j$ for class j is given by the following equation:

$$Offset_j = \frac{Sum_j}{SumNbPix_j} \quad (1)$$

FIG. 4 is a flow chart illustrating steps of a decoding process 60 applying the SAO band offsets to corresponding groups of classes. This process may also be applied at encoder side in order to produce the reference frame used for the motion estimation and compensation of subsequent frames.

An initial step 401 of the process involves decoding the offset values for each class of pixel values in order to produce an offsets table 402. At the encoder side, the offsets table 402 is the result of the selection algorithm shown in FIG. 3. Thus, at encoder side, step 401 is replaced by the offset selection algorithm of FIG. 3.

In step 403 a counter variable i is set to 0. Pixel $P_i$ is extracted in step 405 from a frame area 404 which contains N pixels. In step 406 it is determined whether or not pixel $P_i$ belongs to the current group of classes.

If it is determined that pixel $P_i$ is in the current group of classes, the related class number j is identified in step 408 and the related offset value $Offset_{i,j}$ is extracted in step 409 from the offsets table 402. The extracted offset value $Offset_j$ is then added to the pixel value of $P_i$ in step 410 in order to produce the filtered pixel value $P_i'$ in step 411. The filtered pixel value is then inserted into the filtered frame area 415 in step 412 at the corresponding pixel.

If in step 406 it is determined that pixel $P_i$ is not in the SAO band offset group then the pixel value of $P_i$ is retrieved 407 and put into the filtered frame area 415 in step 412 without filtering. After step 412, the counter variable i is incremented in step 413 in order to filter, if necessary, the subsequent pixels of the current frame area 404. After it has been determined in step 414 that all the N pixels of the frame area have been processed (i.e. i≥=N) the filtered frame area 415 is reconstructed and can be added to the SAO reconstructed frame (cf. frame 105 of FIG. 1).

A drawback of the known process for selection of compensations is that it is not adapted to different variations in image pixel content and to the different types of components of image pixels.

The present invention has been devised to address one or more of the foregoing concerns.

According to a first aspect of the present invention there is provided a method of encoding a sequence of images, comprising:

performing area-by-area loop filtering on at least one image of the sequence and disabling such area-by-area loop filtering on at least one other image of the sequence.

According to a second aspect of the present invention there is provided a method of decoding a sequence of images, comprising:

performing area-by-area loop filtering on at least one image of the sequence and disabling such area-by-area loop filtering on at least one other image of the sequence.

According to a third aspect of the present invention there is provided a device for encoding a sequence of images, comprising:

means for performing area-by-area loop filtering on at least one image of the sequence and disabling such area-by-area loop filtering on at least one other image of the sequence.

According to a fourth aspect of the present invention there is provided a device for decoding a sequence of images, comprising:

means for performing area-by-area loop filtering on at least one image of the sequence and disabling such area-by-area loop filtering on at least one other image of the sequence.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Thus, according to a fifth aspect of the present invention there is provided a program which, when run on a processor or computer, causes the processor or computer to carry out the encoding method embodying the aforesaid first aspect of the present invention.

Similarly, according to a sixth aspect of the present invention there is provided a program which, when run on a processor or computer, causes the processor or computer to carry out the decoding method embodying the aforesaid second aspect of the present invention.

A seventh aspect of the present invention provides a computer-readable storage medium storing the program embodying the aforesaid fifth or sixth aspect of the present invention.

Embodiments of the invention will now be described, by way of example only, and with reference to the following drawings in which:—

FIG. 1 is a flow chart illustrating steps of a loop filtering process of the prior art;

FIG. 2 graphically illustrates a sample adaptive band offset classification of a HEVC process of the prior art;

FIG. 20A illustrates a pseudo code applied in the prior art to encode the SAO parameters at the LCU level.

FIG. 20B illustrates an improved pseudo code according to an embodiment of the invention to encode the SAO parameters at the LCU level.

FIG. 24 illustrates a pseudo code used to encode the SAO parameters in accordance with yet another embodiment of the present invention.

The main description of embodiments of the present invention is provided later in the section headed "Area-by-area loop filtering embodiments". Prior to that, embodiments of other inventions will be described and these are useful for understanding the area-by-area loop filtering embodiments.

Figure 5:
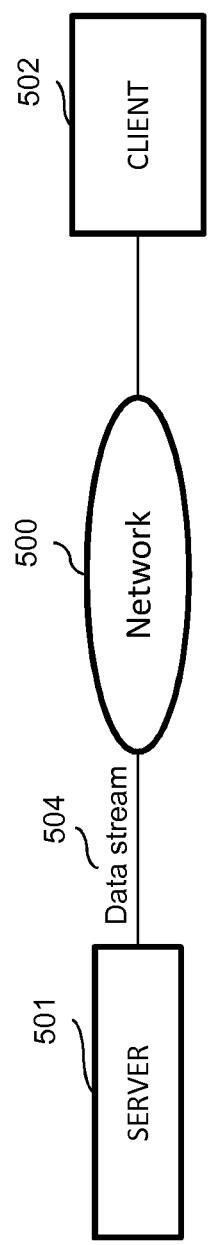
FIG. 5 is a block diagram schematically illustrating a data communication system in which one or more embodiments of the invention may be implemented.

FIG. 5 illustrates a data communication system in which one or more embodiments of the invention may be implemented. The data communication system comprises a transmission device, in this case a server 501, which is operable to transmit data packets of a data stream to a receiving device, in this case a client terminal 502, via a data communication network 500. The data communication network 500 may be a Wide Area Network (WAN) or a Local Area Network (LAN). Such a network may be for example a Such a network may be for example a wireless network (Wi-Fi (registered trademark), a technology that allows electronic devices to connect to a wireless LAN (WLAN) network / 802.11a or b or g), an Ethernet network, an Internet network or a mixed network composed of several different networks. In a particular embodiment of the invention the data communication system may be a digital television broadcast system in which the server 501 sends the same data content to multiple clients.

The data stream 504 provided by the server 501 may be composed of multimedia data representing video and audio data. Audio and video data streams may, in some embodiments of the invention, be captured by the server 501 using a microphone and a camera respectively. In some embodiments data streams may be stored on the server 501 or received by the server 501 from another data provider, or generated at the server 501. The server 501 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 502 receives the transmitted bitstream and decodes the reconstructed bitstream to reproduce video images on a display device and the audio data by a loud speaker.

Although a streaming scenario is considered in the example of FIG. 5, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 6:
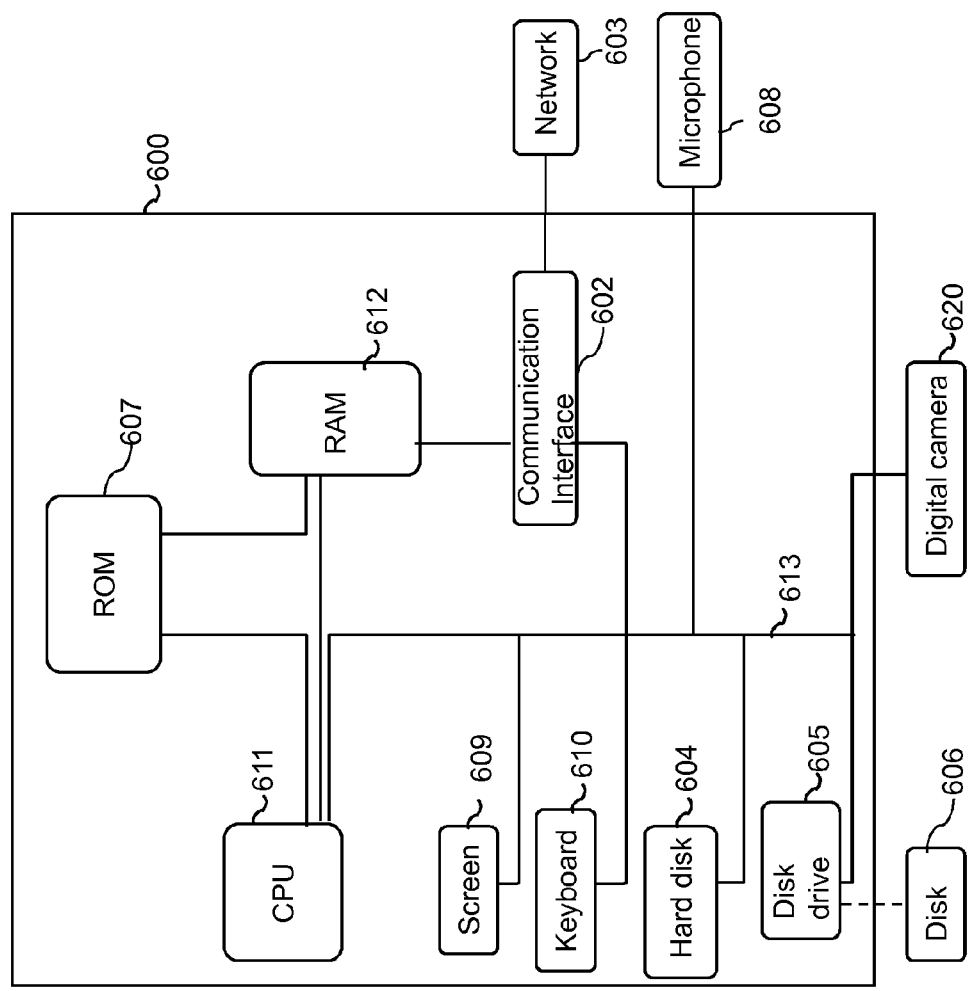
FIG. 6 is a block diagram illustrating components of a processing device in which one or more embodiments of the invention may be implemented.

FIG. 6 schematically illustrates a processing device 600 configured to implement at least one embodiment of the present invention. The processing device 600 may be a device such as a micro-computer, a workstation or a light portable device. The device 600 comprises a communication bus 613 connected to:

- a central processing unit 611, such as a microprocessor, denoted CPU;
- a read only memory 607, denoted ROM, for storing computer programs for implementing the invention;
- a random access memory 612, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 602 connected to a communication network 603 over which digital data to be processed are transmitted or received Optionally, the apparatus 600 may also include the following components:

- a data storage means 604 such as a hard disk, for storing computer programs for implementing methods of one or more embodiments of the invention and data used or produced during the implementation of one or more embodiments of the invention;
- a disk drive 605 for a disk 606, the disk drive being adapted to read data from the disk 606 or to write data onto said disk;
- a screen 609 for displaying data and/or serving as a graphical interface with the user, by means of a keyboard 610 or any other pointing means.

The apparatus 600 can be connected to various peripherals, such as for example a digital camera 620 or a microphone 608, each being connected to an input/output card (not shown) so as to supply multimedia data to the apparatus 600.

The communication bus provides communication and interoperability between the various elements included in the apparatus 600 or connected to it. The representation of the bus is not limiting and in particular the central processing unit is operable to communicate instructions to any element of the apparatus 600 directly or by means of another element of the apparatus 600.

The disk 606 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 607, on the hard disk 604 or on a removable digital medium such as for example a disk 606 as described previously. According to a variant, the executable code of the programs can be received by means of the communication network 603, via the interface 602, in order to be stored in one of the storage means of the apparatus 600 before being executed, such as the hard disk 604.

The central processing unit 611 is adapted to control and direct the execution of the instructions or portions of software code of the program or programs according to the invention, instructions that are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 7:
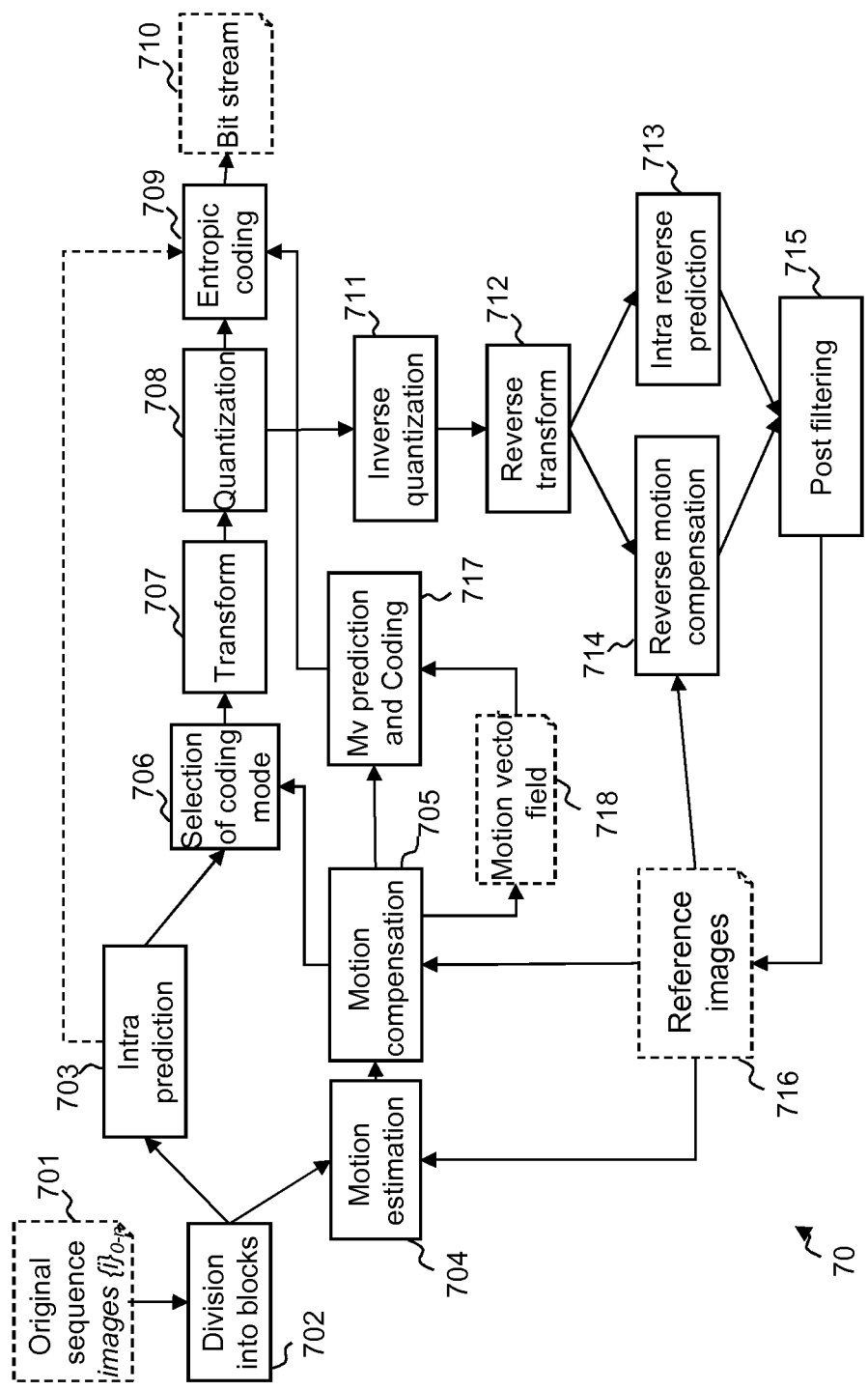
FIG. 7 is a flow chart illustrating steps of an encoding method according to embodiments of the invention.

FIG. 7 illustrates a block diagram of an encoder according to at least one embodiment of the invention. The encoder is represented by connected modules, each module being adapted to implement, for example in the form of programming instructions to be executed by the CPU 611 of device 600, at least one corresponding step of a method implementing at least one embodiment of encoding an image of a sequence of images according to one or more embodiments of the invention.

An original sequence of digital images i0 to in 701 is received as an input by the encoder 70. Each digital image is represented by a set of samples, known as pixels.

A bitstream 710 is output by the encoder 70 after implementation of the encoding process. The bitstream 710 comprises a plurality of encoding units or slices, each slice comprising a slice header for transmitting encoding values of encoding parameters used to encode the slice and a slice body, comprising encoded video data.

The input digital images i0 to in 701 are divided into blocks of pixels by module 702. The blocks correspond to image portions and may be of variable sizes (e.g. 4×4, 8×8, 16×16, 32×32, 64×64 pixels). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 703 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 704 and motion compensation module 705. Firstly a reference image from among a set of reference images 716 is selected, and a portion of the reference image, also called reference area or image portion, which is the closest area to the given block to be encoded, is selected by the motion estimation module 704. Motion compensation module 705 then predicts the block to be encoded using the selected area. The difference between the selected reference area and the given block, also called a residual block, is computed by the motion compensation module 705. The selected reference area is indicated by a motion vector.

Thus in both cases (spatial and temporal prediction), a residual is computed by subtracting the prediction from the original block.

In the INTRA prediction implemented by module 703, a prediction direction is encoded. In the temporal prediction, at least one motion vector is encoded.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 718 by a motion vector prediction and coding module 717.

The encoder 70 further comprises a selection module 706 for selection of the coding mode by applying an encoding cost criterion, such as a rate-distortion criterion. In order to further reduce redundancies a transform (such as DCT) is applied by transform module 707 to the residual block, the transformed data obtained is then quantized by quantization module 708 and entropy encoded by entropy encoding module 709. Finally, the encoded residual block of the current block being encoded is inserted into the bitstream 710.

The encoder 70 also performs decoding of the encoded image in order to produce a reference image for the motion estimation of the subsequent images. This enables the encoder and the decoder receiving the bitstream to have the same reference frames. The inverse quantization module 711 performs inverse quantization of the quantized data, followed by an inverse transform by reverse transform module 712. The reverse intra prediction module 713 uses the prediction information to determine which predictor to use for a given block and the reverse motion compensation module 714 actually adds the residual obtained by module 712 to the reference area obtained from the set of reference images 716.

Figure 8:
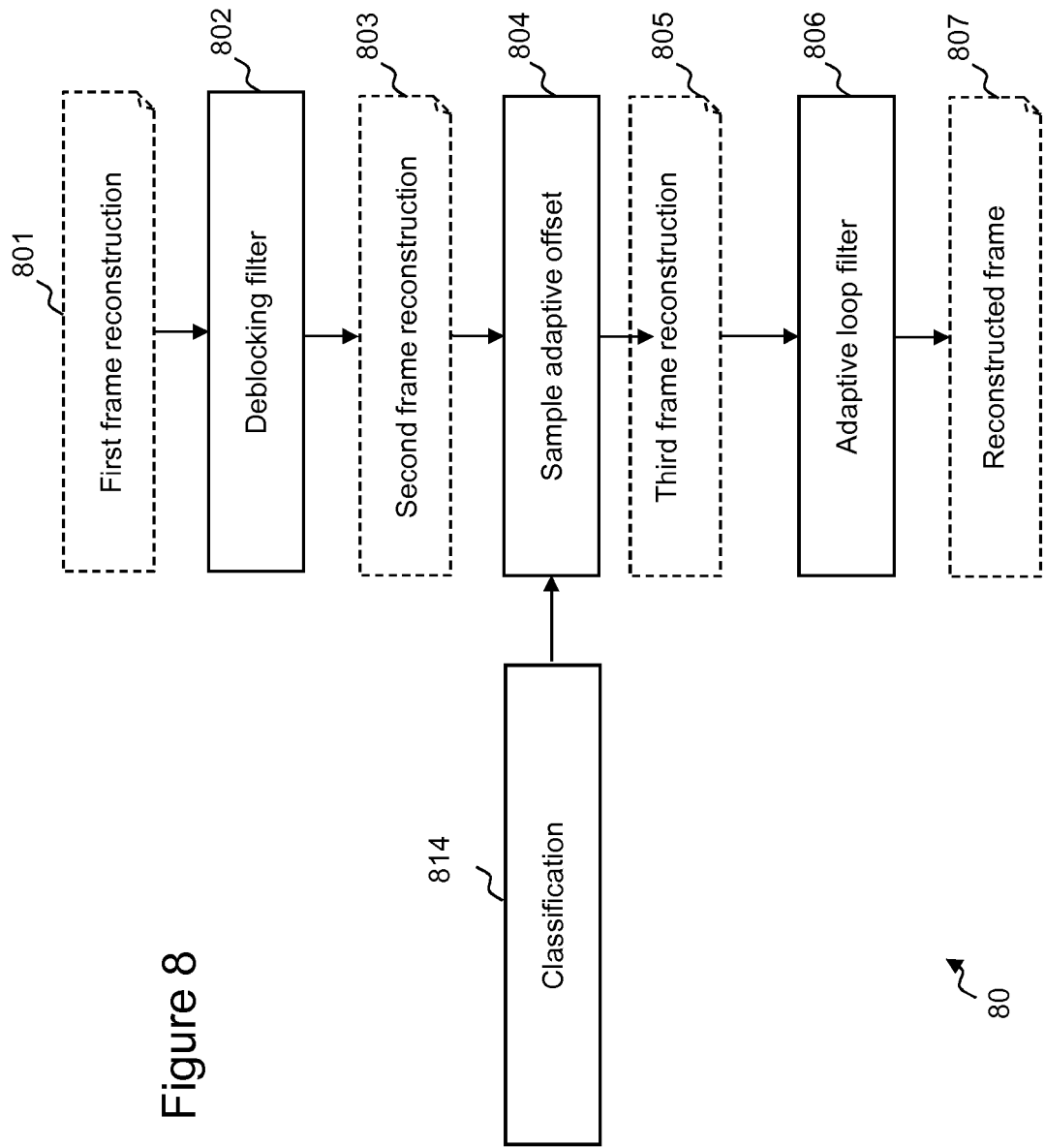
FIG. 8 is a flow chart illustrating steps of a loop filtering process of in accordance with one or more embodiments of the invention.

Post filtering is then applied by module 715 to filter the reconstructed frame of pixels. In the embodiments of the invention an SAO loop filter is used in which compensation offsets are added to the pixel values of the reconstructed pixels of the reconstructed image FIG. 8 is a flow chart illustrating steps of a loop filtering process 80 according to at least one embodiment of the invention. In an initial step 801, the encoder generates the reconstruction of the full frame. Next, in step 802 a deblocking filter is applied on this first reconstruction in order to generate a deblocked reconstruction 803. The aim of the deblocking filter is to remove block artifacts generated by residual quantization and block motion compensation or block Intra prediction. These artifacts are visually important at low bitrates. The deblocking filter operates to smooth the block boundaries according to the characteristics of two neighboring blocks. The encoding mode of each block, the quantization parameters used for the residual coding, and the neighboring pixel differences in the boundary are taken into account. The same criterion/classification is applied for all frames and no additional data is transmitted. The deblocking filter improves the visual quality of the current frame by removing blocking artifacts and it also improves the motion estimation and motion compensation for subsequent frames. Indeed, high frequencies of the block artifact are removed, and so these high frequencies do not need to be compensated for with the texture residual of the following frames.

After the deblocking filter, the deblocked reconstruction is filtered by a sample adaptive offset (SAO) loop filter in step 804 based on a classification of pixels 814 determined in accordance with embodiments of the invention. The resulting frame 805 may then be filtered with an adaptive loop filter (ALF) in step 806 to generate the reconstructed frame 807 which will be displayed and used as a reference frame for the following Inter frames.

In step 804 each pixel of the frame region is classified into a class of the determined classification according to its pixel value. A class corresponds to a determined range of pixel values. The same compensation offset value is added to the pixel value of all pixels having a pixel value within the given range of pixel values.

The determination of the classification of the pixels for the sample adaptive offset filtering will be explained in more detail hereafter with reference to any one of FIGS. 10 to 17.

Figure 9:
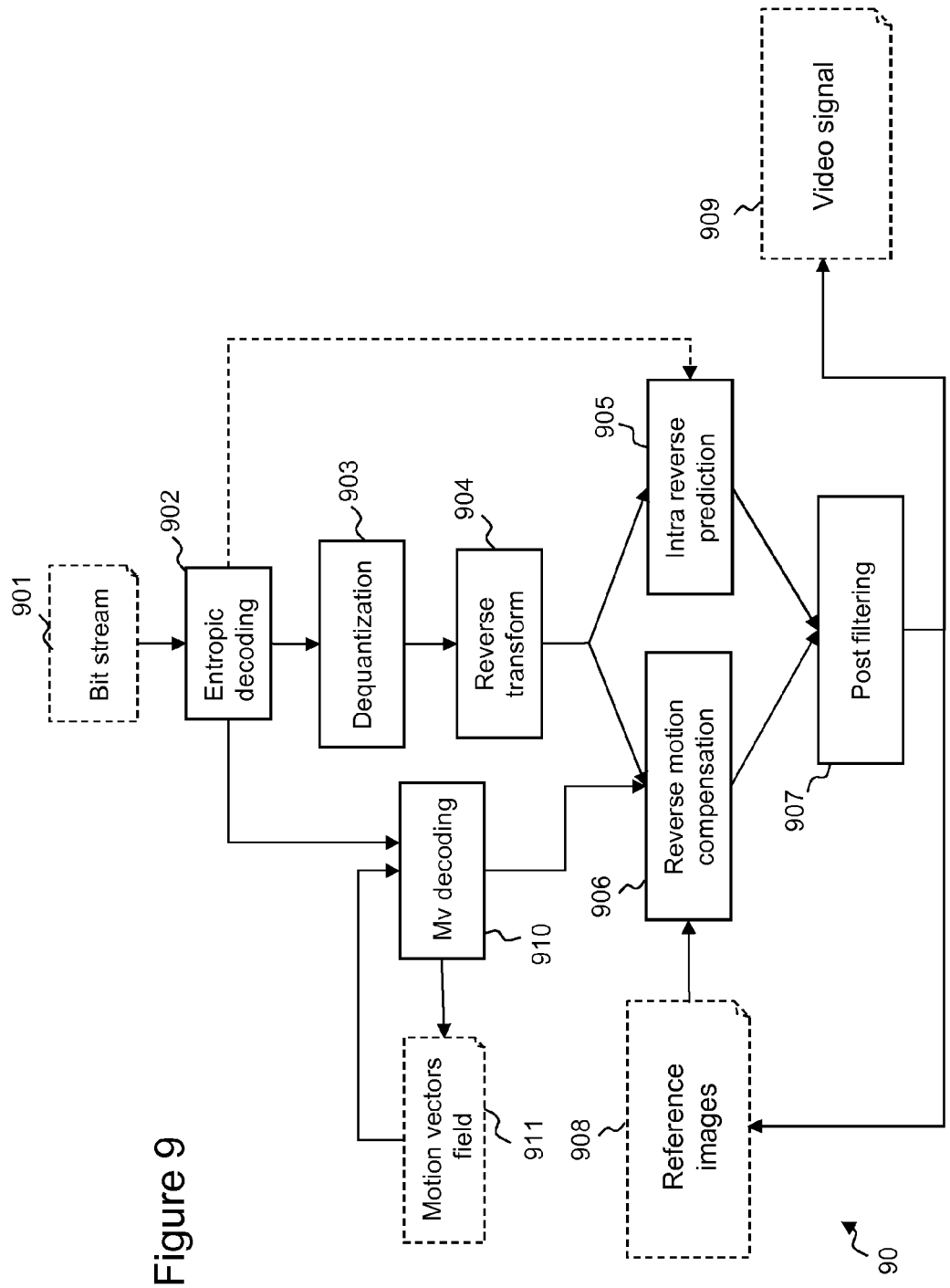
FIG. 9 is a flow chart illustrating steps of a decoding method according to embodiments of the invention.

FIG. 9 illustrates a block diagram of a decoder 90 which may be used to receive data from an encoder according an embodiment of the invention. The decoder is represented by connected modules, each module being adapted to implement, for example in the form of programming instructions to be executed by the CPU 611 of device 600, a corresponding step of a method implemented by the decoder 90.

The decoder 90 receives a bitstream 901 comprising encoding units, each one being composed of a header containing information on encoding parameters and a body containing the encoded video data. As explained with respect to FIG. 7, the encoded video data is entropy encoded, and the motion vector predictors' indexes are encoded, for a given block, on a predetermined number of bits. The received encoded video data is entropy decoded by module 902. The residual data are then dequantized by module 903 and then a reverse transform is applied by module 904 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 905 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 910.

Motion vector decoding module 910 applies motion vector decoding for each current block encoded by motion prediction. Once an index of the motion vector predictor, for the current block has been obtained the actual value of the motion vector associated with the current block can be decoded and used to apply reverse motion compensation by module 906. The reference image portion indicated by the decoded motion vector is extracted from a reference image 908 to apply the reverse motion compensation 906. The motion vector field data 911 is updated with the decoded motion vector in order to be used for the inverse prediction of subsequent decoded motion vectors.

Finally, a decoded block is obtained. Post filtering is applied by post filtering module 907 similarly to post filtering module 815 applied at the encoder as described with reference to FIG. 8. A decoded video signal 909 is finally provided by the decoder 90.

Figure 10:
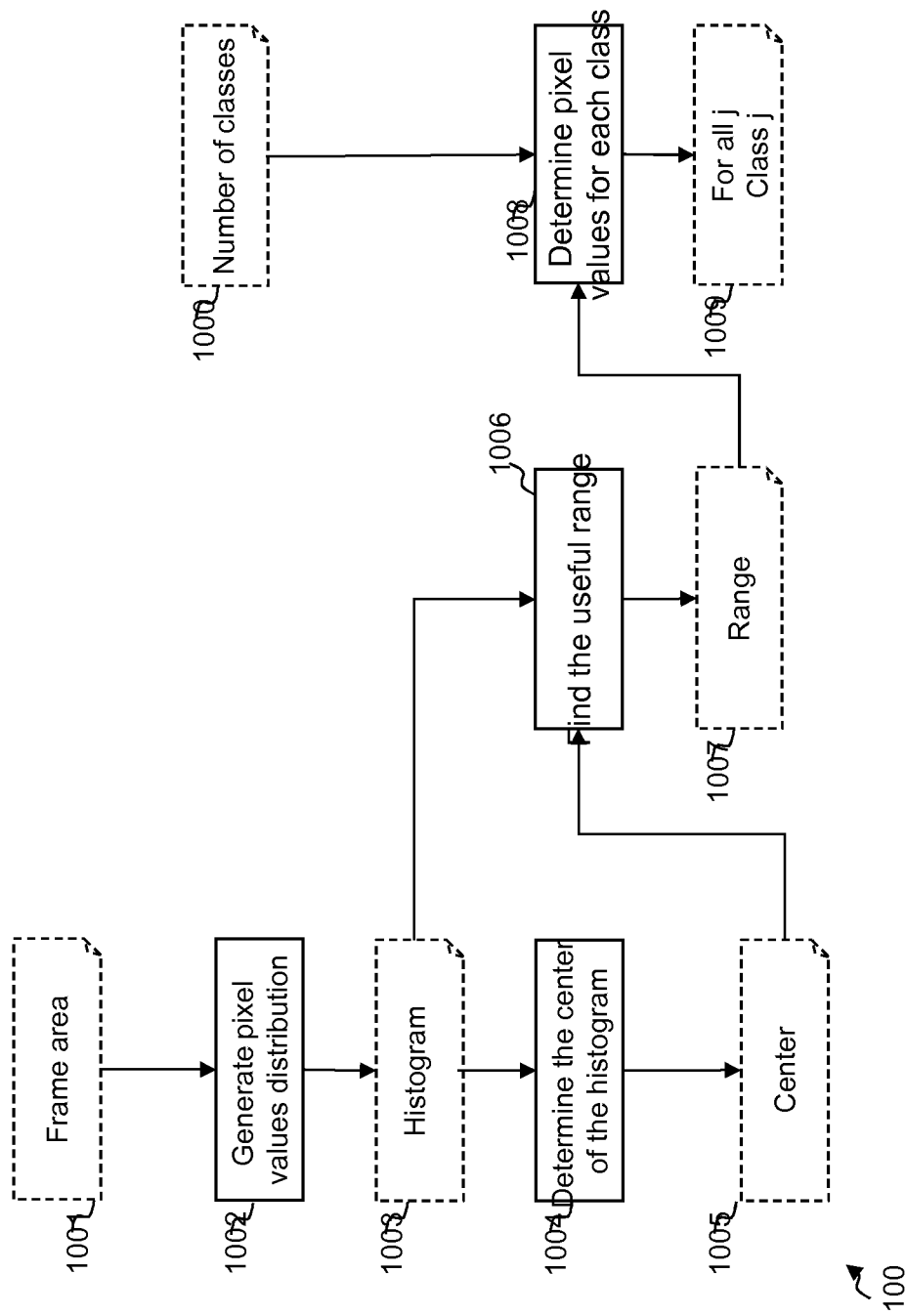
FIG. 10 is a flow chart illustrating steps of a method for determining SAO bandoffset classification according to a first embodiment of the invention.

FIG. 10 is a flow chart illustrating steps of a method 100 according to a first embodiment of the invention for classifying reconstructed pixels of an image for application of compensation offsets. In this embodiment, classes for classification of the reconstructed pixels of the frame region according to their pixel value are determined based on the statistical distribution of the reconstructed pixel values of the frame region. The center, the useful range and the amount of pixels per class are determined based on the distribution of pixel values. In this embodiment, the decoder can apply exactly the same process as the decoder for the segmentation of the distribution.

In an initial step of the process module 1002 scans a current frame area 1001 in order to determine statistical distribution of the pixel values of the pixels of the frame area 1001 and to generate a corresponding histogram 1003. In one particular embodiment this process involves updating a table which contains the number of pixels for each pixel value i.e. for each pixel value, the number of pixels having that pixel value is tabulated. The table contains a number of cells equal to MAX the maximum pixel value determined according to the expression Max=$2^{Bitdepth}$−1, based on the bit-depth of the pixels.

Module 1004 then determines the center 1005 of the generated histogram 1003. The useful range of pixel values of the histogram is then determined by module 1006 according to the distribution of the pixel values represented in histogram 1003 and where appropriate based on the center of the histogram.

Finally, the equiprobable classes defining ranges of pixel values are determined by module 1008. A table 1009 is thus provided containing the range of pixel values of each class or alternatively table which contains the pixel values of each pixel. In some embodiments of the invention the determination of equiprobable classes can depend on a pre-determined number of classes 1000.

In step 1004 various algorithms may be employed to determine the center of the generated histogram 1003. In one embodiment, the minimum value $Min_{Hist}$ and the maximum value $Max_{Hist}$ of the histogram may be found. In order to find the minimum value $Min_{Hist}$, the cells of the histogram $Hist_k$ are scanned from pixel value 0 to the first cell $Hist_k$ of the histogram which is not equal to 0. And to find $Max_{Hist}$, the cells are scanned in inverse order (from the maximum pixel value MAX to the first cell of the histogram $Hist_k$ which is not equal to 0). The center of the histogram $Center_{Hist}$, is computed as follows:

$$Center_{Hist}=(Max_{Hist}-Min_{Hist})/2+Min_{Hist}$$

In an alternative embodiment, the center of the histogram is considered to be the weighted average center of the distribution. If it is considered that the value of histogram cell $Hist_k$ is the number of pixels which have the value k, $Center_{Hist}$ is computed as follows:

$$Center_{Hist} = \frac{\sum_{k=0}^{MAX} k \times Hist_k}{N}$$

where N is the number of pixels in the current frame area.

In step 1006 one potential technique for determining the useful range of the generated histogram is to select $Min_{Hist}$ and $Max_{Hist}$ described above for both ends of the useful range.

In another embodiment the minimum value of the histogram $Min_{range}$ is determined by a scanning from 0 to the first $Hist_k$ which has a value superior to a threshold α. In the same way, $Max_{range}$ is determined by inverse scanning from the maximum pixel value MAX to the first $Hist_k$ which is superior to a threshold α. The threshold a may be a predetermined value. Alternatively the threshold α may depend on the number of pixels in the frame area and/or on the component type of the input signal (Chroma and Luma).

In one particular embodiment, it may be considered that the number of classes is known at the encoder and decoder side. The number of classes of pixel values may depend, for example, on the number of pixels in the current frame area according to each component (Luma, Chroma U and V).

In order to produce equiprobable classes, the number of pixels $NbPix_{Range}$ in the useful range 1007 is defined. The number of pixels in the useful range $NbPix_{Range}$ is determined by scanning each histogram cell $Hist_k$ from k=$Min_{Range}$ to k=$Max_{Range}$. Then, the determined number of pixels in the useful range, $NbPix_{Range}$, is divided by the number of classes 1000 to determine the optimal number of pixels in each class $NbPix_{classes}$.

Figure 11:
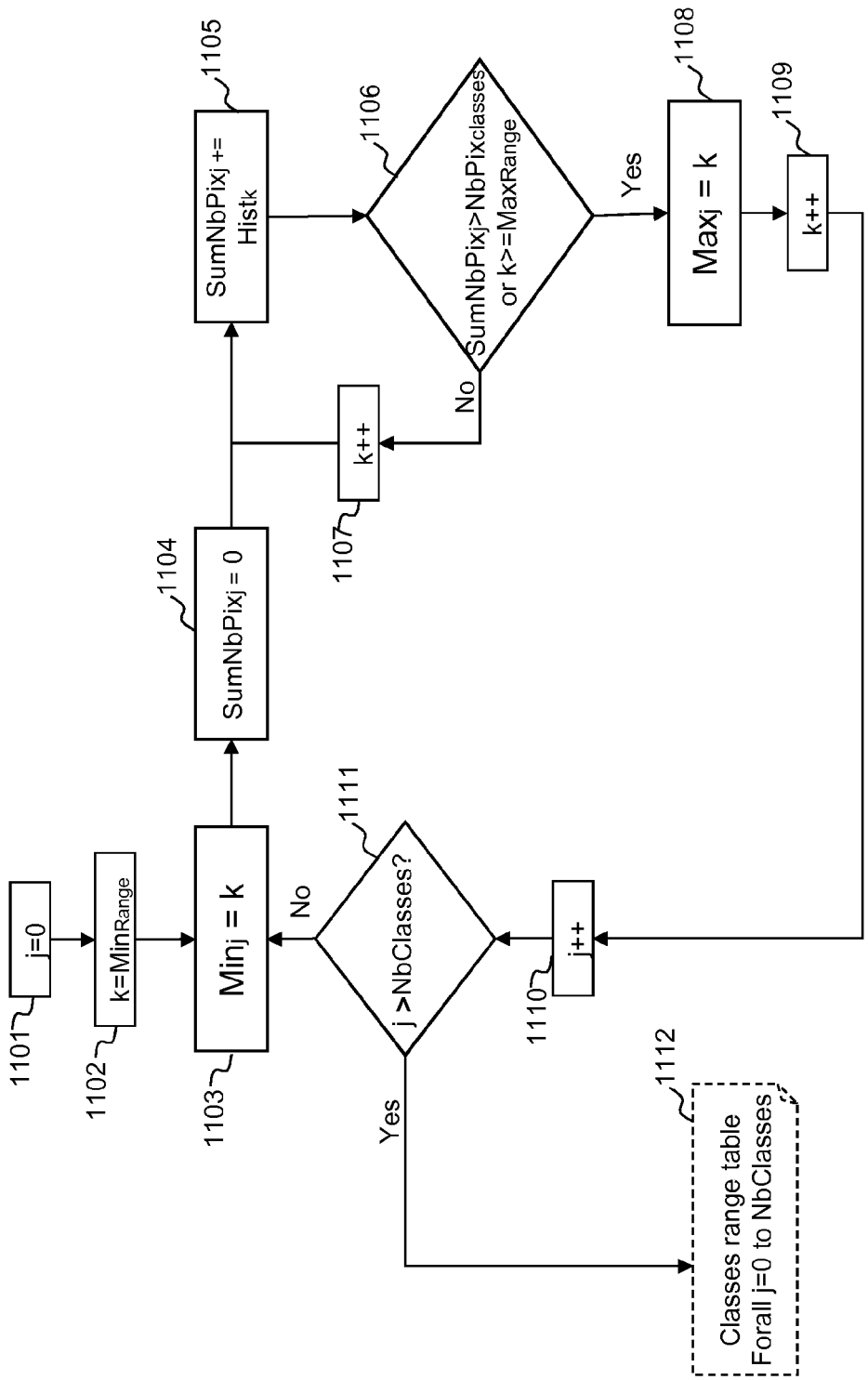
FIG. 11 is a flow chart illustrating steps of a method for determining adapted classification according to an embodiment of the invention.

FIG. 11 is a flow chart illustrating steps of an algorithm 110 for determining equiprobable classes according to an embodiment of the invention. In an initial step 1101, the number of classes j is set to 0 and in step 1102 the current pixel value k is set to $Min_{Range}$. For equiprobable classification, a class is identified by its range of pixel values. The class number j is thus identified by its range $\lfloor Min_j;Max_j \rfloor$ from its minimum pixel value $Min_j$ to its Maximum pixel value $Max_j$.

In step 1103, the minimum pixel value $Min_j$ of current class indexed by j is set to the current pixel value k. Then $SumNbPix_j$ is set to 0 in step 1104. $SumNbPix_j$ corresponds to the number of pixels in the range j. Then, the number of pixels having pixel value k ($Hist_k$) is added to $SumNbPix_j$ in step 1105. In step 1106 it is determined whether or not the sum of the number of pixels for the current class j $SumNbPix_j$ is superior to the number of pixels in classes NbPix$_{classes}$. If this condition is not reached, the k value is incremented in step 1107 and the number of pixels Hist$_k$ for the pixel value k is added to SumNbPix$_j$ in step 1105. If it is determined that SumNbPix$_j$>NbPix$_{classes}$ or if k reaches the maximum value of the useful range Max$_{Range}$, the maximum value for the current class j is equal to the current value of k in step 1108. At this stage, class j is defined—i.e. the range [Min$_j$;Max$_j$] of class j has been determined. The variable k is incremented in step 1109 in order to avoid obtaining the same pixel value in more than one class. Moreover, the variable j is also incremented in step 1110 in order to define the range of pixel values for the next class. If the variable j is superior to the number of classes NbPix$_{classes}$, then it may be considered that all classes have been defined in step 1112.

Figure 1:
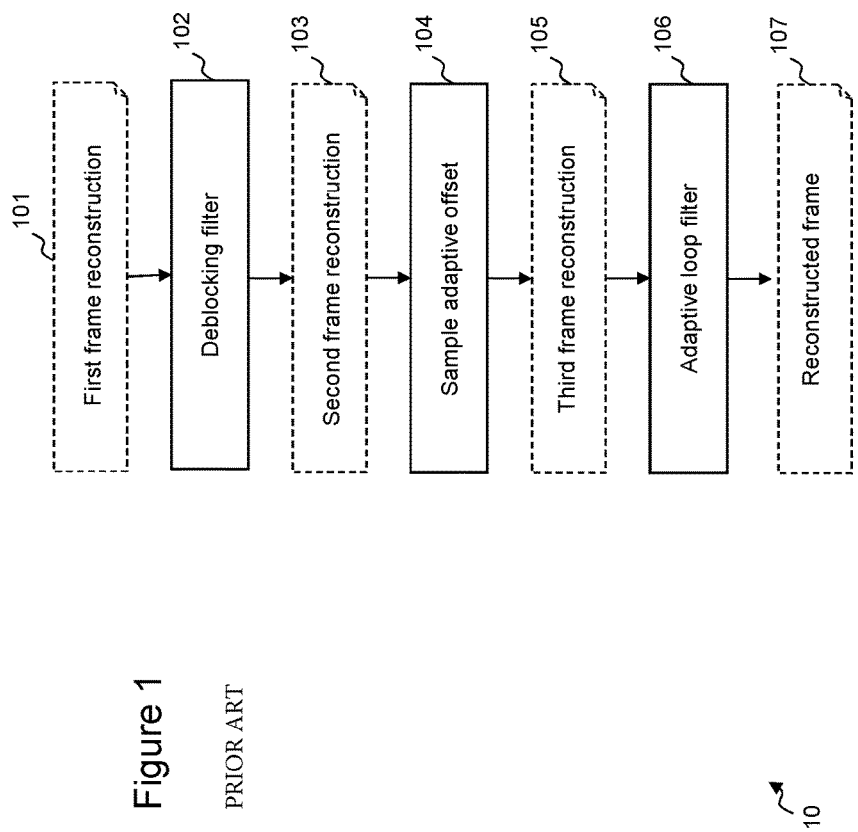
Figure 2:
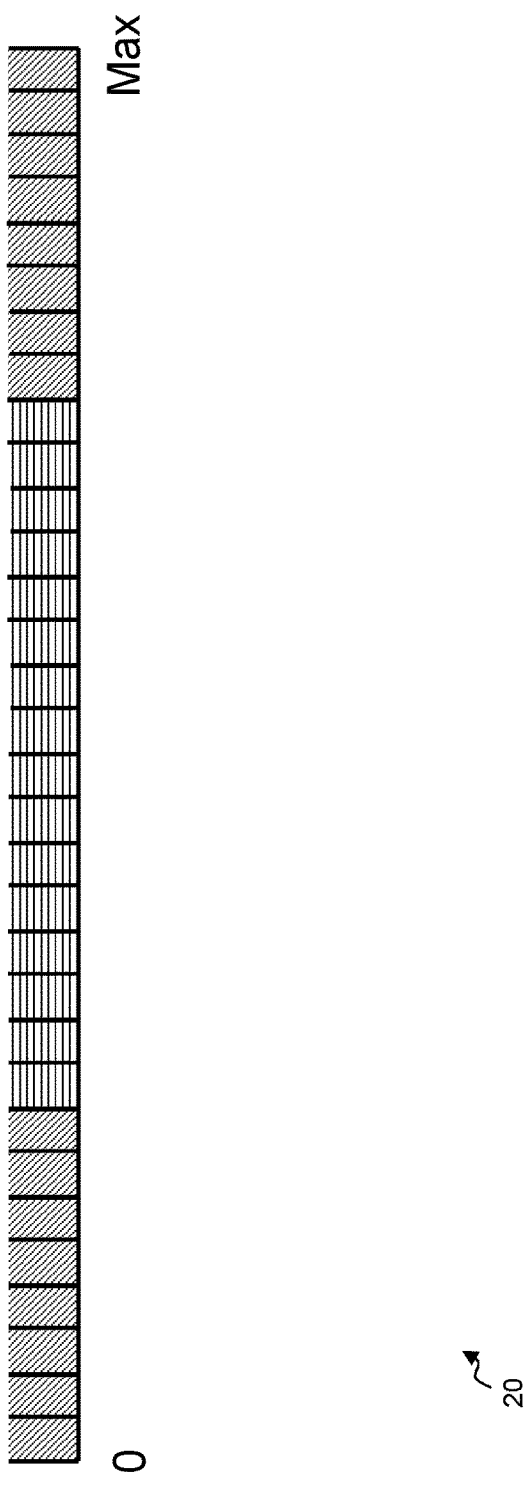
Figure 3:
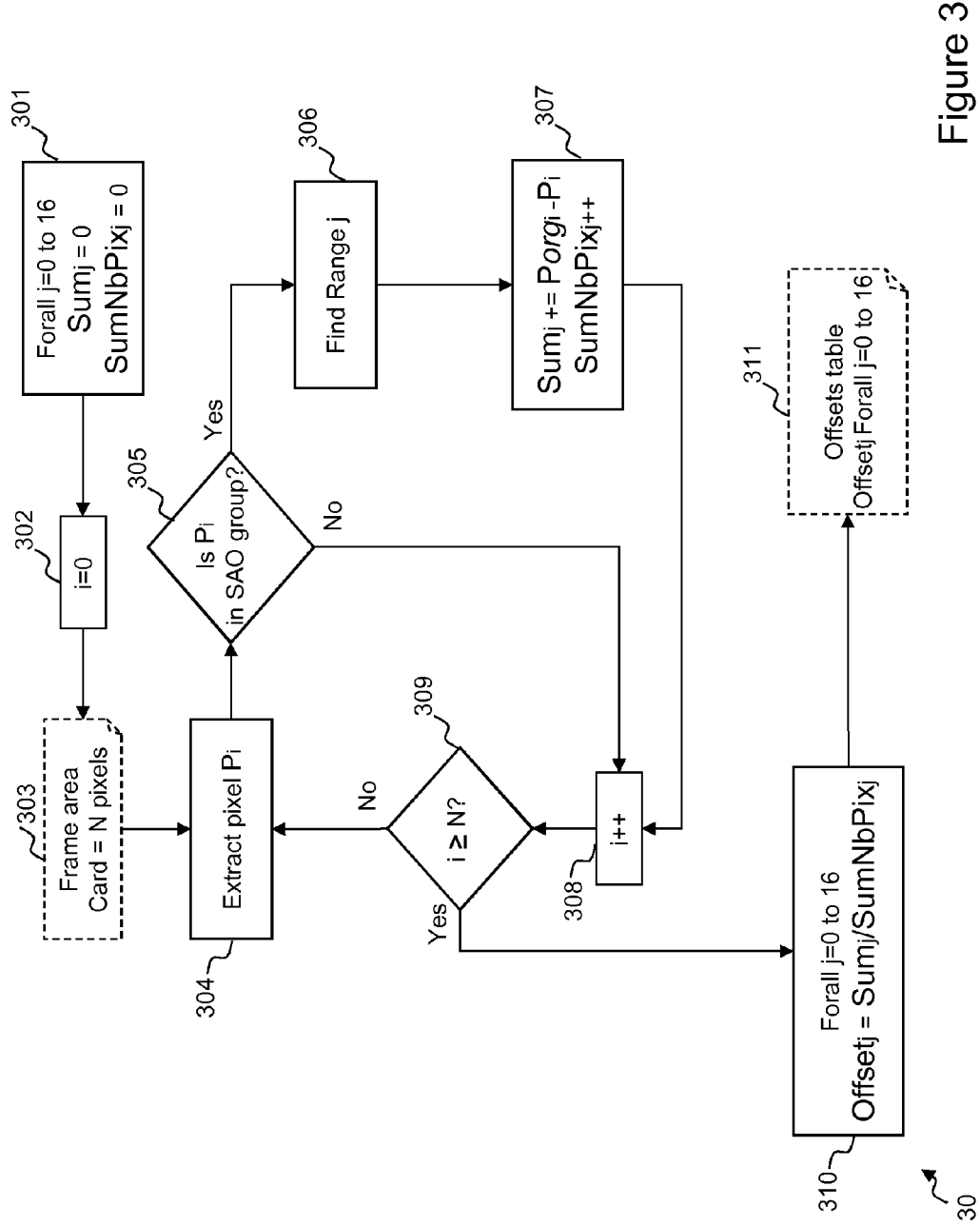
FIG. 3 is a flow chart illustrating steps of a process for determining compensation offsets for SAO band offset of HEVC.
Figure 4:
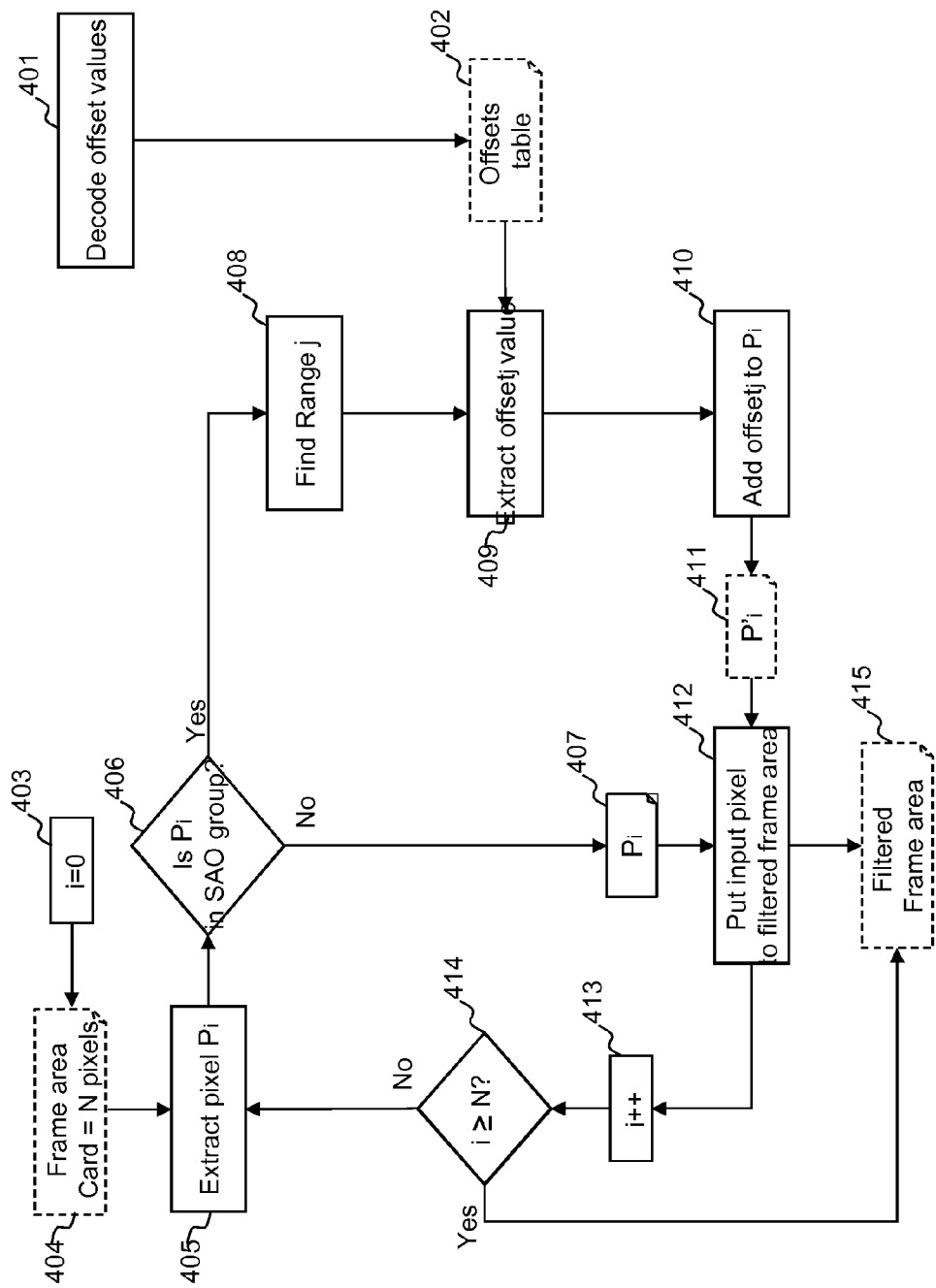
FIG. 4 is a flow chart illustrating steps of a SAO band offset filtering process of HEVC.

As a consequence the encoder will determine the offset value for each class j as described in relation to FIG. 3 and transmit it to the decoder. The encoder and decoder will filter the frame area as described in reference to FIG. 4.

It may be noted that in this embodiment, the number of classes NbClasses does not depend on the pixel values because the number of classes is pre-determined based on a syntax value. Consequently in this embodiment, the parsing of the SAO band offset is independent of the decoding of the other frames. It may be noted that the parsing for SAO band offset includes the parsing of each offset.

In a further embodiment for determining equiprobable classification, the number of classes can be determined according to the distribution of pixel values in the generated histogram. Indeed, when the amplitude of the useful range is high or low, the number of classes should have an impact on the coding efficiency. Consequently, a better adaptable classification may be provided by determining the number of pixels in each class as well as the number of pixel values.

Figure 12:
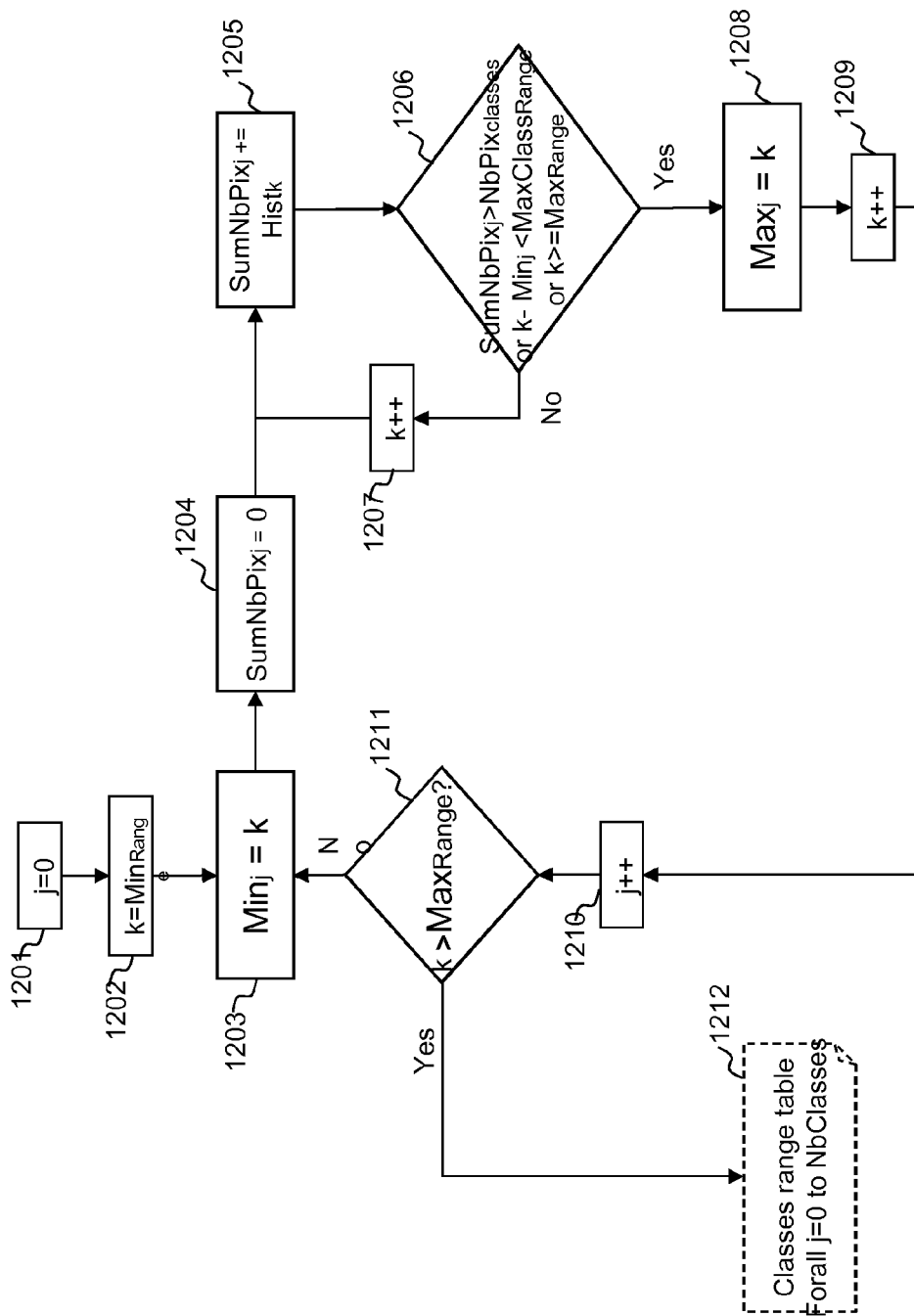
FIG. 12 is a flow chart illustrating steps of a method for determining adapted classification according to an alternative embodiment of the invention.

FIG. 12 is a flow chart illustrating steps of an algorithm 120 according to a further embodiment for providing a more adaptable classification. This flow chart is based on the flow chart of the embodiment of FIG. 11 where like end numbered modules 12xx in FIG. 12 perform equivalent functions to modules 11xx in FIG. 11. However decision modules 1206 and 1211 of this embodiment operate different test conditions from the test conditions operated by corresponding modules 1106 and 1111 of FIG. 11.

In this embodiment decision module 1206 stops the loop based on k values and selects Max$_j$ for class j, if SumNbPix$_j$>NbPix$_{classes}$ OR if k reaches the maximum value of the useful range Max$_{Range}$ OR if k−Min$_j$ is strictly lower than the maximum range for a class (MaxClass$_{Range}$). k−Min$_j$ corresponds to the number of pixel values in the current range of class j. MaxClass$_{Range}$ is a predetermined maximum number of pixel values in the range. This range may depend on the bit-depth, the number of pixels N in the frame area and the type of signal (Luma, Chroma U and V). For example, when the bit-depth is 8, MaxClass$_{Range}$ for Luma component could be equal to 16 as in a HEVC implementation.

The advantage of the embodiment of FIG. 12 compared to that of FIG. 11, is that it's coding efficiency for a pixel value distribution with large amplitude. This embodiment is more adaptable to the distribution.

It may be noted that in this embodiment, the determined number of classes depends on the pixel values, and so the parsing of the current frame depends on the decoding of the previous frames. In order to be more robust to transmission errors, the number of classes NbClasses is inserted into the bitstream. The transmission of such data has an insignificant impact on coding efficiency.

The main advantage of the first embodiment of classification of FIGS. 10 to 12 is that the classification is adapted to the pixel values distribution. Moreover the center, the useful range and the size of each class and their amount do not need to be transmitted. Consequently as in the known HEVC implementation no additional data apart from data representative of the offset of each class needs to be transmitted for the determined classification.

A further embodiment of the invention for determining a classification and which involves signaling of parameters of the classification will now be described with reference to FIG. 13. The purpose of the further embodiment of classification is to provide an optimal classification of the distribution of pixel values. The difference compared to the previous embodiment is that the classification is not directly determined based on the distribution of pixel values but on rate distortion criterion. In the further embodiment, the encoder selects the classification, best adapted to the pixel values distribution, from among predefined potential classifications. This selection is based on the rate distortion criterion. As in previous embodiments, the center, the useful range and the size of classes of the generated histogram representing the distribution of pixel values are determined. In the further embodiment these parameters are transmitted in the bitstream. In order to minimize the impact of the transmission of such data, the sizes of the classes and the related ranges are selected from among predefined values. Consequently, the encoder inserts the center of the selected classification, the index related to the selected classification and the sizes of the classes of the classification into the bitstream.

Figure 13:
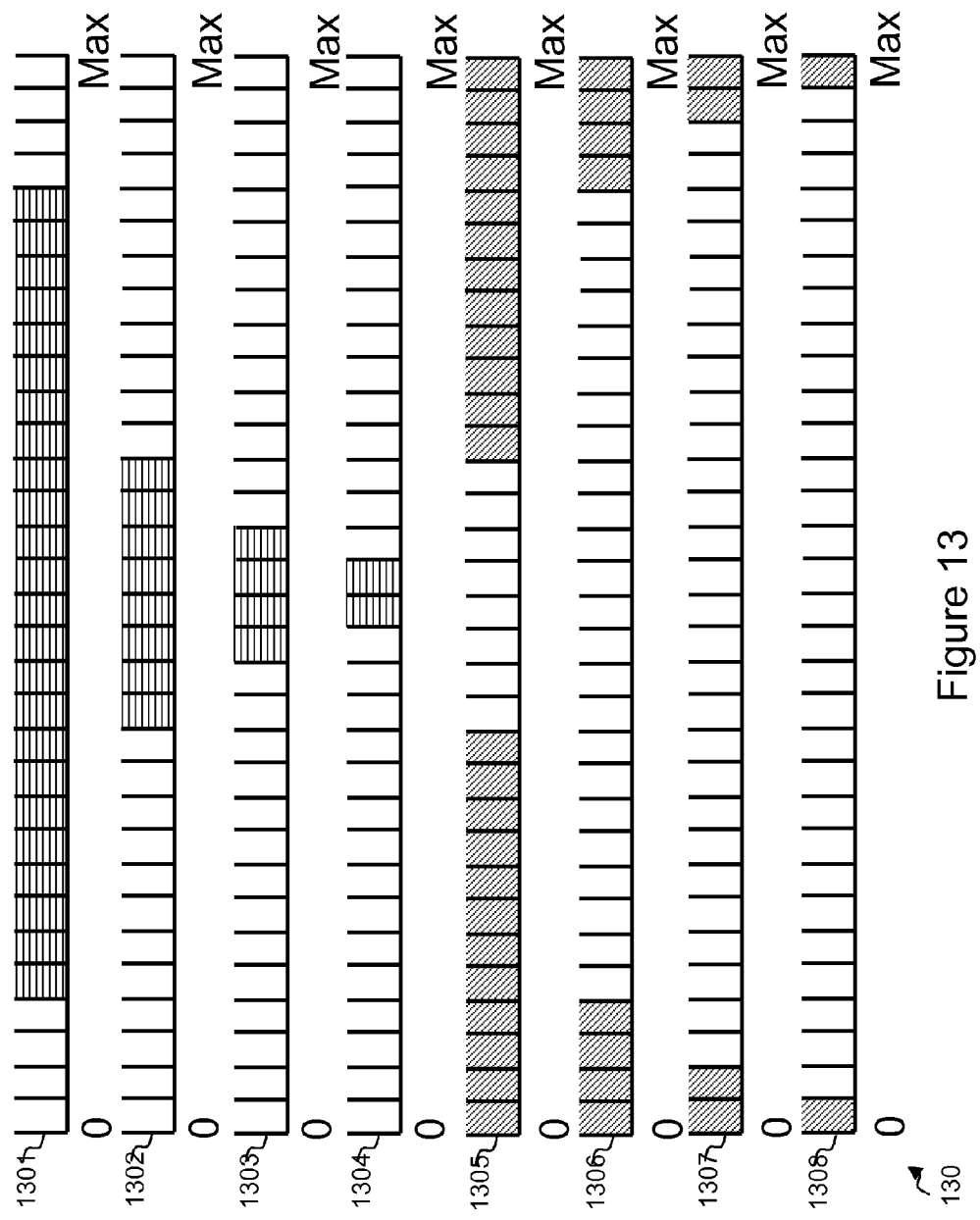
FIG. 13 illustrates several sizes of the useful range for classification in accordance with an embodiment of the invention.

To provide an adaptation to the distribution of pixel values, several sizes of pixel value ranges are defined as depicted at 130 in FIG. 13. In FIG. 13, the full range of pixel values is divided into 32 sub-ranges. For a first group of classes relating to pixel values located in the center of the range of pixel values, 4 examples are represented 1301, 1302, 1303, 1304. The first example 1301 contains 26 ranges out of the potential 32 ranges. Thus, the useful range 1301 represents $^{13}/_{16}$th of the full range.

In the same way, the useful range 1302 represents only 8 ranges out of 32 potential ranges, i.e. ¼of the full range, 1303 represents ⅛th of the full range and 1304 ¹⁄₁₆th of the full range. For the proposed scheme, all possible sizes from the full range to a range corresponding to only one pixel value may be considered. The number of possible useful ranges should be pre-determined according to the coding efficiency or to the pre-determined for the number of pixels in the frame area.

FIG. 13 also shows several examples of sizes for the second group of classes relating to pixel values located at the edges of the range of pixel values. The second group includes two sub-group of classes, one located towards each edge of the histogram. Examples 1305, 1306, 1307, 1308 represent respectively the same number of pixel values as examples 1301, 1302, 1303, 1304 of the first group.

Figure 14:
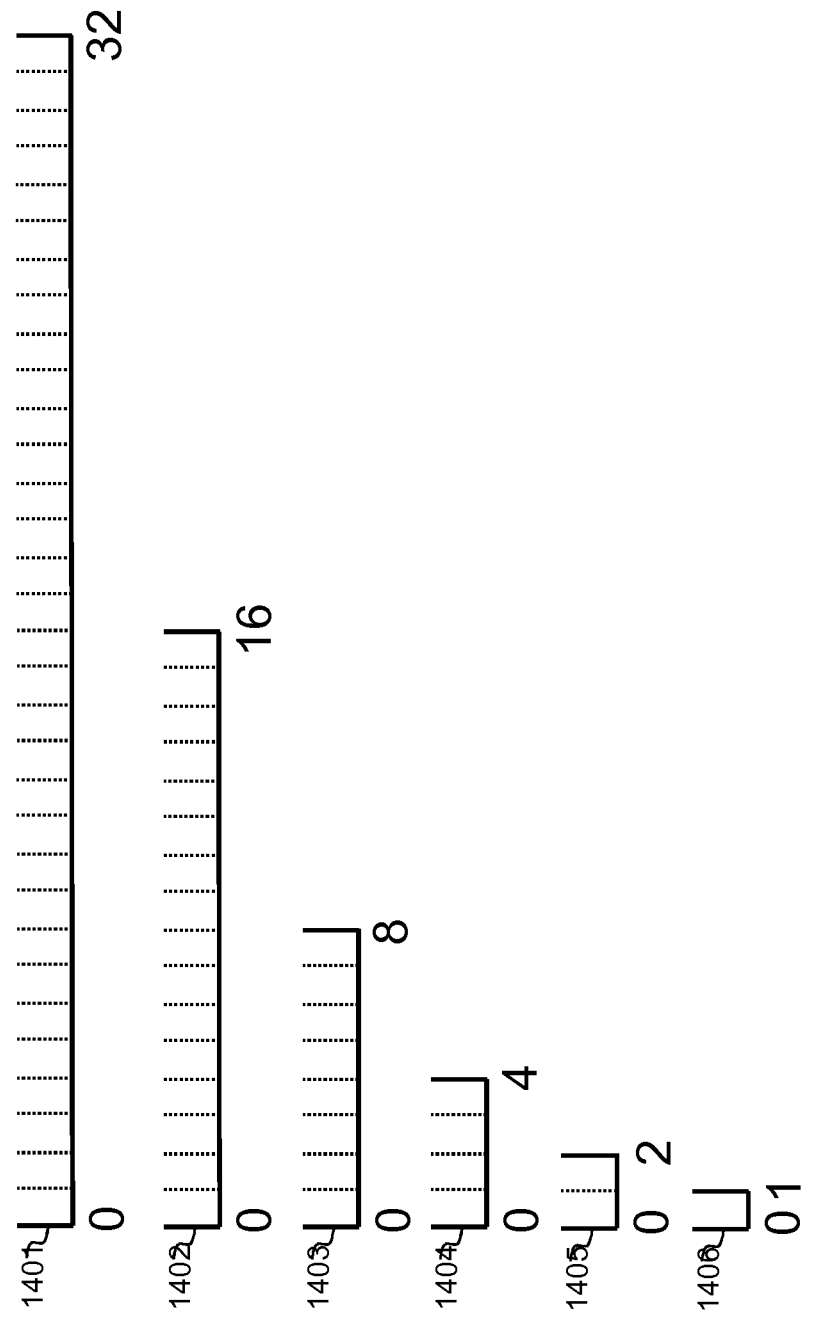
FIG. 14 illustrates several sizes of classes for the classification in accordance with an embodiment of the invention.

In embodiments of the invention, the size of classes i.e. the range of pixel values per class, is not fixed, compared to prior art methods. FIG. 14 shows examples 140 of several sizes 1401 to 1406. In this example, the class sizes are from 32 pixels 1401 to only 1 pixel 1406. These class sizes could be combined with all the possible useful ranges as described previously in relation to FIG. 13. In this embodiment, it is considered that all classes have the same size for a specific range of pixel values. Thus, for a group, data representative of the useful range size and the size of classes are inserted into the bitstream.

In another embodiment, the sizes of classes for a given useful range are adapted according to the position of the class in the useful range. More precisely, the sizes of the class are adapted to the distribution of the pixel values. In the further embodiment, these sizes are predetermined for each useful range according to the pixel value distribution. Indeed, the histogram of the pixel value distribution generally corresponds to a Gaussian distribution. The closer to the center of the histogram a pixel value is, the more numerous the pixels having a pixel value close to this value are. It means that a histogram cell $Hist_k$ close to the center has a greater value (number of corresponding pixels) than a histogram cell $Hist_k$ at both ends of the useful range of the histogram.

Figure 15:
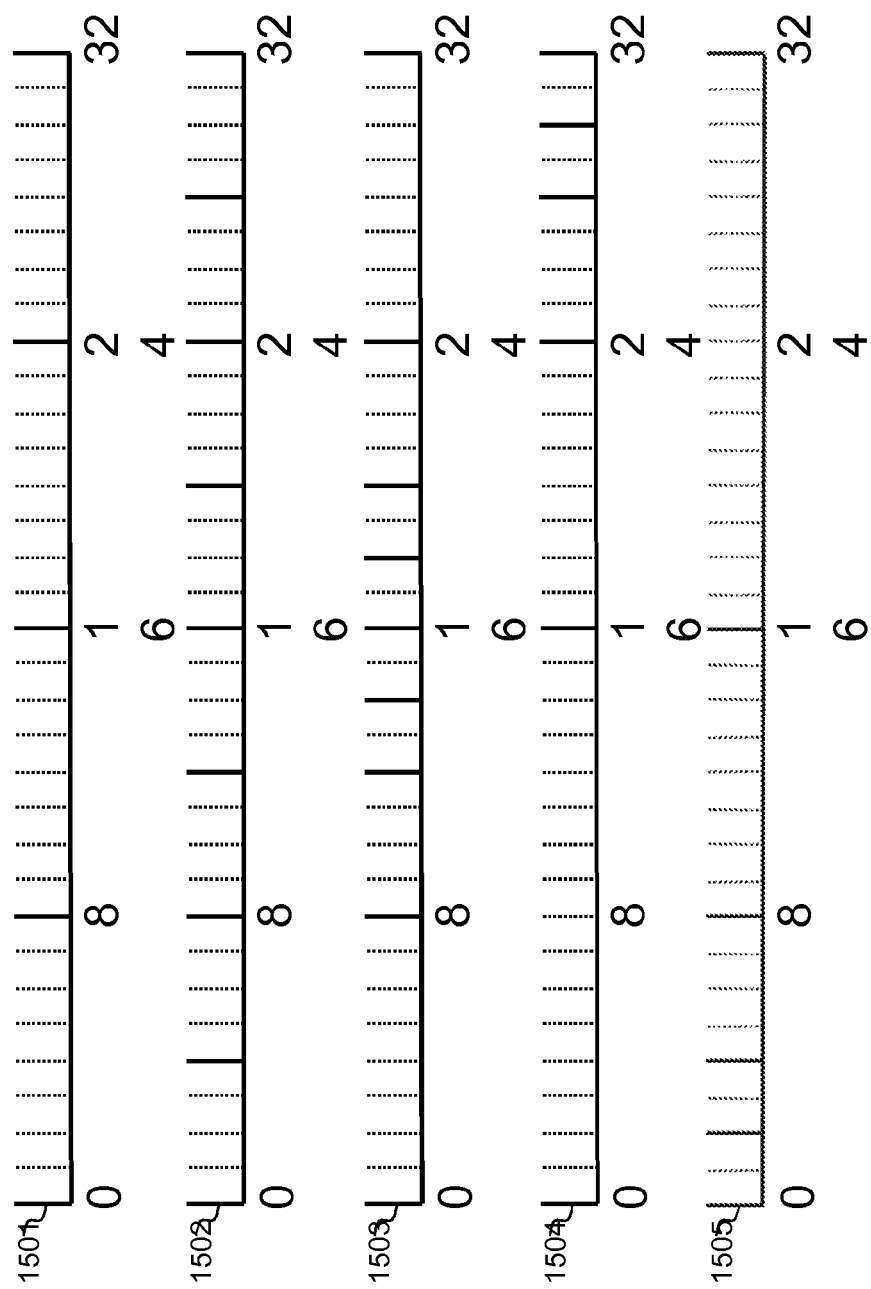
FIG. 15 illustrates several sizes of classes in a useful range for the classification in accordance with an embodiment of the invention.

FIG. 15 shows examples 150 of the two described embodiments for the sizes of classes. Example 1501 represents a fixed size of 8 pixel values for a useful range of 32 pixel values. 1502 represents a fixed size of 4 pixel values for the same useful range size.

Example 1503 illustrates the other embodiment for adaptive sizes of classes for a current range of 32 pixel values. In this example, the classes at both ends of the useful range are larger i.e. have a wider range of pixel values, than the classes in the center with respectively 8 pixel values and 2 pixel values. Between these classes, the 2 other classes have a range of 4 pixel values.

The sizes of classes for the second group can also be adapted to the distribution of pixel values. The aim of the second group of the current HEVC implementation is to exploit only the two ends of the histogram. Indeed, both ends of the histogram contain the extreme values which are often related to high frequencies where the error (due to the lossy coding) is usually higher compared to low frequencies. In the same way as in the first group, several sizes of classes can be tested for the useful ranges of the second group. In that case, for the two sub-groups of the second group, subdivisions 1501 and 1502 can be compared with the rate distortion criterion.

Moreover, the embodiment in which the sizes of classes are adapted may be applied. Example 1504 illustrates the proposed adapted sizes of classes for the first range (left) of the second group. And example 1505 illustrates the proposed adapted sizes of classes for the second sub-group (right) of the second group. In that case, the classes contain more pixel values at both ends than the classes close to the center.

The aim of the second group is to exploit both ends of the histogram; consequently, it is sometimes useful to use an inverse adaptation of sizes for the second group. In that case, example 1504 is used for the second sub-group (right) and example 1505 is used for the first sub-group (left) of the second group. In this embodiment, the classes contain less pixel values at both ends than the classes close to the center. In that case, the aim is not to produce an equiprobable classification of classes but to find a better segmentation of both ends of the second group.

Since the statistical distribution of pixel values is not necessarily centered in the middle of the full range of pixel values, a center of the distribution based on the useful range should to be determined and transmitted in the bitstream with the image data.

Figure 16:
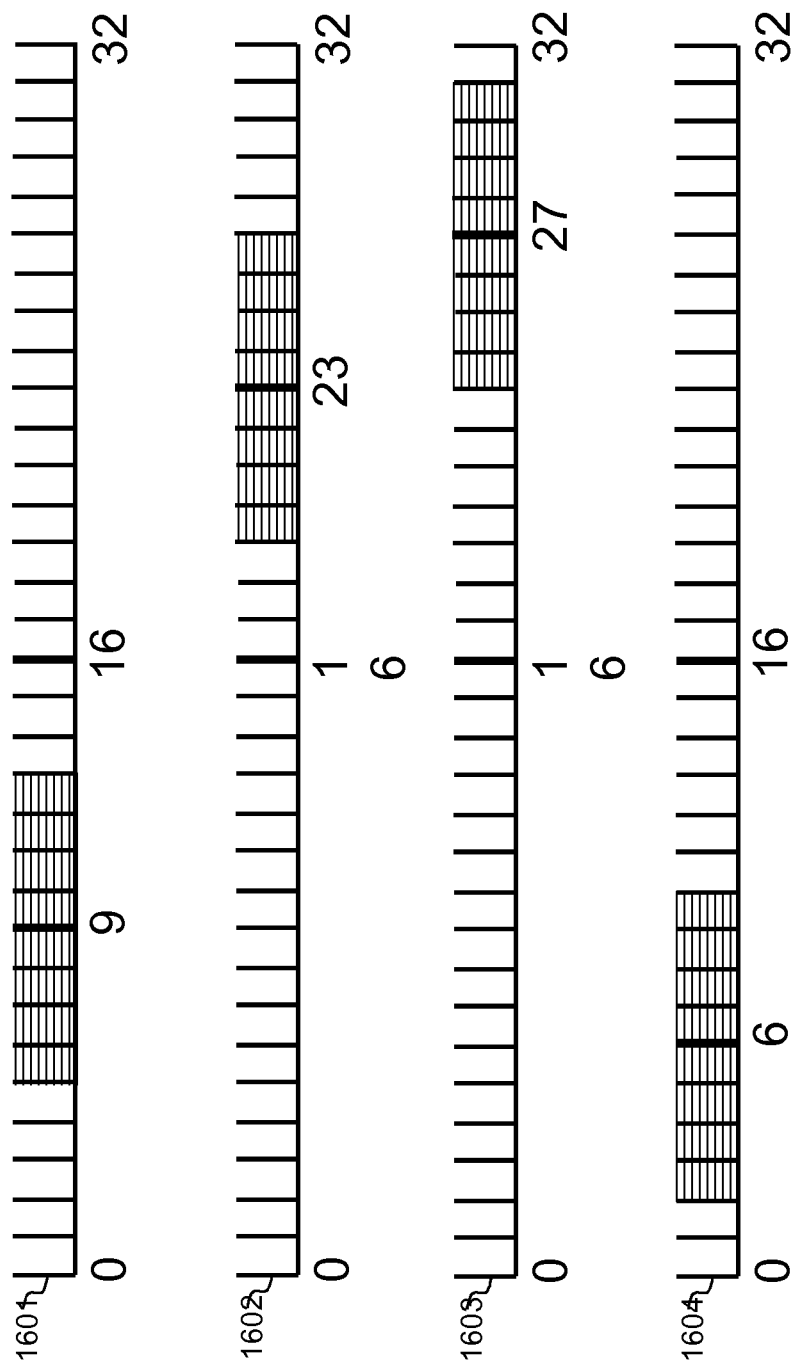
FIG. 16 illustrates several center positions of a useful range of a first group for the classification in accordance with an embodiment of the invention.

FIG. 16 shows an example 160 of a full range with different center positions for a useful range corresponding to one quarter of the full range. As opposed to the example 1302 of FIG. 13, for the four examples of FIG. 16, 1601, 1602, 1603, 1604 the center of the useful range is not located in the center of the full range. This solution allows the selected classification to be adapted to the distribution of the pixel values.

The determined center can then be coded for transmission in the bitstream. Several techniques can be envisaged for coding of the data.

If it is considered that the bit-depth of the current frame area is 8 bits, the number of positions that could be considered for the center value corresponds to 256 minus the size of the minimum useful range. For example, compared to FIG. 13, the minimum size of the useful range is equal to 2 and these 2 classes may contain at least 1 pixel. So for this specific example, the center can take a value between 1 to 254, thus 254 positions may be considered for the center.

Another solution is to quantify the center value. In one embodiment, the center is coded according to the size of classes. Thus, for example if the size of classes (or the minimum size of all classes of a current useful range when the adapted class size scheme is used) is equal to one pixel value, the center is not quantified and can be all possible center positions for the current useful range. If the size of the classes is 16 pixel values, as depicted in FIG. 16, only the pixel values every 16 pixel values can be considered. Thus, in FIG. 16, the center for examples 1601, 1602, 1603 and 1604 are respectively 9, 23, 27 and 6. In another embodiment, only the center positions equal to a multiple of the maximum size of classes defined in the algorithm may be considered. Thus, the center is equal to a pixel value divided by the maximum size of classes. This offers a reduction in terms of number of bits to be transmitted.

Moreover, theoretically, the most probable center is the center of the full range. Thus, the data transmitted to determine the center position at the decoder side is the difference between the center of the full range and the center of the useful range of the current classification. Thus, for example in FIG. 16, the data transmitted relative to the center for examples 1601, 1602, 1603, 1604 are respectively 16−9=7, 16−23=−7, 16−27=−11, 16−6=10.

For the second group, the center of the histogram does not need to be coded. Thus, several schemes can be considered to code the displacement of the two sub-groups for the second group. The proposed embodiments on the quantization of the center value described for the first group can be easily extended to the proposed embodiments for the second group.

In embodiments of the invention the position of the useful range (selected classification) may be specified with the same precision or granularity across the full range, i.e. irrespective of the position of the classification within the full range. This is the case in the examples 1601 to 1604 shown in FIG. 16, where the positions (center positions) are 9, 23, 27 and 6. The full range is labeled from 0 to 32. There are 32 possible positions and the granularity is the same across the full range.

Figure 19:
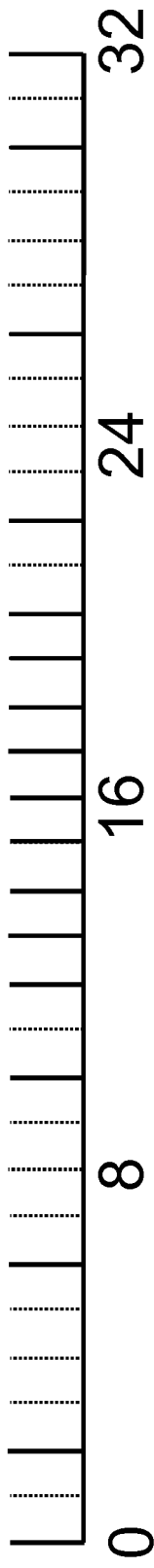
FIGS. 19a and 19b illustrate possible positions of the useful range within the full range in accordance with another embodiment of the invention.
Figure 19:
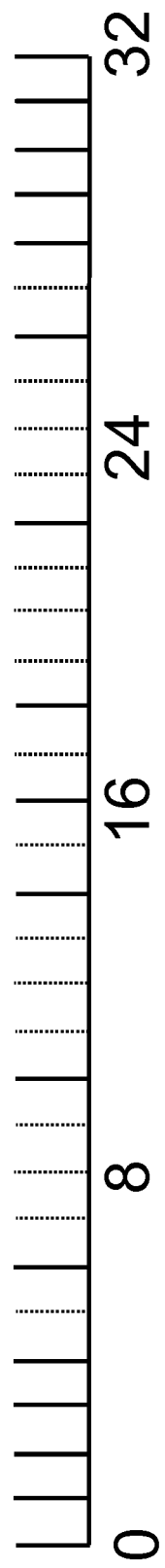

However, it is also possible, as shown in FIGS. 19a and 19b to provide more possible positions in one part of the full range than in another part of the full range, In other words, the granularity of the position varies in dependence on where the classification is within the full range. These embodiments propose an unequal quantization of the full range (here labeled from 0 to 32) with a variable granularity in order to position more precisely the center of the classification (useful range) in the most important (or likely) parts of the full range. Also, the unequal quantization enables the number of bits required to signal the position of the classification to be limited whilst still giving adequate precision in the important parts of the full range. This finer granularity could be applied for instance in the middle of the full range as represented in FIG. 19a. In this figure, the possible center positions correspond to indexes which are represented by a bold solid line. The interval between two possible center positions is smaller in the middle of the full range than at the ends. Thus the center position can be set more precisely in the middle of the full range than at the ends of the full range.

In FIG. 19b the interval between two possible center positions is smaller at both ends of the full range than in the middle. For example, this embodiment can be particularly useful in case of having important sample values at extreme values of the distribution.

More generally, a finer quantization could be applied at any place in the full range.

When variable quantization as described above is used the classification range (size of the useful range) can be fixed for all positions. For instance, the classification range can comprise four classes, each made of 8 pixel values.

It is also possible to make the classification range/class sizes vary with position, so that in FIG. 19a the classification range is, say, 8 pixel values at positions 12 to 20, 16 pixel values at positions 10 and 26, and 32 pixel values at positions 2 and 28.

The variable quantization as described here can be used regardless of the method applied for determining the classification range. This method can for instance use the properties of the statistical distribution of sample values or use a rate-distortion criterion.

The variable quantization could be predetermined both at the encoder and at the decoder. For example, the encoder and decoder could assign indexes to the possible center positions (or left positions), e.g. in FIG. 19a position 2 is index 0, position 6 is index 1, position 10 is index 2, position 12 is index 3, position 13 is index 4, etc. Then, it is sufficient for the encoder to transmit to the decoder the index of the selected classification. Alternatively, information about the variable quantization could be determined at the encoder and signaled to the decoder via a bitstream.

Figure 17:
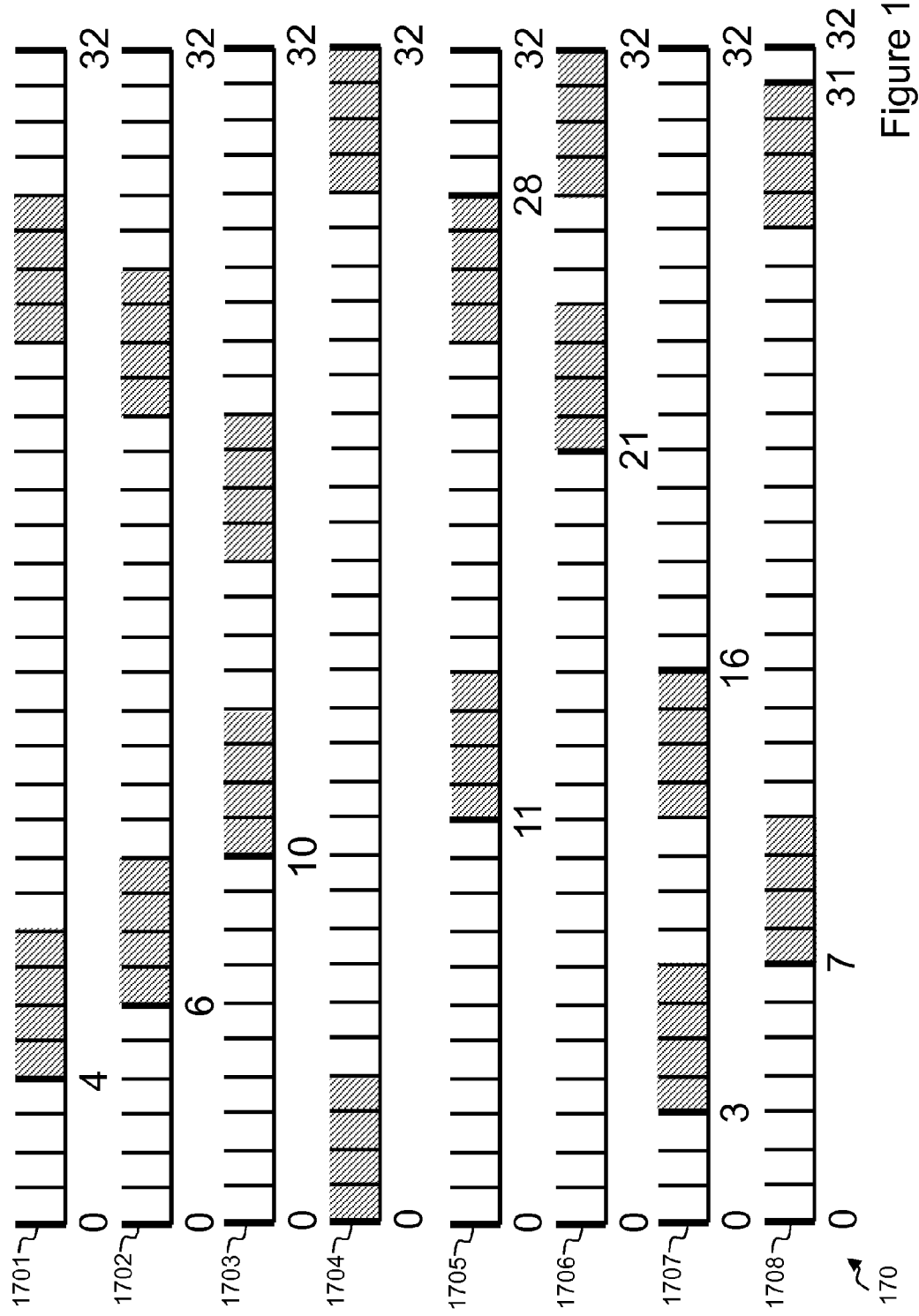
FIG. 17 illustrates several center positions of a useful range of the second group for the classification in accordance with an embodiment of the invention.

In one particular embodiment, it may be considered that the center of the histogram is always the center of the full range. Thus, in that case only one displacement is considered. Both groups are scaled to the center with the same displacement. Consequently only one data needs to be coded: the displacement of the first range of the second group. Examples 1701, 1702, 1703 and 1704 among examples 170 of FIG. 17 are examples of such displacements. In examples 1701, 1702, 1703, 1704 the displacements are respectively 4, 6, 10 and 0. The displacement can be directly coded without prediction.

In a further embodiment, both sub-groups of the second group have an independent position in the full range as depicted in further examples 1705, 1706, 1707 and 1708 among the examples 170. Two ways of coding can be considered.

In the first one, the center of a non-existent first group is coded with the size of the useful range of this non-existent first group.

The second way of coding independently both groups, is to transmit 2 displacements from the two ends of the full range (one for each group). Thus, for examples 1705, 1706, 1707 and 1708, the displacement transmitted is respectively 11 and 32−28=4 for 1705, 21 and 0 for 1706, 3 and 32−16=32 for 1707, 7 and 32−31=1 for 1708.

Figure 18:
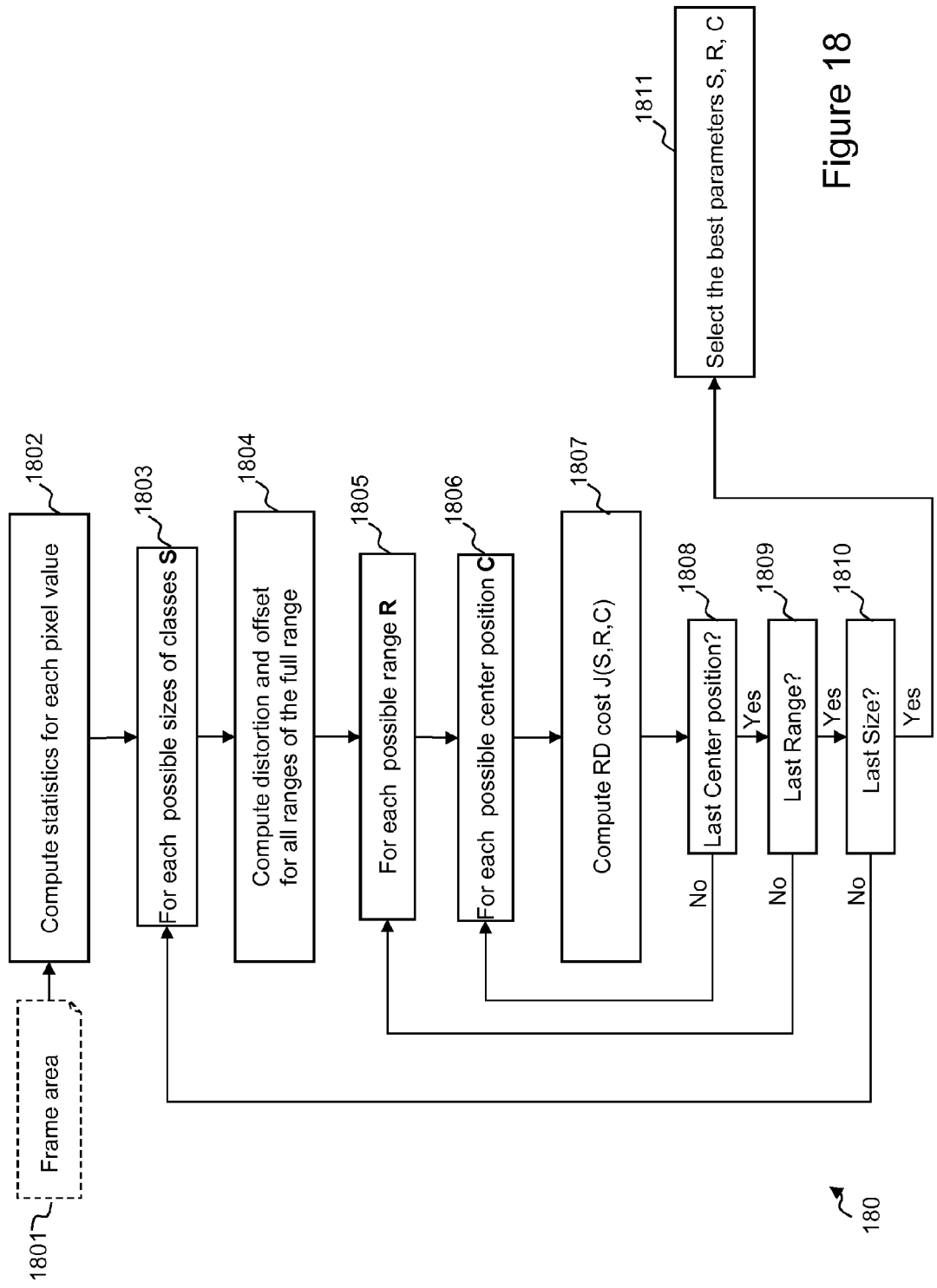
FIG. 18 illustrates the rate distortion selection of the parameters classification in accordance with an embodiment of the invention.

FIG. 18 is a flow chart illustrating steps of a rate distortion selection algorithm 180 according to an embodiment of the invention. For simplified explanatory purposes only selection for the first group without adapted class sizes is considered. The selection for the other embodiments described previously can be easily adapted.

In an initial step 1801, the statistics of the current frame area are computed. This involves determining variables $Hist_k$ and $Sum_k$ for all pixel values k. $Hist_k$ corresponds to the number of pixels having a pixel value equal to the value k and $Sum_k$ corresponds to the sum of differences between all pixels having a pixel value equal to value k and their original pixel values. The algorithm includes 3 loops on three parameters: size of classes S, size of range R and the center C. The first loop tests each possible class size in step 1803. For example, the size defined in FIG. 14. The offset for each sub-range of the full range is computed in step 1804. For example, if the bit-depth is 8 and the size of classes is 16, then the distortion and the offset for the 32 possible ranges in the full range are computed. By properties, the offset and the distortion are computed by linear combination of $Hist_k$ and $Sum_k$ for all values of k in the current range. Then, for each possible range R 1805, and each possible centers C 1806 a rate distortion cost is evaluated in step 1807. This evaluation is based on the rate distortion criterion. When all centers C 1808, all ranges 1809 and all sizes 1810 are tested, the best parameters S, R, C are selected in step 1811 based on the best rate distortion cost. The advantages of this second scheme to produce an equiprobable classification include a reduction of complexity and an improvement in coding efficiency. The classification selection of the center, range and size of classes offers an optimal rate distortion selection compared to embodiments where classification is based on the statistical distribution of pixel values. Of course this embodiment gives an improvement in term of coding efficiency compared to the current HEVC implementation. This scheme is less complex at decoder side compared to the previous one since the distribution of pixels does not need to be determined at the decoder. Moreover, this scheme can be less complex than known techniques in HEVC because in some groups fewer classes are used.

The algorithm represented in FIG. 18, performs a full rate distortion based selection of all band offset parameters: the size of classes S, the range R, the position of a value representative of the center C. In order to limit the complexity, it is possible to fix some parameters. In one particular implementation of the algorithm of FIG. 18, the size S and the range R are fixed at given values known by the encoder and the decoder. For instance S could represent 8 pixel values and R could represent 32 pixel values corresponding to 4 classes of 8 pixels. As a consequence the only parameter to be optimized is the value representative of the center C.

Since embodiments of the invention take into account the repartition of pixel values across the range of pixel values in the determination of the classification of the pixels, the classification may be adapted accordingly to different distributions of pixel values. In particular the classification can be adapted according to the component type of the pixels. For example, in the case of a set of Chroma component pixels the pixel values tend to be lower compared to the pixel values of Luma chroma pixels. In addition, Chroma U pixel values have a different distribution to that of Chroma V pixel values which have more concentrated and relatively higher pixels values. Moreover, in the case of chroma component pixels the distribution of pixel values tends to be more concentrated around peak pixel values compared to that of Luma chroma pixels which provides a more widely spread out distribution.

As seen above, in order to avoid the determination of the distribution of pixels at the decoder side, the parameters S, R and C are transmitted in the bitstream in addition to the SAO type (No SAO, edge offset or band offset) and the compensation offset values. When the class size and the range are fixed, only C is transmitted in order to allow a decoder to retrieve the center of the range.

Figure 21:
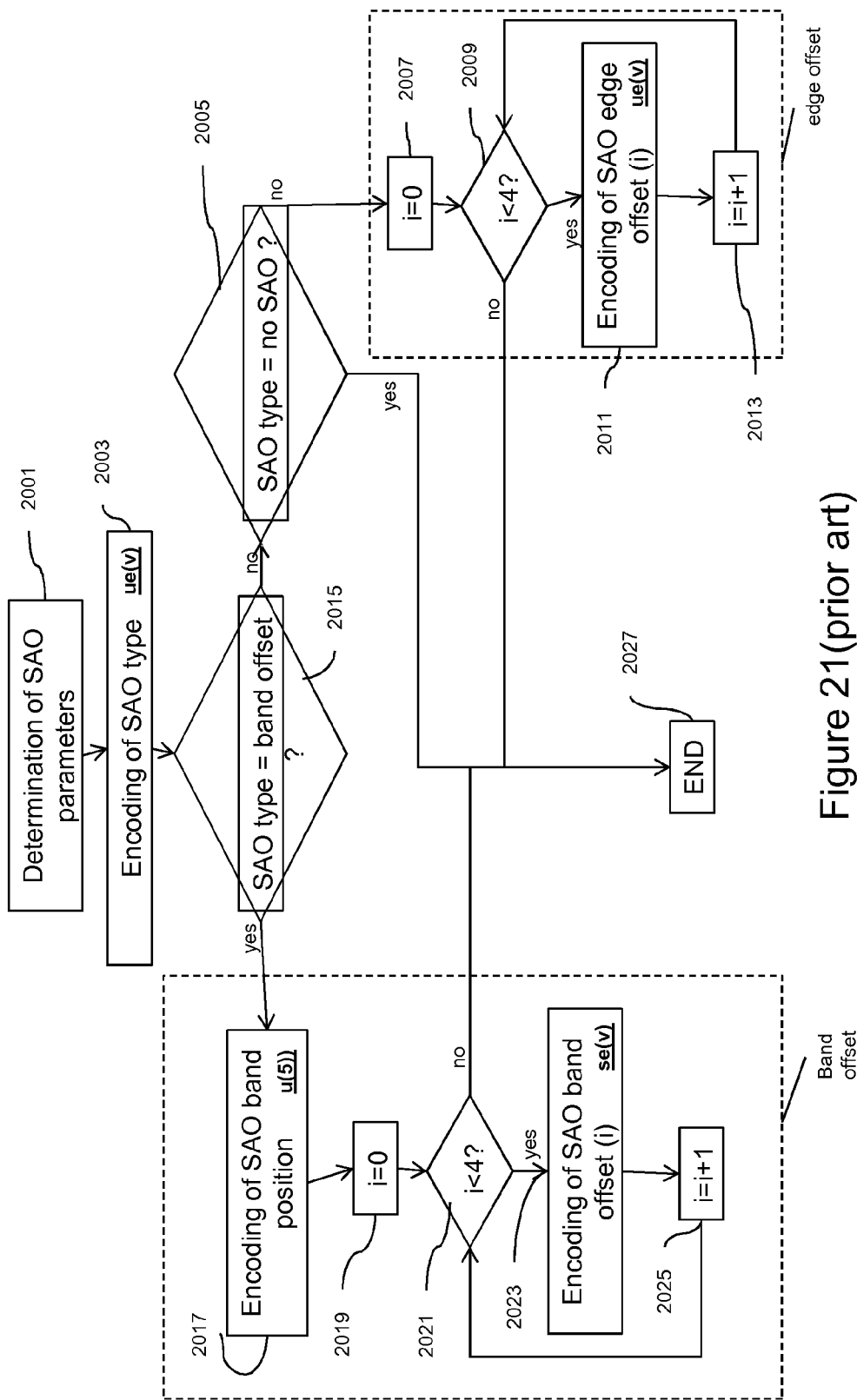
FIG. 21 is a flow chart corresponding to the pseudo code of FIG. 20A.

In the case of fixed S and R, one known solution to encode the SAO parameters consists in applying the pseudo code of FIG. 20A, described in the form of a flow chart by FIG. 21.

The process starts by the determination of the SAO parameters, including the type of SAO (stored in the codeword sao_type_idx), the value representative of the center of the useful range (stored in the codeword sao_band_position) when the band offset type is used, and the SAO offsets (stored in the codewords sao_offset). In FIG. 20A, cIdx represents the index of the color component to which SAO is applied, rx and rx represent the position of the area to which SAO is applied, and i is the index of the class of sample values.

The SAO parameters encoding starts then at step 2003 with the encoding of the SAO type using an unsigned Exp Golomb code (ue(v))(i.e. unsigned variable length code). If the SAO type is type 5 (band offset), the encoding continues with the encoding of the value representative of the position of the center of the useful range using an unsigned fixed length code of size 5 (u(5)) at step 2017. Then, the encoding of the four offsets corresponding to the four classes contained in the range is performed iteratively in steps 2019 to 2025. Here, each offset is encoded using a signed Exp Golomb code (se(v))(i.e. signed variable-length-coding (VLC) code). The encoding process then ends with step 2027.

If the SAO type is not band offset, we check first if the SAO type is no SAO (no SAO means no offset is applied to the samples concerned). If no SAO has been selected, the encoding process stops in step 2027.

Otherwise, we continue with the iterative encoding of the four edge offsets in steps 2007 to 2013. Again, the encoding process stops in step 2027.

VLC codes are generally used when the range of values to represent is relatively high but some values in this range are more probable than others. Most probable values are then given a short code, while less probable values are given a long code. The main drawback of these codes is that they induce a higher decoding complexity than fixed length codes (FLC). Indeed, a VLC code has to be read bit by bit since the final size of the code is not known while all bits of a FLC code can be read directly since its size is known.

Figure 22:
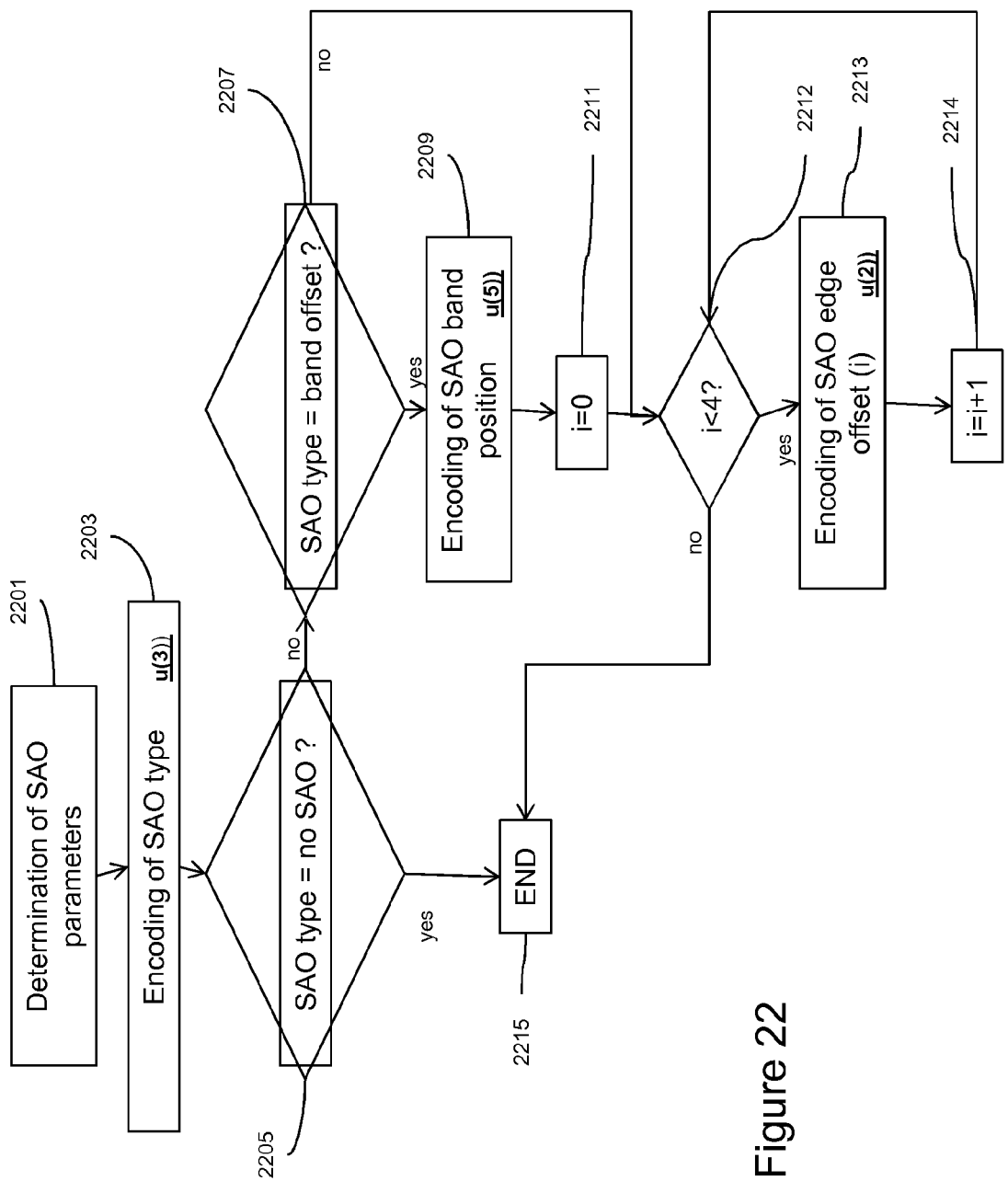
FIG. 22 is a flow chart corresponding to the pseudo code of FIG. 20B.

In FIGS. 20B and 22, we propose an alternative to this encoding process replacing VLC codes by FLC codes.

This encoding process starts with step 2201 which is identical to step 2001. In step 2203, the VLC coding of the codeword sao_type_idx is replaced by a FLC encoding.

3 bits are necessary here to encode the 6 possible SAO type values (i.e. the "no SAO" type, the 4 "edge offset" types, and the "band offset" type). We then check if the type of SAO is "no SAO" in step 2205. In that case, nothing more is encoded and the process ends with step 2215. Otherwise, we Otherwise, we check if the type of SAO is "band offset" in step 2207. If yes, in step 2209 the value representative of the position of the center of the range is encoded in the codeword SAO_band_position in the form of an unsigned FLC code of size 5. Indeed, in this example, with a class size of 8 sample values and a range made up of four classes, 28 different positions are possible for a full range of 256 values.

This step is followed by the encoding of the four SAO offsets in steps 2211 to 2214. Here a FLC code replaces the VLC code of step 2023 and 2011. Instead of using a VLC code of maximum 5 bits covering integer offset values from −31 to 32, here we use a FLC code of size 2 bits capable of encoding only 4 different values, generally (−2, −1, 1, 2). Reducing the number of possible values has the effect of concentrating the encoding on the most frequently used offset values.

The process stops after the offset encoding in step 2215.

Note that, in another embodiment, the range represented by the offsets can be extended by encoding in a picture header, a slice header or a LCU header, a multiplication factor to be applied to the offsets obtained by the 2 bits code. For instance with a multiplication factor equal to 4, the encoded offsets (−2, −1, 1, 2), become (−8, −4, 4, 8). The multiplication factor can also be standardized (fixed) or be inferred from another LCU. For example, the multiplication factor applicable to a previous LCU may be assumed to apply to the present LCU.

Similarly in another embodiment, a shifting value, encoded in a picture header, a slice header or a LCU header, could be applied to the offsets obtained by the 2 bits code. For instance with a shifting value of 5, the encoded offsets (−2, −1, 1, 2), become (3, 4, 6, 7). Again, the shifting value can also be standardized (fixed) or be inferred from another LCU. For example, the shifting value applicable to a previous LCU may be assumed to apply to the present LCU.

Tests have shown that having fewer possible offset values does not reduce the performance of the SAO method significantly. It appears that the loss induced by the suppression of some offset values is compensated by the suppression of the heavy bitrate cost of less probable offset values.

Additional tests have also shown that the number of different offset values can be further reduced to 3 and even 2 offsets (requiring only one bit to encode) without significant loss of performance.

Figure 23:
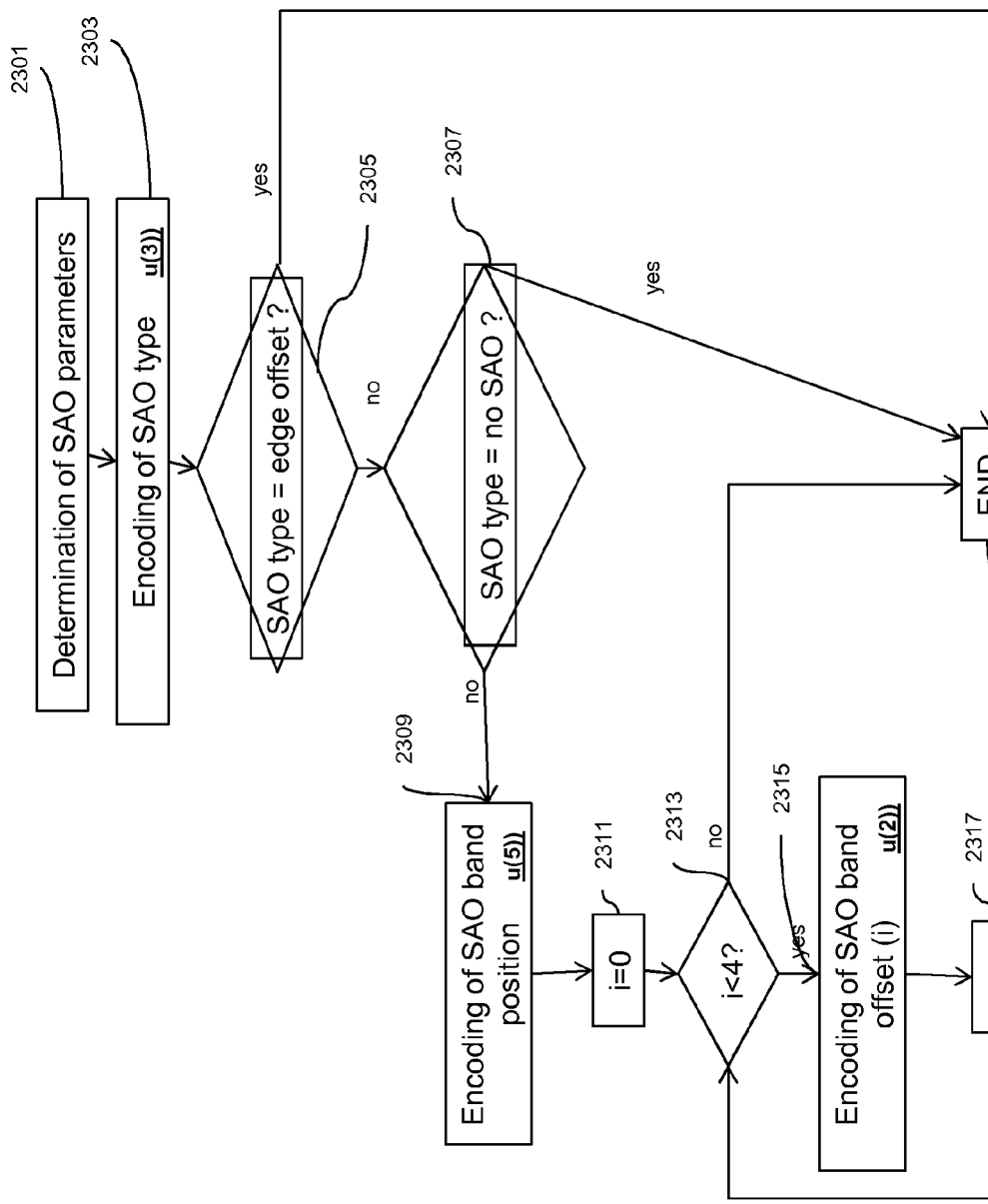
FIG. 23 is a flow chart for use in explaining encoding of the SAO parameters according to a further embodiment of the present invention.

In FIG. 23, a further improvement of the encoding process is proposed. We consider here that the offset values used in the case of the edge offset type, can be inferred directly from the type of edge offset. In that case no encoding of the edge offset values is required. As a reminder, each type of edge offset is associated with 4 classes depending on the signal direction, and each class has an associated offset value. This embodiment is motivated by tests showing that in general for a given edge offset type and a given class, the offset values are close to each other and generally the same. As a consequence, we propose to fix for each edge offset type a set of 4 offset values. For instance we propose the following association:

Vertical edge offset: (−2, −1, 1, 2)
Horizontal edge offset (−2, −1, 1, 3)
First diagonal edge offset (−3, −2, −1, 1)
Second diagonal edge offset (−1, 1, 2, 3)

Steps 2301 and 2303 in FIG. 23 are identical to steps 2201 and 2203 already explained with reference to FIG. 22. In steps 2305 and 2307, we check if the SAO type is "edge offset" or "no SAO" respectively. In both cases, no offsets are encoded. In the case that the SAO type is "edge offset", when reading the edge offset type value, a decoder will infer the offset values from the edge offset type thanks to the known association with fixed offset values.

In the embodiment of FIG. 23, if the SAO type is "band offset" the value representative of the position of the center of the range is encoded in step 2309 and the four offset values are encoded iteratively with steps 2311 to 2317. The encoding process ends with step 2319.

Figure 25:
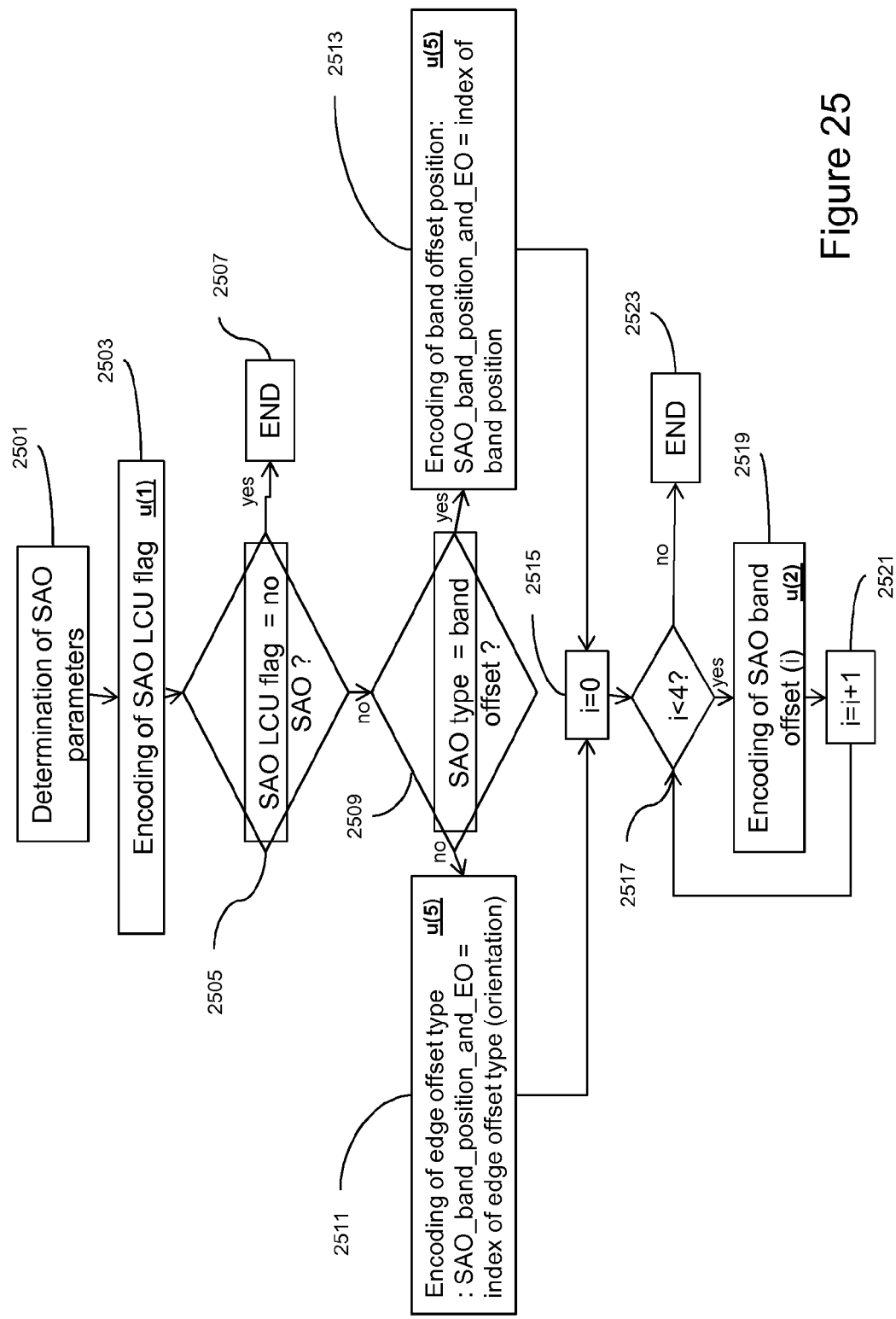
FIG. 25 is a flow chart corresponding to the pseudo code of FIG. 24.

In the embodiment of FIGS. 24 and 25 we apply another modification of the encoding process described in FIGS.

20A and 21. As already mentioned in previous embodiment, a FLC code of 5 bits is used to encode the information representative of the position of the center of the range (sao_band_position), while only 28 different positions are used. In that condition, four FLC codes each of length 5 bits remain unused. We propose here to take benefit of these four spare FLC codes to remove the codeword used to encode the SAO type. A new codeword, SAO_band_position_and EO will be used to code jointly the range positions and the edge offset types. This new codeword is also 5 bits long.

As usual, the process starts in step 2501 with the definition of the SAO parameters. This process is followed in step 2503 by the encoding of a 1 bit long flag (SAO_LCU_flag) indicating if SAO is in use or not. If SAO is not used (step 2505), the process stops (step 2507).

If SAO is used, we check in step 2509 which type of SAO is used. If the SAO type is "band offset" then in step 2513 the first 28 codes of the codeword SAO_band_position_ and_EO are used to encode the value representative of the position of the center of the range. If the SAO type is "edge offset", then in step 2511 the last four codes of the codeword SAO_band_position_and_EO are used to encode the type of edge offset (vertical, horizontal, first diagonal or second diagonal). The steps 2511 or 2513 are followed by the encoding of the four offset values with steps 2515 to 2523.

Incidentally, although the spare codewords are used in the present embodiment to encode the type of edge offset, it will be appreciated that the spare codewords can alternatively be used for other purposes. Any other information that needs to be sent from the encoder to the decoder can be encoded using the spare codewords.

Figure 26:
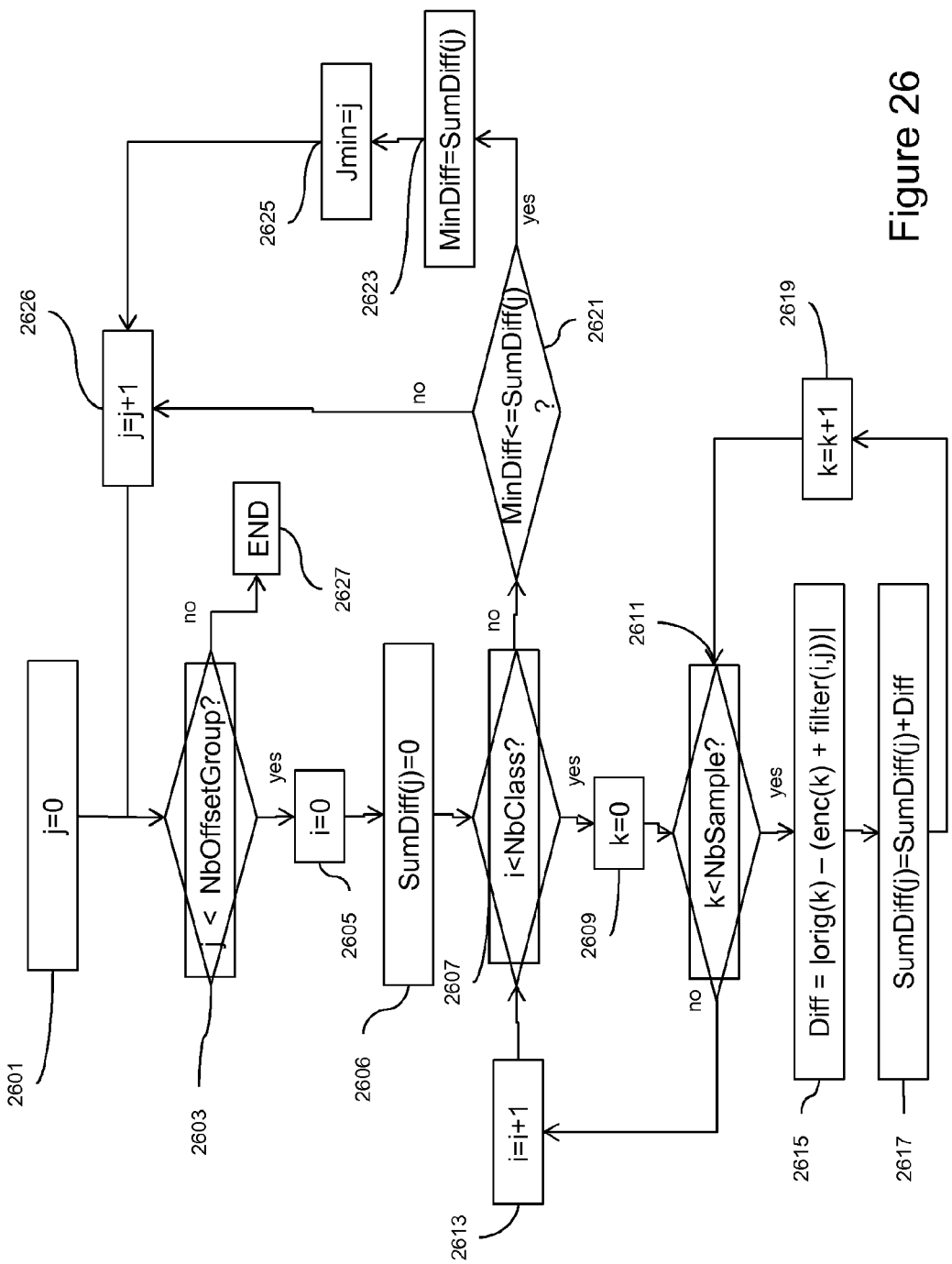
FIG. 26 is a flow chart for use in explaining encoding of the SAO parameters according to a still further embodiment of the present invention.

In FIG. 26 we propose a further embodiment for determining the offsets to be applied in the case of the band offset. This embodiment is motivated by tests showing that in the case of band offset a majority of offsets have low amplitudes in absolute value. Indeed, offset values are in general equal to −2, −1, 1 and 2. When the number of classes in a range is reduced to 4, for instance as in the example of FIGS. 20A to 25, the number of different groups of 4 offset values is also reduced. In the example above with 4 different offsets values and 4 classes, the number of different groups is $4^4=256$. In the embodiments of FIGS. 21, 22, 23 and 25, 8 bits are used to encode the offset values (4 offset values, each encoded using 2 bits). Here, it is considered that all groups of 4 offsets have the same probability of being selected. However, some of these groups are less probable than others. By removing the less probable groups, it is possible to reduce the number of bits required to encode them. As a consequence, instead of encoding 4 different offset values using 2 bits for each offset value, we propose to assigns indexes to different groups of 4 offset values and to encode the index, the index being encoded using less than 8 bits thanks to the removal of the less probable groups. The probabilities of groups could be determined by applying SAO on a set of training sequences and computing statistics on the groups. A table gathering all possible groups ordered according to their probability of being selected could be pre-determined and known by the encoder and the decoder. In this table, each group of offsets will be associated to an index value. The number of bits allocated to the index of groups encoding could be fixed (standardized) or fixed for a sequence, a frame, a slice or a LCU and encoded in the corresponding headers. A subset of groups in the table corresponding to the most probable groups will be determined by the encoder and the decoder depending on the number of bits allocated to the index encoding.

An embodiment representing the selection of the best group is described in FIG. 26. The process starts with step 2601 in which a variable j is initialized. This variable j is progressively increased to allow testing of all possible groups of offsets. In the proposed embodiment, we consider groups of 4 offsets but other numbers of offsets could be considered. In step 2603 we test if all groups have been tested (for instance NbOffsetGroup could be equal to 128). If yes, the process stops in step 2627 and a codeword of less than 8 bits corresponding to the selected group is encoded. If not, the process continues with the initialization of a variable i allowing to test all classes in a range (step 2605). In step 2606, the variable SumDiff(j) representing the sum of the difference between original samples and SAO filtered encoded samples corresponding to the group of offset j is initialized to 0. Here, only 4 classes are considered, but other numbers of classes consistent with the number of offsets are possible. In step 2607, if some classes remain to be tested, we initialize a variable k allowing to test all possible samples in a range of samples corresponding to the class i. With steps 2611 to 2619 we compute the sum of the absolute values of the differences between encoded samples filtered with the offset of class i in the group of offsets j and original samples in the considered class i. Here orig (k) is an average of original sample values corresponding to the encoded value enc(k). Filter(i,j) is the offset value corresponding to class i, in the offset group j. SumDiff(j), is the sum of differences computed on all classes constituting a range (here 4 classes). In the loop comprising steps 2621 to 2626, all computed sums of differences are compared and the index of the group having the minimum sum is selected. The selected index corresponds to the group of offsets allowing, when applied to encoded samples, to minimize the difference between filtered samples and original sample.

During the syntax encoding process, the encoding of the offset values as represented for instance by steps 2211 to 2213 in FIG. 22, is replaced by the encoding of the index corresponding to the selected group of offsets.

The use of a group of offsets for the band offsets can be extended to the edge offset classification. In this case, the group of offsets to be used can be adapted to the characteristics of the edge classifications. In the current HEVC specification, the sign of the offset for each class is inferred in order to force the edge offset processing to be of the form of a low-pass filter. In addition to this, other offset characteristics can be exploited to create an efficient list of groups of offsets. In the following description, we are creating N groups of offsets which can be considered to form a list, and Oi1, Oi2, Oi3 and Oi4 represent respective absolute values of the offsets of the group having index i. Oi1, Oi2, Oi3 and Oi4 are respectively applied to pixels of class 1, 2, 3 and 4 as presented in Table 2 of the Appendix.

In one embodiment, in each group i the absolute value Oi1 applied to the pixels of class 1 is systematically greater than or equal to the absolute value Oi2 applied to pixels of class 2, and the absolute value Oi4 applied to the pixels of class 4 is systematically greater than or equal to the absolute value Oi3 applied to the pixels of class 3. According to this condition, the offset values in each group are defined in order to create a slope with the following relationship: +Oi1>=+Oi2>=−Oi3>=−Oi4

In another embodiment, the absolute values Oi2 across all groups and the absolute values Oi3 across all groups are both less than the absolute values Oi1 across all groups and are both less than the absolute values Oi4 across all groups. In a particular embodiment, the values of Oi2 and Oi3 are fixed to 0.

In another embodiment, one absolute value, for example Oi1, of a given group i depends on, or is obtainable from another absolute value, for example Oi4, of the same group, For example, the relationship between Oi1 and Oi4 may be the following:

$$Oi1 = L \times Oi4$$

where L is a fixed value in the range from 0.5 to 2.

In another embodiment, the absolute values Oi1 and Oi4 respect the following rule:

$$|Oi1 - Oi4| <= 1$$

where |x| represents the absolute value of x.

In another embodiment, the absolute values Oi1 and Oi4 are equal.

In another embodiment, the rules described above for the pair of values Oi1 and Oi4 apply also to the other pair of the values Oi2 and Oi3.

In another embodiment $Oi1-Oi2=Oi4-Oi3$

In another embodiment, for each group i of offsets in the list of N groups, there exists a symmetrical group j of offsets. Symmetrical in this context means that a group i and a group j have offsets which satisfy the relationship:

$$Oi1 = Oj4 \text{ and } Oi2 = Oj3$$

where j can be equal to i.

In another embodiment, the offsets of the group index i in the list of N groups of offsets are generated using the index value of the group concerned. This embodiment has the advantage of avoiding memory storage of the offsets value of each group. The following formula can be applied to generate the offsets of the group i where i belongs is in the range from 0 to N−1:

$$Oi1 = ROUND\{(i+1)/3\}$$

$$Oi2 = ROUND\{(i/3)\}\%2$$

$$Oi3 = (i+1)\%2$$

$$Oi4 = Oi1 - Oi2 + Oi3$$

where % x denotes modulo x.

In another embodiment, the offset values of the group having index i are generated according to the group index value and the related formulas can use only shifts, additions, and logical operations (AND, OR, XOR etc). This embodiment has the advantage to reduce the complexity for computing the offset value compared to the previous one.

In another embodiment, any group of offsets which contains only zero values is systematically removed from the list.

In another embodiment any group of offsets where Oi1=Oi2=Oi3=Oi4 is removed from the list.

In another embodiment the group index i is signaled in the bitstream for example by using a fixed length code. This embodiment has the advantage of being less complex to encode or to decode the index of the group of offsets. This gives a good coding performance when the number of groups of offset in the list is less than or equal to 16 (N=16). So 4 bits are systematically transmitted to signal an index of a group of offsets.

In another embodiment the group index i is encoded with variable code size such a code such as a Golomb code. This is more efficient than the fixed length code when the number N of groups in the list is high. This specific coding of group index needs a specific ordering of the groups of offsets in the list. One criterion is to order the groups of offsets from the minimum sum of absolute values of offsets to the maximum.

The list of the groups of offsets needs to depend on the bit depth to represent the original video sequence to be coded. In another embodiment, the list of groups of offsets is obtained for a given bit depth bd1. For example, the list of groups for bit depth bd1 may be predetermined or fixed according to a formula for a given bit depth bd1. To determine the offset values for a bit depth bd2 different from bd1, these offset values are multiplied by the power of 2 of the difference between bd1 and bd2. So the offset $Oic(bd2) = Oic(bd1) \times 2^{(bd1-bd2)}$, where Oic is the offset for class c from the group index i.

In another embodiment the formula to generate the list of the groups of offsets uses the bit depth to determine the values of offsets. For example, the following formula is used:

$$Oi1 = i << ((10\text{-bit depth}) << 2 + 1) + 1$$

$$Oi2 = (i << 1)\%2$$

$$Oi3 = (i+1)\%2$$

$$Oi4 = Oi1 - Oi2 + Oi3$$

where << is a left shifting operation.

In another embodiment, the number N of groups in the list depends on the bit depth. In that case, N is equal to $$N = 2^{(\text{bit depth} - 4)}.$$

The number of bits needed to encode the index i among N of a group depends of course on the bit depth.

In another embodiment only the first M (M<N) groups of the predefined table are used.

In another embodiment, the predefined table (or predefined formulas for offsets computation) of groups of offsets is fixed for a certain bit depth bd1. For a different bit depth bd2, the index i decoded is multiplied by a factor to obtain the index of group in the table created for bit depth bd1. This factor is the power of 2 of the difference between bd1 and bd2.

Figure 27:
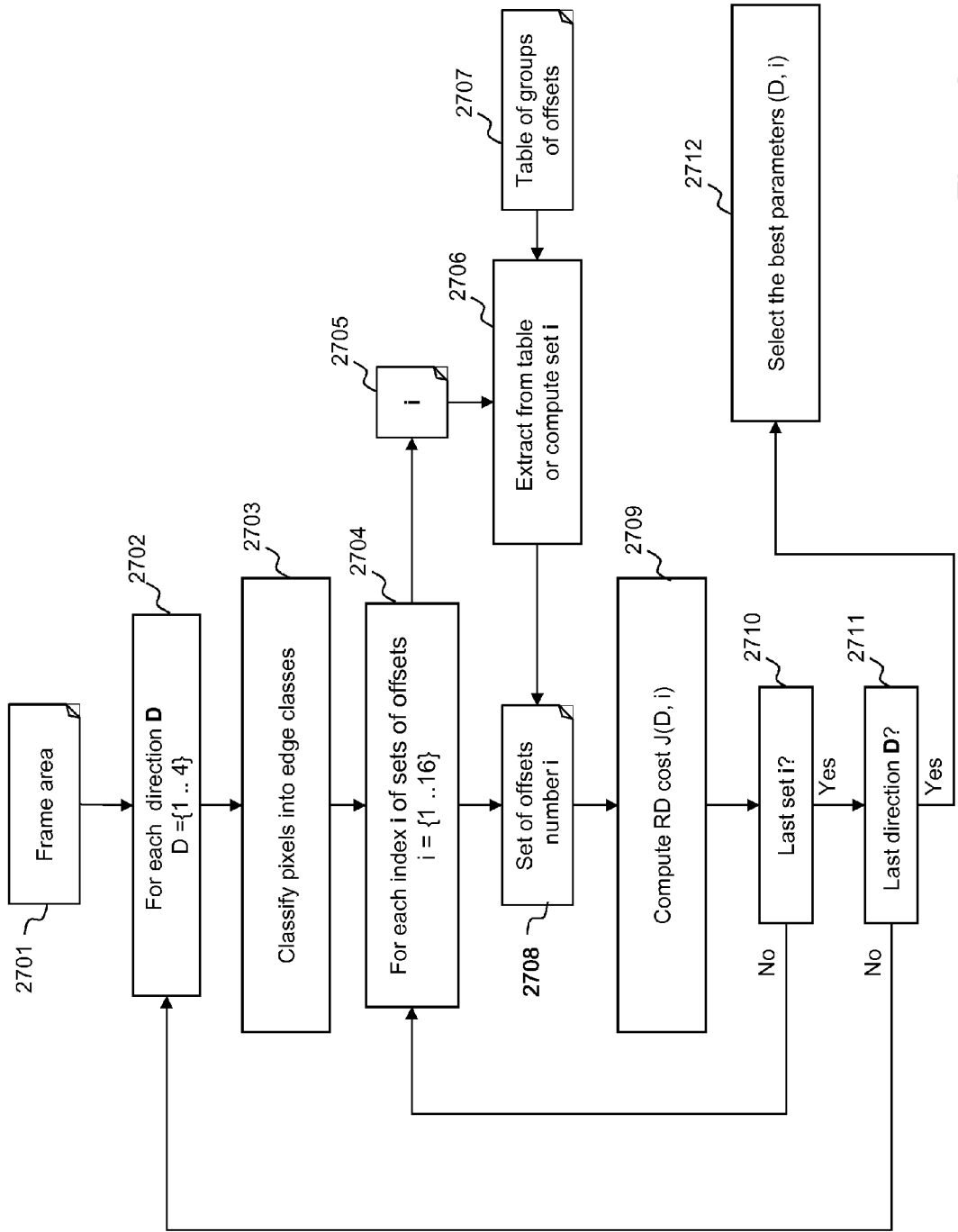
FIG. 27 is a flow chart corresponding to the classification of pixels into edge classes according to another embodiment of the present invention.
Figure 28:
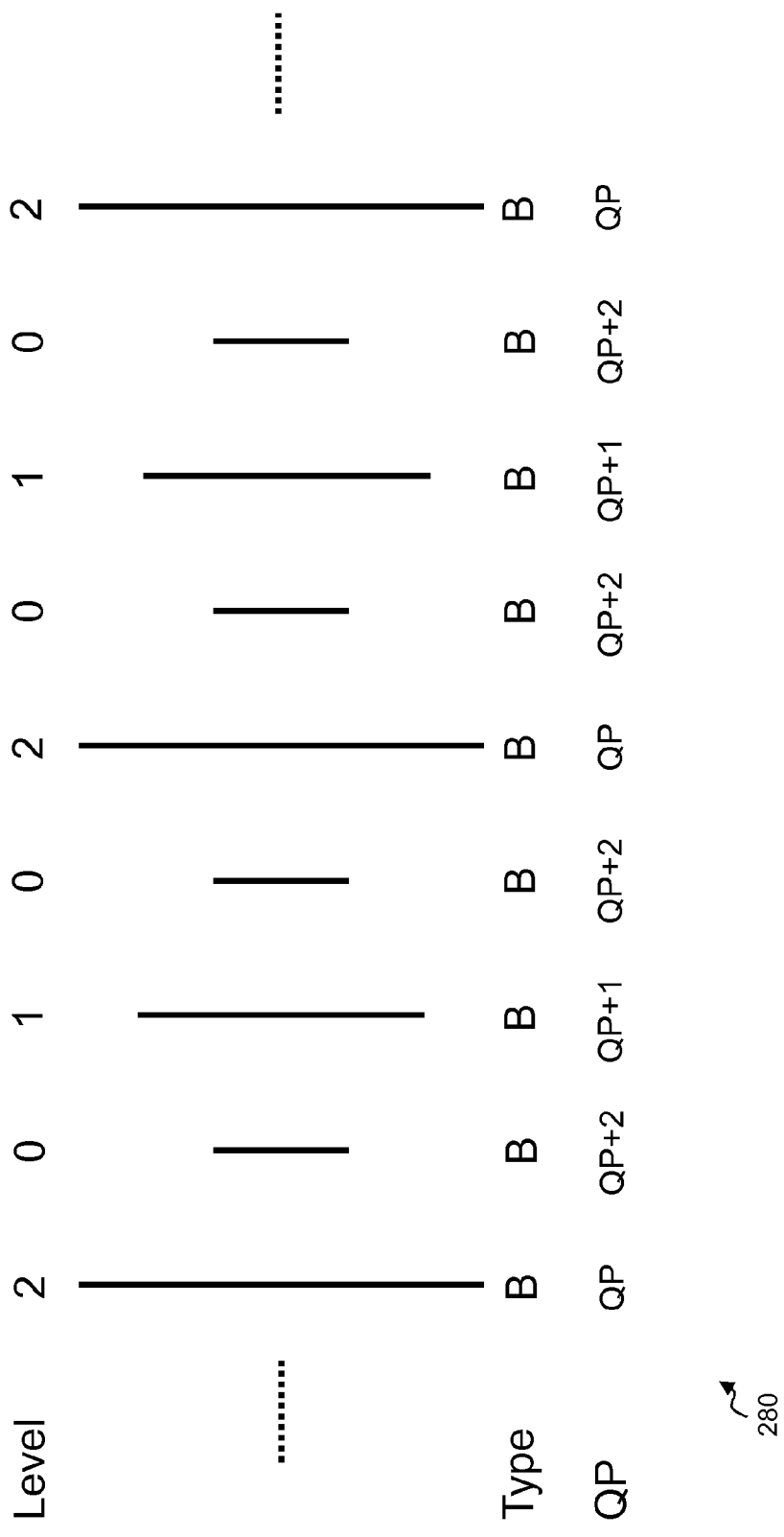
FIG. 28 illustrates a Group of Pictures (GoP) and its images associated to a level, used in another embodiment of the invention.

FIG. 27 shows an example of a selection process of the best group of offsets for SAO edge offset, in terms of rate distortion performance.

For the current image area (step 2701), the encoder tests the four predetermined directions (step 2702). For a given direction D (corresponding to an edge offset type, see Table 1 above), the encoder classifies the sample values of the image area according to edge offset classification (step 2703), see Table 2. Then, for each group of offsets i (step 2704), the encoder computes the rate distortion cost related to the current direction D and the current group of offsets (step 2709). For the index i (step 2705), the related group of offsets is extracted (step 2706) from the table of groups of offsets (step 2707) or computed according to determined formulas (step 2706). This group (step 2708) contains the four offsets which are applied on the image area (step 2701) according to the classification determined in module 2704. The filtered image area is then compared to the original and the rate distortion cost is computed for the parameters D and group number i (step 2709). Then the encoder tests if the index i has reached its maximum (step 2710). If it is not the case the variable i is incremented (step 2704) otherwise the encoder tests if all directions have been tested (step 2711); otherwise the variable D is incremented (step 2702). When all directions D for all index i have been tested, the encoder selects the combination of variable D and I which gives the best rate distortion performance (step 2712). Information about this combination (D, i) is included in the bitstream sent by the encoder to the decoder.

On the decoder side, the information about the combination (D, i) is used to obtain the group i of offsets selected by the encoder and the direction D. The decoder then applies the offsets of the group to the sample values according to their classes.

Classification of Luma component pixels is performed separately to the classification of chroma U or V component pixels and thus each classification can be adapted accordingly such that each class has a similar number of pixels.

Area-by-Area Loop Filtering Embodiments

Further embodiments of the present invention can provide methods of encoding a sequence of images in which area-by-area loop filtering is performed on at least one image of the sequence and is disabled on at one other image of the sequence. Here, area-by-area loop filtering means varying the loop filtering from one image area (block, Largest Coding Unit, etc.) to another within one image. Of course, varying the loop filtering area-by-area in this way incurs certain costs. Firstly, the encoding is more complex because different loop filtering parameters must be generated for each image area requiring a different loop filtering. Secondly, information about the loop filtering parameters usually has to be transmitted from the encoder to the decoder, which in the case of area-by-area loop filtering implies a significant signaling overhead.

By way of background, within a group of images each image may have an associated level within a plurality (hierarchy) of levels. The levels may correspond to different respective rate-distortion balances (compromises) or to different image qualities. The benefit of applying area-by-area loop filtering on an image depends on what level the image has in the hierarchy of levels. Indeed, the SAO filtering doesn't need to be applied to all the images of the sequence and/or all the images of a group of images, especially when the hierarchy between rate and distortion is used to encode a group of frames. The main advantage of disabling the area-by-area SAO filtering on some images is the improvement of the coding efficiency. Indeed it is better to disable SAO parameters for an entire image than area-by-area in order to save the bitrate dedicated to the signalization which tells not to use the SAO filtering. A second advantage is the complexity reduction at encoder side. Indeed, the area-by-area SAO filtering process doesn't need to be applied on all frames.

In one embodiment, the area-by-area SAO filtering process is disabled for images which have a low level in the hierarchy of levels (balances between rate and distortion). This corresponds to images in the group of images which have a lower quality and/or which have a high quantization parameter (QP).

In another embodiment, the area-by-area SAO filtering depends on the whether quality increases or decreases between the previous image and the target (current) frame before applying SAO. For example, the area-by-area SAO filtering may be disabled on the target image when the image quality decreases, or decreases by more than a predetermined amount, compared to that of the previous image. This predetermined amount can be adapted according to the level(s) of the previous and/or target images in the hierarchy of levels (balances between rate and distortion). These embodiments can be applied to all color components all together or independently.

Instead of, or in addition to, considering level and/or quality, it is also possible to consider the amount of SAO activity in one or more images when determining which images of the group should have area-by-area SAO filtering disabled. In the following description, one measure of SAO activity is the number of SAO selections of an image. This may be the number of times when the SAO filter is selected, or the number of pixels filtered by SAO for all color components or each color component.

In another embodiment, area-by-area SAO filtering is disabled for a target image according to the number of SAO selections in previous encoded imageshaving the same level as the target image in the hierarchy of levels (balances between rate and distortion). It means that the number of SAO selections is determined for each image. And if the number of SAO selections for the level of the target image (current image) is less than a pre-defined threshold, the area-by-area SAO filtering process is disabled for the current image. The number of SAO selections for a level can be the average number of SAO selections for all previously encoded images or a set of previously encoded images with the same level. Or the amount of SAO selections for a level can be the number of SAO selections on the previous image having the same level. In this embodiment, when the area-by-area SAO filtering process is disabled for a given level it is reactivated after the encoding of a pre-determined number of image without SAO. The reactivation of the area-by-area SAO filtering for a level can depend also on the use of Intra frames which refresh the Inter coding dependencies or on content change in the sequence determined by scene change detection algorithm or on QP change for each level of a group of images.

In another embodiment, the area-by-area SAO filtering is disabled for a target image having a given level according to the number of SAO selections on images of another level in the hierarchy, ideally, according to the top level of the hierarchy (images with the best quality). In this case, if the number of SAO selections for a higher level in the hierarchy than the level of the current image is less than a pre-defined threshold, the area-by-area SAO filtering is disabled for the current image. The pre-determined threshold can be weighted according to the difference in levels between the reference level (e.g. highest level) and the level of the current image. As the previous embodiment, the number of SAO selections for a level can be the average number of SAO selections for all previously encoded images or for a set of previously encoded images having the same level. In this embodiment, the area-by-area SAO filtering may always be performed on images with the highest level or may be enabled and disabled according to the embodiment described in the immediately-preceding paragraph.

These embodiments can be applied for all color components or on one or more color components independently. These embodiments can be used to independently apply or not the area-by-area SAO filtering process to one or both SAO types (edge and band).

These embodiments can be used at decoder side to infer the SAO filtering flag at frame level. In this case, the encoder and the decoder apply the same criterion to decide if SAO is applied or not for the current frame. This avoids the need to transmit the SAO filtering flag to the decoder but the complexity of the decoder is increased.

These embodiments can be applied to any kind of loop filtering, and not just to SAO filtering. For example, embodiments can work in the case of Adaptive loop filter (ALF), too. In another embodiment, the statistics determined for SAO (like previous embodiment) are used to decide if ALF is applied or not. In another embodiment, the statistics determined for ALF (like previous embodiment) are used to decide if SAO is applied or not.

Methods of embodiments of the invention thus provide a more flexible classification approach which can be adapted to provide a more optimal classification independently for both Luma or Chroma signals thereby leading to an improvement in coding efficiency.

Although the present invention has been described hereinabove with reference to specific embodiments, the present invention is not limited to the specific embodiments, and modifications will be apparent to a skilled person in the art which lie within the scope of the present invention.

For example, while the previous embodiments have been described in relation to pixels of an image and their corresponding pixel values, it will be appreciated that within the context of the invention a group of pixels may be considered together with a corresponding group pixel value. A sample may thus correspond to one or more pixels of an image.

Further aspects of the present invention are set out below.

According to a first further aspect of the invention there is provided a method of providing compensation offsets for a set of reconstructed samples of an image, each sample having a respective sample value, the sample values of a plurality of samples of the set being representable by a statistical distribution of sample values, the method comprising determining, in dependence on properties of the statistical distribution of sample values, a plurality of classes for repartition of the samples according to their corresponding sample value, each class defining a respective range of sample values; and associating, with each determined class, a respective compensation offset for application to the respective sample value of each sample of the said class.

Since the statistical distribution of the sample values is taken into account in the determination of the classification of samples, the classification may be adapted accordingly to all possible ranges of sample values. Moreover the classification can be adapted according to the component type of the samples. For example, in the case of pixels corresponding to a Chroma signal, the distribution of pixel values tends to be more concentrated around peak pixel values compared to that of a Luma signal which provides a more widely spread out distribution. Methods of embodiments of the invention thus provide a more flexible classification approach which can be adapted to provide a more optimal classification independently for both Luma or Chroma signals thereby leading to an improvement in coding efficiency.

In the context of the present invention a sample may correspond to a single pixel, with a sample value corresponding to the respective pixel value. Alternatively a sample may comprise a plurality of pixels, and the sample value may correspond to a pixel value determined from the pixel values of the plurality of pixels.

In an embodiment the properties of the statistical distribution comprise a determined centre of the statistical distribution of image sample values.

In an embodiment the properties of the statistical distribution comprise a useful range of sample values of the statistical distribution.

In an embodiment the classes are determined such that the samples are shared substantially uniformly among the classes.

In an embodiment the samples of the set may be of at least a first component type or a second component type, and wherein the plurality of classes is determined dependent on the component type of the set of samples.

In an embodiment the number of classes is predetermined, the range of sample values defined for each class being determined in dependence on the properties of the statistical distribution.

In another embodiment the number of classes and the range of sample values defined for each class are determined in dependence on the properties of the statistical distribution.

In an embodiment the number of classes is determined in dependence on the number of samples having a sample value in the useful range.

In an embodiment the number of classes is determined according to the component type.

In an embodiment the method includes determining a maximum number of sample values per class according to the number of sample values in the useful range.

In an embodiment determining the plurality of classes comprises selecting, from a plurality of predetermined classifications, a classification defining the plurality of classes adapted to the properties of the statistical distribution.

In an embodiment the range of sample values for each class, the centre of the statistical distribution and/or the useful range of sample values is determined based on rate distortion criteria.

In an embodiment the range of sample values for each class, the centre of the statistical distribution and/or the useful range of sample values is predetermined.

In an embodiment the useful range of sample values is determined based on a comparison of the sample values with respect to a threshold value, wherein the threshold value depends on the total number of samples, the threshold value depends on the component type of the samples, or the threshold value is a predetermined value.

In an embodiment the compensation offset for each class is determined from an average of the difference between the sample value of each reconstructed sample of the class and the respective sample value of the corresponding original image.

In an embodiment the set of samples is one of a plurality of sets of samples of the image, the same number of classes being determined for each set.

In an embodiment the sample value is representative of a bit-depth of the useful range, the range of each class and/or the center of the statistical distribution being dependent on the bit-depth.

In an embodiment the range of sample values for a given class is dependent on the position of the class within the useful range.

In an embodiment the range of sample values for a given class located at the edge of the statistical distribution is superior to the range of sample values for a given class in a central region of the distribution.

In an embodiment the centre of the statistical distribution is determined based on the useful range.

In an embodiment the plurality of classes comprises a first group of classes located at a central portion of the statistical distribution and a second group of classes including a first and second sub-group of classes located at respective edge portions of the statistical distribution.

In an embodiment the positions of the second sub-group of classes in the statistical distribution are provided as data for coding.

In an embodiment the positions of the sub-groups of the second group are independent of the full range of the statistical distribution.

In an embodiment the center of the statistical distribution is not provided for coding.

In an embodiment, the position of the useful range (classification) within the full range is selected from among a plurality of possible positions distributed over the full range, the interval between two successive positions being smaller in at least one portion of the full range than in another portion of the full range.

For example, the portion having the smaller interval can be in the middle of the full range.

According to another example, the portion having smaller interval can be at one or both ends of the full range.

The positions may be center positions. Alternatively, they may be end positions.

The possible positions may be assigned indexes.

In an embodiment the range of sample values for each class, the centre of the statistical distribution and/or the useful range of sample values is predetermined.

In an embodiment, at least two different types of offset values may be generated, one of the types being so-called band offset values which, as described above, are associated respectively with classes (ranges of sample values). One or more other types of offset values may be so-called edge offset values. There may be different types of edge offset values per direction, for example four different types corresponding respectively to four different possible situations when comparing the value of a sample to be filtered with the value of samples neighbouring this sample to be filtered. Thus, there may be a set of edge offset values for each situation. One type of offset value (band or edge) may then be selected. The selection criterion is not limited but one suitable criterion is a rate-distortion criterion. Only the selected type of SAO filtering (band or edge offset) is then applied by the encoder and decoder. The selection may be carried out for each frame area, Additionally, it may be possible to select "no SAO", i.e. to apply neither band nor edge offsets, for example if no significant improvement is obtained by either type. In an embodiment the selected type of SAO filtering is encoded and transmitted by the encoder to the decoder.

In an embodiment, a fixed length code is used to encode the selected type.

In an embodiment, when the selected type is band offset, a value representative of the position of the useful range is encoded. The position may be a center position or an end position of the useful range.

In an embodiment, a fixed length code is used to encode the position of the useful range.

In an embodiment, when the number of different codewords allowed by the length of the fixed length code used to encode the codewords corresponding to the values representative of the position of the useful range is higher than the actual number of different possible positions, spare codewords are used to encode other information. For example, in one embodiment, the spare codewords are used to encode the type (direction) of the edge offset.

In an embodiment, compensation offsets are encoded with fixed length codes. This can apply to band offsets or edge offsets or both types of offset.

In an embodiment, the number of different compensation offsets allowed by the length of the fixed length code is lower than the number of possible compensation offsets.

In an embodiment, a multiplication factor is applied to the compensation offset values, and the multiplied compensation offset values are used for filtering.

In an embodiment, the multiplication factor is transmitted from the encoder to the decoder.

In an embodiment, a shifting value is applied to the compensation offset values, and the shifted compensation offset values are used for filtering.

In an embodiment, the shifting value is transmitted from the encoder to the decoder.

In an embodiment, the edge offset values for at least one type are predetermined.

In an embodiment, a flag indicating if compensation offsets have to be applied or not on a set of reconstructed samples of an image is encoded.

In an embodiment, groups of band offset values are predefined, each offset of the group being associated with one class of a useful range.

In an embodiment, each group is assigned an index.

In an embodiment, predefined groups are gathered in a table, the table order depending on the probability of selection of each group.

In an embodiment, the probability of selection of each group is computed by applying methods of providing compensation offsets embodying the present invention to a set of training sequences.

In an embodiment, the group of band offset values among the predefined groups of band offset values that has the minimum difference between original samples and filtered samples is selected.

In an embodiment, the indexes of the groups are encoded using a fixed length code.

In an embodiment, the number of different encoded indexes of groups allowed by the length of the fixed length code is lower than the number of possible different groups.

In an embodiment, a subset of groups of band offsets within the possible different groups is determined in dependence upon the probability of selection of each group and the length of the fixed length code.

In an embodiment, the length of the fixed length code used to encode the indexes of the groups of band offsets is predetermined.

In an embodiment, the length of the fixed length code used to encode the indexes of the groups of compensation offsets is encoded in a sequence header, a group of picture header, a picture header, a slice header or a LCU header.

According to a second further aspect of the invention there is provided a method of encoding an image composed of a plurality of samples, the method comprising encoding the samples; decoding the encoded samples to provide reconstructed samples; performing loop filtering on the reconstructed samples, the loop filtering comprising applying compensation offsets to the sample values of the respective reconstructed samples, each compensation offset being associa with a range of sample values, wherein the compensation offsets are provided according to the method of any preceding claim; and generating a bitstream of encoded samples.

In an embodiment the method includes transmitting, in the bitstream, encoded data representative of the respective compensation offsets for each class.

In an embodiment the method includes transmitting, in the bitstream, encoded classification data defining the plurality of determined classes.

In an embodiment the classification data comprises data representative of a centre of the statistical distribution.

In an embodiment the classification data comprises data representative of the range of sample values defined for each of the plurality of classes.

In an embodiment the method includes the classification data comprises data representative of a useful range of the statistical distribution.

According to a third further aspect of the invention there is provided a method of encoding an image composed of a plurality of samples, the method comprising encoding the samples;

decoding the encoded samples to provide reconstructed samples;

performing loop filtering on the reconstructed samples, the loop filtering comprising classifying the reconstructed samples into a classification comprising a predetermined number of classes, said classification being selected from among a plurality of predetermined classifications based on a rate distortion criterion, associating the selected classification to a group of compensation offsets, each class of the predetermined number of classes being associated to one compensation offset of the group, applying compensation offsets of the group to the sample values of the respective reconstructed samples in function of their class; and generating a bitstream of encoded samples.

In an embodiment, classifications among the plurality of predetermined classifications comprises the predetermined number of classes defined in function of predefined comparison rules on the relative values of a reconstructed sample to classify with some neighbouring reconstructed samples.

In an embodiment, classifications of the plurality of predetermined classifications have a classification range smaller than a full range of the sample values and are made up of the predetermined number of classes, each defining a range of sample values within said classification range, into which class a sample is put if its sample value is within the range of the class concerned.

In an embodiment, the group of compensation offsets is selected among a predetermined list of groups of compensation offsets.

In an embodiment, a predefined computation formula is used to determine a list of groups of compensation offset.

In an embodiment, the values of the compensation offsets of the group of compensation offsets are determined in function of predefined rules on the relative values of the compensation offsets.

In an embodiment, the predetermined rules comprise comparing a function of the difference of at least a pair of compensation offsets of the group of compensation offsets to given value.

In an embodiment, the predetermined rules comprise comparing differences computed on different pairs of compensation offsets.

In an embodiment, compensation offsets of groups of compensation offsets of the list of groups of compensation offsets are function of compensation offsets of other groups of compensation offsets of the list of groups of compensation offsets.

In an embodiment, compensation offsets of groups of compensation offsets are set to a predefined value.

In an embodiment, groups of compensation offsets of the list of group of compensation offsets are the result of permutation of compensation offset values of other groups of compensation offsets of the list of group of compensation offsets.

In an embodiment, each group of compensation offsets of the list of groups of compensation offsets is associated to an index value.

In an embodiment, the values of the compensation offsets in a group of compensation offsets depend on the index value of the group of compensation offsets.

In an embodiment, the index is encoded in the bitstream in the form of a fixed length code.

In an embodiment, the index is encoded in the bitstream in the form of a variable length code, the code depending on an ordering of the list of groups of compensation offsets.

In an embodiment, groups of compensation offsets with given offsets values are removed from the list of groups of compensation offset.

In an embodiment, the list of groups of compensation offsets is determined in function of a value representative of the bit depth of the encoded image.

In an embodiment, only a subpart of the list of groups of compensation offsets is used for encoding.

According to a fourth further aspect of the invention there is provided a method of decoding an image composed of a plurality of encoded samples, the method comprising decoding the encoded samples to provide reconstructed samples;

performing loop filtering on the reconstructed samples, the loop filtering comprising;

obtaining a classification identifier and a group of compensation offsets and classifying the reconstructed samples according to the obtained classification identifier, said classification comprising a predetermined number of classes, each class of the predetermined number of classes being associated to one compensation offset of the group, applying compensation offsets of the group to the sample values of the respective reconstructed samples in function of their class; and generating decoded samples.

In an embodiment, the classification comprises the predetermined number of classes defined in function of predefined comparison rules on the relative values of a reconstructed sample to classify with some neighbouring reconstructed samples.

In an embodiment, the classification have a classification range smaller than a full range of the sample values and is made up of the predetermined number of classes, each defining a range of sample values within said classification range, into which class a sample is put if its sample value is within the range of the class concerned.

In an embodiment, the group of compensation offsets belongs to a predetermined given list of groups of compensation offsets.

In an embodiment, a predefined computation formula is used to determine a list of groups of compensation offset.

In an embodiment, an index of group of compensation offsets is obtained and allows determining the group of compensation offsets to apply.

In an embodiment, only a subset of the compensation offsets is obtained, other compensation offsets values being determined from received compensation offsets values.

In an embodiment, the obtained index of the group of compensation offsets is encoded in the form of a fixed length code.

In an embodiment, the index is encoded in the bitstream in the form of a variable length code, the code depending on an ordering of the list of groups of compensation offsets.

In an embodiment, the list of groups of compensation offsets is determined in function of a value representative of the bit depth of the encoded image.

In an embodiment, only a subpart of the list of groups of compensation offsets is used for decoding.

According to a fifth further aspect of the present invention there is provided a method of encoding an image composed of a plurality of samples, the method comprising encoding the samples;

decoding the encoded samples to provide reconstructed samples;

performing loop filtering on the reconstructed samples, the loop filtering comprising:

selecting an edge offset type from among a plurality of predetermined edge offset types and a group of edge offset values from among a plurality of predetermined groups of edge offset values, each group of edge offset values comprising a plurality of offset values associated respectively with different classes, and each class defining a relationship between a given sample and further samples neighbouring the given sample in a predetermined direction; and generating a bitstream of encoded samples, the bitstream including information relating to the selected type and group.

Preferably, the edge offset type and group of edge offset values are selected based on a rate-distortion criterion.

In an embodiment, the group of edge offset values is selected among a predetermined list of groups of edge offset values.

In an embodiment, a predefined computation formula is used to determine a list of groups of compensation offset.

In an embodiment, the values of the edge offset values of the group of edge offset values are determined in function of predefined rules on the relative values of the edge offset values.

In an embodiment, the predetermined rules comprise comparing a function of the difference of at least a pair of edge offset values of the group of edge offset values to given value.

In an embodiment, the predetermined rules comprise comparing differences computed on different pairs of edge offset values.

In an embodiment, edge offset values of groups of edge offset values of the list of groups of edge offset values are function of edge offset values of other groups of edge offset values of the list of groups of edge offset values.

In an embodiment, edge offset values of groups of edge offset values are set to a predefined value.

In an embodiment, groups of edge offset values of the list of group of edge offset values are the result of permutation of compensation offset values of other groups of edge offset values of the list of group of edge offset values.

In an embodiment, each group of edge offset values of the list of groups of edge offset values is associated to an index value.

In an embodiment, the values of the edge offset values in a group of edge offset values depend on the index value of the group of edge offset values.

In an embodiment, the index is encoded in the bitstream in the form of a fixed length code.

In an embodiment, the index is encoded in the bitstream in the form of a variable length code, the code depending on an ordering of the list of groups of edge offset values.

In an embodiment, groups of edge offset values with given offsets values are removed from the list of groups of compensation offset.

In an embodiment, the list of groups of edge offset values is determined in function of a value representative of the bit depth of the encoded image.

In an embodiment, only a subpart of the list of groups of edge offset values is used for encoding.

According to a sixth further aspect of the present invention there is provided a method of decoding an image composed of a plurality of samples, each sample having a sample value, the method comprising receiving encoded sample values;

receiving encoded edge offset type data identifying an edge offset type;

receiving encoded group data identifying a group of edge offset values, the group comprising a plurality of offset values associated respectively with different classes, and each class defining a relationship between a given sample and further samples neighbouring the given sample in a predetermined direction;

decoding the edge offset type data and group data and obtaining the edge offset values of the identified group;

decoding the encoded samples to provide reconstructed sample values;

performing loop filtering on the reconstructed sample values, the loop filtering comprising applying the offset values of the identified group to reconstructed sample values according to the classes of the samples.

Preferably, predetermined groups of edge offset values are stored, and the group data is employed to select one of the stored groups.

Preferably, the edge offsets are obtained from the group data itself.

Preferably, the group data is an index value.

In an embodiment, the group of edge offset values belongs to a predetermined given list of groups of edge offset values.

In an embodiment, a predefined computation formula is used to determine a list of groups of compensation offset.

In an embodiment, an index of group of edge offset values is obtained and allows determining the group of edge offset values to apply.

In an embodiment, only a subset of the edge offset values is obtained, other edge offset values being determined from received edge offset values.

In an embodiment, the obtained index of the group of edge offset values is encoded in the form of a fixed length code.

In an embodiment, the index is encoded in the bitstream in the form of a variable length code, the code depending on an ordering of the list of groups of edge offset values.

In an embodiment, the list of groups of edge offset values is determined in function of a value representative of the bit depth of the encoded image.

In an embodiment, only a subpart of the list of groups of edge offset values is used for decoding.

According to a seventh further aspect of the invention there is provided a method of decoding an image composed of a plurality of samples, the method comprising receiving encoded samples decoding the encoded samples to provide reconstructed samples;

performing loop filtering on the reconstructed samples, the loop filtering comprising applying compensation offsets to the sample values of the respective reconstructed samples, each compensation offset being associated with a range of sample values, wherein the compensation offsets are provided according to the method of any one of the previous embodiments.

Another one of the further aspects of the invention provides a method of decoding an image composed of a plurality of sample values, the method comprising receiving encoded sample values;

receiving encoded classification data defining a plurality of classes associated with respective compensation offsets provided according to the method of any one of the previous embodiments, each compensation offset corresponding to a range of sample values;

decoding the encoded samples to provide reconstructed samples and decoding the encoded compensation offsets; and performing loop filtering on the reconstructed samples, the loop filtering comprising applying the received compensation offsets to the image samples of the respective samples, according to sample value of the sample.

Another one of the further aspects of the present invention provides a method of decoding an image composed of a plurality of samples, each sample having a sample value, the method comprising:

receiving encoded sample values;

receiving encoded classification data relating to a classification selected by an encoder from among a plurality of predetermined classifications, each said predetermined classification having a classification range smaller than a full range of the sample values and being made up of a plurality of classes, each defining a range of sample values within said classification range, into which class a sample is placed if its sample value is within the range of the class concerned;

receiving encoded compensation offsets associated respectively with the classes of the selected classification;

decoding the encoded sample values to provide reconstructed sample values and decoding the encoded classification data and compensation offsets; and performing loop filtering on the reconstructed sample values, the loop filtering comprising applying the decoded compensation offset associated with each class of the selected classification to reconstructed sample values within the range of the class concerned.

The encoder may select the classification in any suitable way including based on a rate-distortion criterion or in dependence on properties of the statistical distribution of sample values.

In an embodiment the method includes the classification data comprises data representative of a centre of the statistical distribution, data representative of the range of sample values defined for each of the plurality of classes, and/or data representative of a useful range of the statistical distribution.

According to another one of the further aspects of the invention there is provided a signal carrying an information dataset for an image represented by a video bitstream, the image comprising a set of reconstructable samples, each reconstructable sample after reconstruction having a respective sample value, the sample values of a plurality of reconstructed samples of the set being representable by a statistical distribution of sample values; the information dataset comprising: classification data representative of a plurality of classes associated with respective compensation offsets for application to the sample values of respective reconstructed samples, wherein the classification data is determined according to the statistical distribution.

In an embodiment the classification data comprises data representative of a centre of the statistical distribution, data representative of the range of sample values defined for each of the plurality of classes and/or data representative of a useful range of the statistical distribution.

According to another one of the further aspects of the invention there is provided a device for providing compensation offsets for a set of reconstructed samples of an image, each sample having a respective sample value, the sample values of a plurality of samples of the set being representable by a statistical distribution of sample values, the device comprising means for determining, in dependence on properties of the statistical distribution of sample values, a plurality of classes for repartition of the samples according to their corresponding sample value, each class defining a respective range of sample values; and means for associating, with each determined class, a respective compensation offset for application to the respective sample value of each sample of the said class.

Another one of the further aspects of the invention provides an encoding device for encoding an image composed of a plurality of samples, the device comprising an encoder for encoding the samples; a decoder for decoding the encoded samples to provide reconstructed samples; a loop filter for filtering the reconstructed samples, the loop filtering means comprising offset application means for applying compensation offsets to the sample values of the respective reconstructed samples, each compensation offset being associated with a range of sample values, wherein the compensation offsets are provided by the device of a previous embodiment; and a bitstream generator for generating a bitstream of encoded samples.

Yet another one of the further aspects of the invention provides a decoding device for decoding an image composed of a plurality of samples, the device comprising: a receiver for receiving encoded samples, a decoder for decoding the encoded samples to provide reconstructed samples; a loop filter for loop filtering the reconstructed samples, the loop filter comprising means for applying compensation offsets to the sample values of the respective reconstructed samples, each compensation offset being associated with a range of sample values, wherein the compensation offsets are provided by a device according to a previous embodiment.

Another one of the further aspects of the invention provides a decoding device for decoding an image composed of a plurality of sample values, the device comprising: a receiver for receiving encoded sample values and receiving encoded classification data defining a plurality of classes associated with respective compensation offsets provided by a device according to a previous embodiment, each compensation offset corresponding to a range of sample values; a decoder for decoding the encoded samples to provide reconstructed samples and decoding the encoded compensation offsets; and a loop filter for loop filtering the reconstructed samples, the loop filter comprising means for applying the received compensation offsets to the image samples of the respective samples, according to sample value of the sample.

According to yet another of the further aspects of the present invention there is provided a method of providing compensation offsets for a set of reconstructed samples of an image, each sample having a sample value, the method comprising selecting, based on a rate distortion criterion, a classification from among a plurality of predetermined classifications, each said predetermined classification having a classification range smaller than a full range of the sample values and being made up of a plurality of classes, each defining a range of sample values within said classification range, into which class a sample is put if its sample value is within the range of the class concerned; and associating with each class of the selected classification a compensation offset for application to the sample value of each sample of the class concerned.

In one embodiment said classification range of at least one said predetermined classification is smaller than half said full range.

In one embodiment said classification range of at least one said predetermined classification is equal to one eighth of the full range.

In one embodiment at least one said predetermined classification is made up of four classes.

In one embodiment the samples of the set may be of at least a first component type or a second component type, and the plurality of classes is determined dependent on the component type of the set of samples.

In one embodiment the number of classes is determined according to the component type In one embodiment the compensation offset for each class is determined from an average of the difference between the sample value of each reconstructed sample of the class and the respective sample value of the corresponding original image.

In one embodiment the sample value is representative of a bit-depth, and at least one of the classification range, the range of each class, and the center of the selected classification is dependent on the bit-depth.

In one embodiment the range of sample values for a given class is dependent on the position of the class within the selected classification.

In one embodiment the range of sample values for a given class located at the edge of the selected classification is greater than the range of sample values for a given class in a central region of the selected classification.

According to yet another one of the further aspects of the present invention there is provided a method of encoding an image composed of a plurality of samples, the method comprising encoding the samples;

decoding the encoded samples to provide reconstructed samples;

performing loop filtering on the reconstructed samples, the loop filtering comprising applying compensation offsets to the sample values of the respective reconstructed samples, each compensation offset being associated with a range of sample values, wherein the compensation offsets are provided according to the method of any preceding claim; and generating a bitstream of encoded samples.

In one embodiment the method further comprises transmitting, in the bitstream, encoded data representative of the compensation offsets associated respectively with the plurality of classes of the selected classification.

In one embodiment the method further comprises transmitting, in the bitstream, encoded classification data relating to the selected classification.

In one embodiment the classification data comprises data representative of a centre of the selected classification.

In one embodiment the classification data comprises data representative of an index related to the selected classification.

In one embodiment the classification data comprises data representative of a position of the selected classification within the full range of sample values.

In one embodiment the position is an end position of the selected classification.

In one embodiment the end position is represented as a displacement from one end of said full range.

In one embodiment the classification data comprises data representative of the range of sample values defined for each of the plurality of classes.

In one embodiment the classification data comprises data representative of the classification range of the selected classification.

According to yet another one of the further aspects of the present invention there is provided a method of decoding an image composed of a plurality of samples, each sample having a sample value, the method comprising receiving encoded sample values;

receiving encoded classification data;

receiving encoded compensation offsets;

decoding the classification data and selecting, based on the decoded classification data, a classification from among a plurality of predetermined classifications, each said predetermined classification having a classification range smaller than a full range of the sample values and being made up of a plurality of classes, each defining a range of sample values within said classification range, into which class a sample is put if its sample value is within the range of the class concerned;

decoding the encoded samples to provide reconstructed sample values and decoding the encoded compensation offsets;

associating the decoded compensation offsets respectively with the classes of the selected classification; and performing loop filtering on the reconstructed sample values, the loop filtering comprising applying the decoded compensation offset associated with each class of the selected classification to reconstructed sample values within the range of the class concerned.

In one embodiment said classification range of at least one said predetermined classification is smaller than half said full range.

In one embodiment said classification range of at least one said predetermined classification is equal to one eighth of the full range.

In one embodiment at least one said predetermined classification is made up of four classes.

In one embodiment the classification data comprises data representative of a centre of the selected classification.

In one embodiment the classification data comprises data representative of an index related to the selected classification.

In one embodiment the classification data comprises data representative of a position of the selected classification within the full range of sample values.

In one embodiment the position is an end position of the selected classification.

In one embodiment the end position is represented as a displacement from one end of said full range.

In one embodiment the classification data comprises data representative of the range of sample values defined for each of the plurality of classes.

In one embodiment the classification data comprises data representative of a classification range of the selected classification.

According to yet another one of the further aspects of the present invention there is provided a signal carrying an information dataset for an image represented by a video bitstream, the image comprising a set of reconstructable samples, each reconstructable sample having a sample value, the information dataset comprising: classification data relating to a classification selected by an encoder from among a plurality of predetermined classifications, each said predetermined classification having a classification range smaller than a full range of the sample values and being made up of a plurality of classes, each defining a range of sample values within said classification range, into which class a sample is put if its sample value is within the range of the class concerned, and each class of the plurality of classes of the selected classification being associated with a compensation offset for application to sample values of the reconstructable samples within the range of the class concerned.

In one embodiment said classification range of at least one said predetermined classification is smaller than half said full range.

In one embodiment said classification range of at least one said predetermined classification is equal to one eighth of the full range.

In one embodiment at least one said predetermined classification is made up of four classes.

In one embodiment the classification data comprises data representative of a centre of the selected classification.

In one embodiment the classification data comprises data representative of an index related to the selected classification.

In one embodiment the classification data comprises data representative of a position of the selected classification within the full range of sample values.

In one embodiment the position is an end position of the selected classification.

In one embodiment the end position is represented as a displacement from one end of said full range.

In one embodiment the classification data comprises data representative of the range of sample values defined for each of the plurality of classes.

In one embodiment the classification data comprises data representative of a useful range of the selected classification.

According to yet another one of the further aspects of the present invention there is provided a device for providing compensation offsets for a set of reconstructed samples of an image, each sample having a sample value, the device comprising:

means for selecting, based on a rate distortion criterion, a classification from among a plurality of predetermined classifications, each said predetermined classification having a classification range smaller than a full range of the sample values and being made up of a plurality of classes, each defining a range of sample values within said classification range, into which class a sample is put if its sample value is within the range of the class concerned; and means for associating with each class of the selected classification a compensation offset for application to the sample value of each sample of the class concerned.

According to yet another one of the further aspects of the present invention there is provided an encoding device for encoding an image composed of a plurality of samples, the device comprising an encoder for encoding the samples;

a decoder for decoding the encoded samples to provide reconstructed samples;

a loop filter for filtering the reconstructed samples, the loop filtering means comprising offset application means for applying compensation offsets to the sample values of the respective reconstructed samples, each compensation offset being associated with a range of sample values, wherein the compensation offsets are provided by the device embodying the preceding aspect of the present invention; and a bitstream generator for generating a bitstream of encoded samples.

According to yet another one of the further aspects of the present invention there is provided a device for decoding an image composed of a plurality of samples, each sample having a sample value, the device comprising means for receiving encoded sample values;

means for receiving encoded classification data;

means for receiving encoded compensation offsets;

means for decoding the classification data and for selecting, based on the decoded classification data, a classification from among a plurality of predetermined classifications, each said predetermined classification having a classification range smaller than a full range of the sample values and being made up of a plurality of classes, each defining a range of sample values within said classification range, into which class a sample is put if its sample value is within the range of the class concerned;

means for decoding the encoded samples to provide reconstructed sample values and for decoding the encoded compensation offsets;

means for associating the decoded compensation offsets respectively with the classes of the selected classification; and means for performing loop filtering on the reconstructed sample values, the loop filtering comprising applying the decoded compensation offset associated with each class of the selected classification to reconstructed sample values within the range of the class concerned.

According to yet another one of the further aspects of the present invention there is provided a method of encoding an image composed of a plurality of samples, the method comprising encoding the samples;

decoding the encoded samples to provide reconstructed samples;

performing loop filtering on the reconstructed samples, the loop filtering comprising:

selecting an edge offset type from among a plurality of predetermined edge offset types and a group of edge offset values from among a plurality of predetermined groups of edge offset values, each group of edge offset values comprising a plurality of offset values associated respectively with different classes, and each class defining a relationship between a given sample and further samples neighbouring the given sample in a predetermined direction; and generating a bitstream of encoded samples, the bitstream including information relating to the selected type and group.

In one embodiment the edge offset type and group of edge offset values are selected based on a rate-distortion criterion.

According to yet another one of the further aspects of the present invention there is provided a method of decoding an image composed of a plurality of samples, each sample having a sample value, the method comprising receiving encoded sample values;

receiving encoded edge offset type data identifying an edge offset type;

receiving encoded group data identifying a group of edge offset values, the group comprising a plurality of offset values associated respectively with different classes, and each class defining a relationship between a given sample and further samples neighbouring the given sample in a predetermined direction;

decoding the edge offset type data and group data and obtaining the edge offset values of the identified group;

decoding the encoded samples to provide reconstructed sample values;

performing loop filtering on the reconstructed sample values, the loop filtering comprising applying the offset values of the identified group to reconstructed sample values according to the classes of the samples.

In one embodiment predetermined groups of edge offset values are stored, and the group data is employed to select one of the stored groups.

In one embodiment the edge offsets are obtained from the group data itself.

In one embodiment the group data is an index value.

According to yet another one of the further aspects of the present invention there is provided a device for encoding an image composed of a plurality of samples, the device comprising means for encoding the samples;

means for decoding the encoded samples to provide reconstructed samples;

means for performing loop filtering on the reconstructed samples, the loop filtering means comprising:

means for selecting an edge offset type from among a plurality of predetermined edge offset types and a group of edge offset values from among a plurality of predetermined groups of edge offset values, each group of edge offset values comprising a plurality of offset values associated respectively with different classes, and each class defining a relationship between a given sample and further samples neighbouring the given sample in a predetermined direction; and means for generating a bitstream of encoded samples, the bitstream including information relating to the selected type and group.

In one embodiment the selecting means is operable to select the edge offset type and group of edge offset values based on a rate-distortion criterion.

According to yet another one of the further aspects of the present invention there is provided a device for decoding an image composed of a plurality of samples, each sample having a sample value, the device comprising means for receiving encoded sample values;

means for receiving encoded edge offset type data identifying an edge offset type;

means for receiving encoded group data identifying a group of edge offset values, the group comprising a plurality of offset values associated respectively with different classes, and each class defining a relationship between a given sample and further samples neighbouring the given sample in a predetermined direction;

means for decoding the edge offset type data and group data and obtaining the edge offset values of the identified group;

means for decoding the encoded samples to provide reconstructed sample values; and means for performing loop filtering on the reconstructed sample values, the loop filtering comprising applying the offset values of the identified group to reconstructed sample values according to the classes of the samples.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding images, comprising:

receiving a sequence of images;

encoding the received sequence of images to produce a bitstream; and processing at least one encoded image to generate a reconstructed image usable as a reference image for the encoding of another image, the processing comprising loop filtering;

wherein the loop filtering comprises:

determining which images of said sequence of images are enabled images on which area-by-area loop filtering is to be enabled, permitting different image areas within the same enabled image to have different loop filtering selections, and which images of said sequence of images are disabled images on which area-by-area loop filtering is to be disabled, different image areas within the same disabled image not being permitted to have different loop filtering selections;

performing area-by-area loop filtering on each said enabled image of the sequence and disabling such area-by-area loop filtering on each said disabled image of the sequence;

producing a measure of the area-by-area loop filtering activity in one or more images, said measure being dependent on the loop filtering selections for the image areas of said one or more images in the case of enabling area-by-area loop filtering thereon; and determining that at least one image of said sequence is an enabled image or a disabled image in dependence upon the measure, wherein producing the measure comprises determining a number of image areas within an image, including consecutive and non-consecutive image areas, in which use of loop filtering is selected.

2. A method according to claim 1, comprising:

associating with the images of the sequence respective levels from a plurality of levels;

producing a measure of area-by-area loop filtering activity in one or more images having a predetermined one of said levels; and determining that at least one image of said sequence is an enabled image or a disabled image in dependence upon the measure.

3. A method according to claim 2, wherein the determining is carried out image-by-image and the predetermined level is a level higher than a level of a current image.

4. A method according to claim 2, wherein the predetermined level is the highest level.

5. A method according to claim 2, comprising:

producing respective such measures of the area-by-area loop filtering activity for two or more said levels, each such measure being dependent on the respective decisions made for the image areas of one or more images having the level concerned; and determining that at least one image having a given level is an enabled image or a disabled image in dependence upon the measure produced for said given level.

6. A method according to claim 1, comprising comparing the measure with a threshold value and determining that at least one image is an enabled image or a disabled image according to the comparison result.

7. A method according to claim 5, comprising comparing the measure produced for said given level with a threshold value dependent on the given level and determining that at least one image having said given level is an enabled image or a disabled image according to the comparison result.

8. A method according to claim 2, wherein all images having the highest level are determined as such enabled images.

9. A method according to claim 2, wherein all images having the lowest level are determined as such disabled images.

10. A method according to claim 2, comprising determining images having a given level as such disabled images.

11. A method according to claim 10, further comprising after encoding a predetermined number of said disabled images having said given level determining subsequent images having said given level as such enabled images.

12. A method according to claim 1, wherein the images of said sequence have a plurality of color components, and the method comprises:
   determining for each color component independently which images are such enabled images and which images are such disabled images.

13. A method of decoding images comprising:
   receiving a bitstream comprising encoded data of a sequence of images;
   decoding the encoded data of the sequence of images to obtain decoded images, the decoding comprising loop filtering;
   wherein the loop filtering comprises:
   determining which images of said sequence of images are enabled images on which area-by-area loop filtering is to be enabled, permitting different image areas within the same enabled image to have different loop filtering selections, and which images of said sequence of images are disabled images on which area-by-area loop filtering is to be disabled, different image areas within the same disabled image not being permitted to have different loop filtering selections;
   performing area-by-area loop filtering on each said enabled image of the sequence and disabling such area-by-area loop filtering on each said disabled image of the sequence;
   producing a measure of the area-by-area loop filtering activity in one or more images, said measure being dependent on the loop filtering selections for the image areas of said one or more images in the case of enabling area-by-area loop filtering thereon; and
   determining that at least one image of said sequence is an enabled image or a disabled image in dependence upon the measure,
   wherein producing the measure comprises determining a number of image areas within an image, including consecutive and non-consecutive image areas, in which use of loop filtering is selected.

14. A method according to claim 13, comprising:
   associating with the images of the sequence respective levels from a plurality of levels;
   producing a measure of the area-by-area loop filtering activity in one or more images having a predetermined one of said levels; and
   determining that at least one image of said sequence is an enabled image or a disabled image in dependence upon the measure.

15. A method according to claim 14, wherein the determining is carried out image-by-image and the predetermined level is a level higher than a level of a current image.

16. A method according to claim 14, wherein the predetermined level is the highest level.

17. A method according to claim 14, comprising:
   producing respective such measures of the area-by-area loop filtering activity for two or more said levels, each such measure being dependent on the respective decisions made for the image areas of one or more images having the level concerned; and
   determining that at least one image having a given level is an enabled image or a disabled image in dependence upon the measure produced for said given level.

18. A method according to claim 13, comprising comparing the measure with a threshold value and determining that at least one image is an enabled image or a disabled image according to the comparison result.

19. A method according to claim 17, comprising comparing the measure produced for said given level with a threshold value dependent on the given level and determining that at least one image having said given level is an enabled image or a disabled image according to the comparison result.

20. A method according to claim 14, all images having the highest level are determined as such enabled images.

21. A method according to claim 14, all images having the lowest level are determined as such disabled images.

22. A method according to claim 14, comprising determining images having a given level as such disabled images.

23. A method according to claim 22, further comprising after encoding a predetermined number of images having said given level determining subsequent images having said given level as such enabled images.

24. A method according to claim 13, wherein the images of said sequence have a plurality of color components, and the method comprises:
   determining for each color component independently which images are such enabled images and which images are such disabled images.

25. A device for encoding images, comprising:
   a receiving unit which receives a sequence of images;
   an encoding unit which encodes the received sequence of images to produce a bitstream; and
   a processing unit which processes at least one encoded image to generate a reconstructed image usable as a reference image for the encoding of another image, the processing unit comprising a loop filter adapted to:
   determine which images of said sequence of images are enabled images on which area-by-area loop filtering is to be enabled, permitting different image areas within the same enabled image to have different loop filtering selections, and which images of said sequence of images are disabled images on which area-by-area loop filtering is to be disabled, different image areas within the same disabled image not being permitted to have different loop filtering selections;
   perform area-by-area loop filtering on each said enabled image of the sequence and not to perform such area-by-area loop filtering on each said disabled image of the sequence;
   produce a measure of the area-by-area loop filtering activity in one or more images, said measure being dependent on the loop filtering selections for the image areas of said one or more images in the case of enabling area-by-area loop filtering thereon; and
   determine that at least one image of said sequence is an enabled image or a disabled image in dependence upon the measure,
   wherein producing the measure comprises determining a number of image areas within an image, including consecutive and non-consecutive image areas, in which use of loop filtering is selected.

26. A device for decoding images, comprising:
a receiving unit which receives a bitstream comprising encoded data of a sequence of images;
a decoding unit which decodes the encoded data of the sequence of images to obtain decoded images, the decoding unit comprising a loop filter adapted to:
determine which images of said sequence of images are enabled images on which area-by-area loop filtering is to be enabled, permitting different image areas within the same enabled image to have different loop filtering selections, and which images of said sequence of images are disabled images on which area-by-area loop filtering is to be disabled, different image areas within the same disabled image not being permitted to have different loop filtering selections;
perform area-by-area loop filtering on each said enabled image of the sequence and not to perform such area-by-area loop filtering on each said disabled image of the sequence;
produce a measure of the area-by-area loop filtering activity in one or more images, said measure being dependent on the loop filtering selections for the image areas of said one or more images in the case of enabling area-by-area loop filtering thereon; and
determine that at least one image of said sequence is an enabled image or a disabled image in dependence upon the measure,
wherein producing the measure comprises determining a number of image areas within an image, including consecutive and non-consecutive image areas, in which use of loop filtering is selected.

27. A non-transitory computer-readable storage medium storing a program which, when run on a processor or computer, causes the processor or computer to carry out a method of encoding images, the program comprising:
a receiving code portion which receives a sequence of images;
an encoding code portion which encodes the received sequence of images to produce a bitstream; and
a processing code portion which processes at least one encoded image to generate a reconstructed image usable as a reference image for the encoding of another image, the processing code portion comprising a loop filter code portion adapted to:
determine which images of said sequence of images are enabled images on which area-by-area loop filtering is to be enabled, permitting different image areas within the same enabled image to have different loop filtering selections, and which images of said sequence of images are disabled images on which area-by-area loop filtering is to be disabled, different image areas within the same disabled image not being permitted to have different loop filtering selections;
perform area-by-area loop filtering on each said enabled image of the sequence and not to perform such area-by-area loop filtering on each said disabled image of the sequence;
produce a measure of the area-by-area loop filtering activity in one or more images, said measure being dependent on the loop filtering selections for the image areas of said one or more images in the case of enabling area-by-area loop filtering thereon; and
determine that at least one image of said sequence is an enabled image or a disabled image in dependence upon the measure,
wherein producing the measure comprises determining a number of image areas within an image, including consecutive and non-consecutive image areas, in which use of loop filtering is selected.

28. A non-transitory computer-readable storage medium storing a program which, when run on a processor or computer, causes the processor or computer to carry out a method of decoding images, the program comprising:
a receiving code portion which receives a bitstream comprising encoded data of a sequence of images;
a decoding code portion which decodes the encoded data of the sequence of images to obtain decoded images, the decoding code portion comprising a loop filter code portion adapted to:
determine which images of said sequence of images are enabled images on which area-by-area loop filtering is to be enabled, permitting different image areas within the same enabled image to have different loop filtering selections, and which images of said sequence of images are disabled images on which area-by-area loop filtering is to be disabled, different image areas within the same disabled image not being permitted to have different loop filtering selections;
perform area-by-area loop filtering on each said enabled image of the sequence and which does not perform such area-by-area loop filtering on each said disabled image of the sequence;
produce a measure of the area-by-area loop filtering activity in one or more images, said measure being dependent on the loop filtering selections for the image areas of said one or more images in the case of enabling area-by-area loop filtering thereon; and
determine that at least one image of said sequence is an enabled image or a disabled image in dependence upon the measure,
wherein producing the measure comprises determining a number of image areas within an image, including consecutive and non-consecutive image areas, in which use of loop filtering is selected.

29. A method according to claim 1, wherein area-by-area loop filtering comprises selecting image area-by-image area in the enabled image whether to use loop filtering or not to use loop filtering in the image area concerned.

30. A method according to claim 1, wherein disabling area-by-area loop filtering comprises selecting for the disabled image as a whole not to use loop filtering.

31. A method according to claim 1, wherein the area-by-area loop filtering is or comprises area-by-area sample adaptive offset loop filtering.

32. A method according to claim 1, wherein said one or more images for which said measure of area-by-area loop filtering activity is produced are previously-determined enabled images.

33. A method according to claim 2, wherein the levels correspond to one of:
(a) different respective values of a Lagrangian parameter in a rate-distortion criterion;
(b) different respective values of a quantization parameter; and
(c) different respective levels among a Group of Pictures (GoP) having a hierarchical coding structure.

34. A method according to claim 13, wherein area-by-area loop filtering comprises selecting image area-by-image area in the enabled image whether to use loop filtering or not to use loop filtering in the image area concerned.

35. A method according to claim 13, wherein disabling area-by-area loop filtering comprises selecting for the disabled image as a whole not to use loop filtering.

36. A method according to claim 13, wherein the area-by-area loop filtering is or comprises area-by-area sample adaptive offset loop filtering.

37. A method according to claim 13, wherein said one or more images for which said measure of area-by-area loop filtering activity is produced are previously-determined enabled images.

38. A method according to claim 14, wherein the levels correspond to one of:
(a) different respective values of a Lagrangian parameter in a rate-distortion criterion;
(b) different respective values of a quantization parameter; and
(c) different respective levels among a Group of Pictures (GoP) having a hierarchical coding structure.

39. A method according to claim 33, wherein the levels correspond to (a) different respective values of the Lagrangian parameter in said rate-distortion criterion and the higher the level the higher the value of the Lagrangian parameter.

40. A method according to claim 33, wherein
the levels correspond to (b) different respective values of said quantization parameter, and the lower the level the higher the quantization-parameter value.

41. A method according to claim 33, wherein the levels correspond to (c) different respective levels among a Group of Pictures (GoP) having a hierarchical coding structure, and the greater the number of reference images of said Group of Pictures on which encoding of a given image of said Group of Pictures depends the lower the level of said given image.

42. A method according to claim 31, wherein a type of the area-by-area sample adaptive offset loop filtering is switchable between edge-type and band-type, and the method comprises determining for each type independently which images are such enabled images and which images are such disabled images.

43. A method according to claim 38, wherein the levels correspond to (a) different respective values of the Lagrangian parameter in said rate-distortion criterion and the higher the level the higher the value of the Lagrangian parameter.

44. A method according to claim 38, wherein
the levels correspond to (b) different respective values of said quantization parameter, and the lower the level the higher the quantization-parameter value.

45. A method according to claim 38, wherein the levels correspond to (c) different respective levels among a Group of Pictures (GoP) having a hierarchical coding structure, and the greater the number of reference images of said Group of Pictures on which encoding of a given image of said Group of Pictures depended the lower the level of said given image.

46. A method according to claim 36, wherein a type of the sample adaptive offset loop filtering is switchable between edge-area-by-area type and band-type, and the method comprises determining for each type independently which images are such enabled images and which images are such disabled images.

* * * * *